(12) United States Patent
Watanabe et al.

(10) Patent No.: US 7,075,732 B2
(45) Date of Patent: Jul. 11, 2006

(54) ZOOM OPTICAL SYSTEM, AND IMAGING SYSTEM INCORPORATING THE SAME

(75) Inventors: Masahito Watanabe, Hachioji (JP); Azusa Noguchi, Hino (JP)

(73) Assignee: Olympus Corporation, Tokyo (JP)

(*) Notice: Subject to any disclaimer, the term of this patent is extended or adjusted under 35 U.S.C. 154(b) by 57 days.

(21) Appl. No.: 10/945,396

(22) Filed: Sep. 21, 2004

(65) Prior Publication Data

US 2005/0063070 A1    Mar. 24, 2005

(30) Foreign Application Priority Data

Sep. 22, 2003  (JP) ............................. 2003-329512
Sep. 22, 2003  (JP) ............................. 2003-329513

(51) Int. Cl.
*G02B 15/14* (2006.01)
(52) U.S. Cl. ...................................... 359/689; 359/691
(58) Field of Classification Search ................ 359/689, 359/691, 686
See application file for complete search history.

(56) References Cited

U.S. PATENT DOCUMENTS

| | | | | |
|---|---|---|---|---|
| 5,452,134 A * | 9/1995 | Sato | ............................ | 359/682 |
| 6,308,011 B1 | 10/2001 | Wachi et al. | .................. | 396/72 |
| 6,532,114 B1 | 3/2003 | Kohno et al. | ............... | 359/689 |
| 6,614,599 B1 * | 9/2003 | Watanabe | .................... | 359/689 |
| 6,925,253 B1 * | 8/2005 | Miyatake | ...................... | 396/79 |
| 2002/0051301 A1 * | 5/2002 | Noguchi et al. | ............. | 359/689 |
| 2002/0057502 A1 | 5/2002 | Ishii et al. | ................... | 359/687 |
| 2002/0167736 A1 | 11/2002 | Shibayama | ................. | 359/680 |

FOREIGN PATENT DOCUMENTS

JP          2000/275520          10/2000

* cited by examiner

*Primary Examiner*—Scott J. Sugarman
*Assistant Examiner*—Darryl J. Collins
(74) *Attorney, Agent, or Firm*—Kenyon & Kenyon

(57) ABSTRACT

The invention relates to a zoom optical system wherein various aberrations are corrected while the total thickness of a lens arrangement upon received at a collapsible lens mount is reduced thereby ensuring compactness, high image-formation capabilities, and high zoom ratios at the wide-angle end, and an imaging system that incorporates the same. The zoom optical system comprises a first lens group G1 of negative refracting power and a second lens group G2 of positive refracting power. The first lens group G1 comprises a negative single lens comprising at least one aspheric surface and a positive single lens with an air separation interposed between the negative single lens and the positive single lens. The second lens group G2 comprises a positive lens, a cemented lens consisting of a positive lens and a negative lens and a positive lens, and comprises at least one aspheric surface. Zooming is carried out by varying a spacing between the respective lens groups. The zoom optical system satisfies condition (1) that defines the proper range of the refracting power profile for the first lens group G1, condition (2) that defines an angle-of-view range at the wide-angle end, and condition (3) that defines an angle-of-view range at the telephoto end.

43 Claims, 23 Drawing Sheets

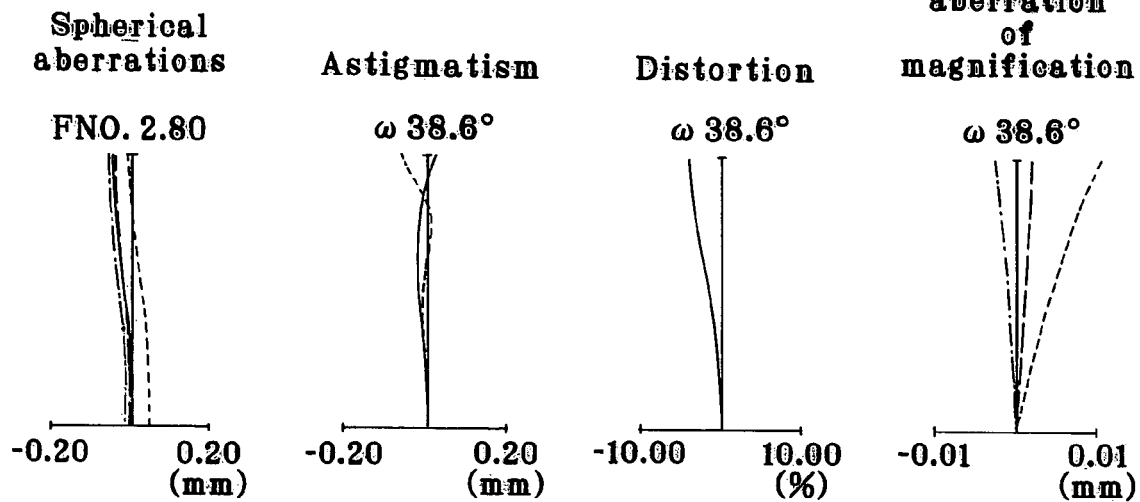
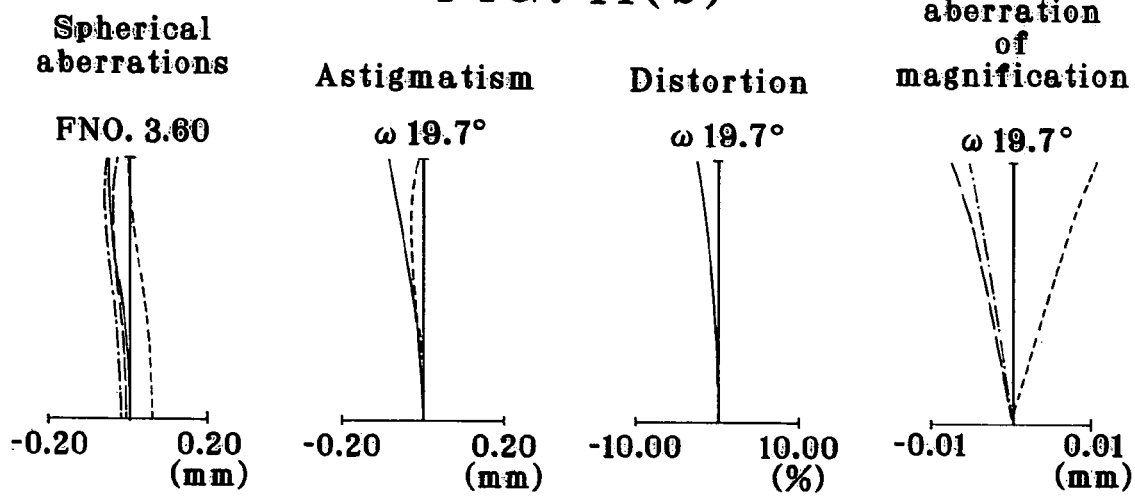
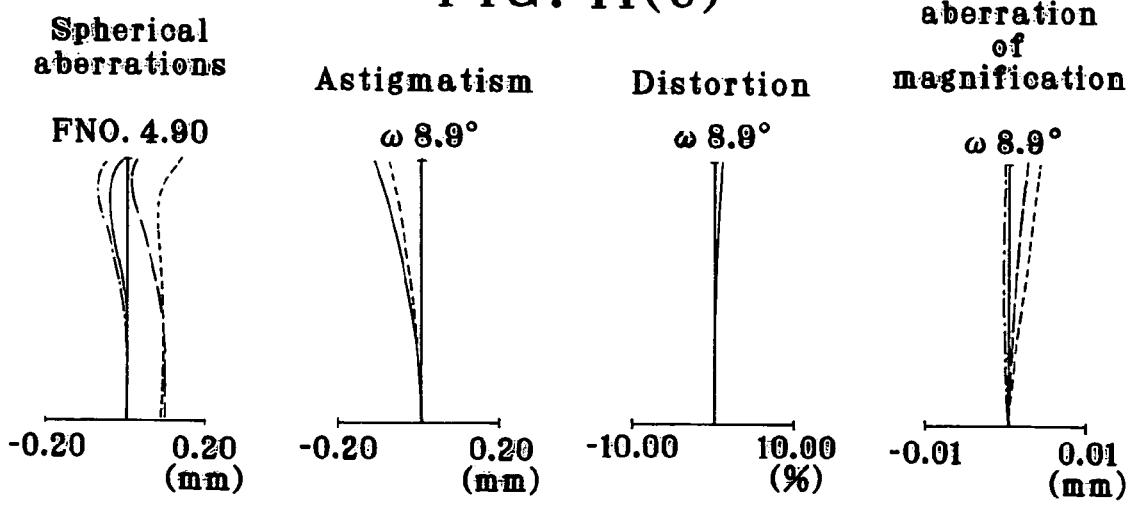

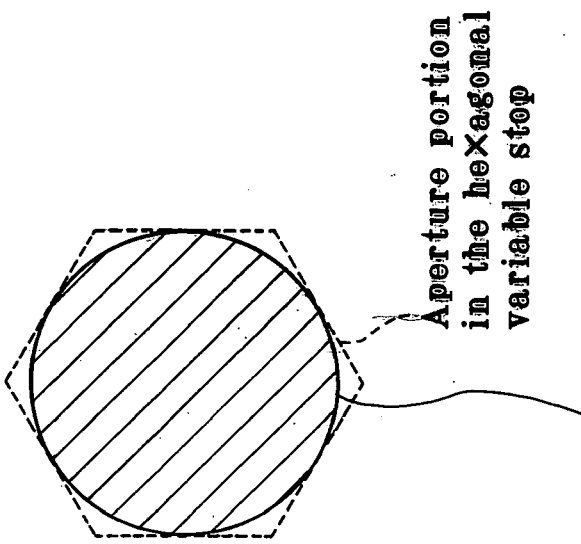
FIG. 16(a)  FIG. 16(b)  FIG. 16(c)
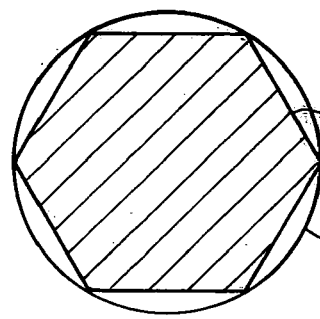
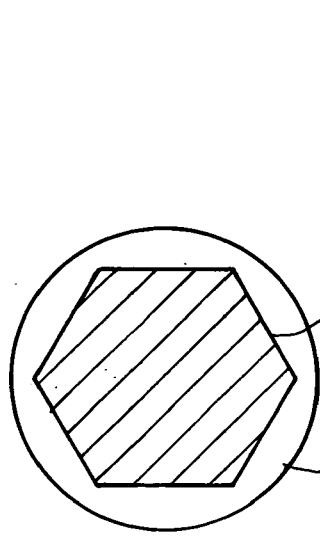

ZOOM OPTICAL SYSTEM, AND IMAGING SYSTEM INCORPORATING THE SAME

This application claims benefit Japanese Application Nos. 2003-329512 and 2003-329513 filed in Japan on Sep. 22, 200, the contents of which are incorporated by this reference.

BACKGROUND OF THE INVENTION

The present invention relates generally to a zoom optical system and an imaging system that incorporates the same, and more particularly to a zoom optical system well fit for use with video cameras and digital cameras, and an imaging system that incorporates the same.

SUMMARY OF THE INVENTION

In recent years, digital cameras (electronic cameras) have received attention as the coming generation of cameras, an alternative to silver-halide 35 mm-film (usually called Leica format) cameras. In view of the category of the portable low-end type in particular, the utilization of a collapsible lens mount that allows an optical system to be taken out of a camera body for phototaking and received therein for carrying now becomes mainstream. However, the thickness of an optical system received in a collapsible lens mount varies largely with the lens type or filters used.

Especially in the case of a so-called positive-lens-unit-leadoff-type zoom lens wherein a lens group having positive refracting power is positioned nearest to its object side, the thickness of each lens element and dead space are too large to set such requirements as zoom ratios and F-numbers at high values; in other words, the optical system does not become thin as expected, even upon received in the lens mount.

A negative-lens-unit-leadoff-type zoom lens, especially of two or three-group arrangement is advantageous in view of the thickness of the zoom lens received in a collapsible lens mount. Among such zoom lenses as known so far in the art, there is a zoom lens that is suitable for use with electronic image pickup devices, and has good image-formation capabilities inclusive of zoom ratios, angles of view and F-numbers and a possibility of being slimmed down upon received in the collapsible lens mount (see for instance Patent Publications 1, 2 and 3). There is also a small-format yet wide angle-of-view zoom lens (see for instance Patent Publication 4). For instance, Patent Publication 5 discloses a zoom lens having a zoom ratio of 3.5 or higher.

Patent Publication 1
JP-A 11-287953
Patent Publication 2
JP-A 2000-267009
Patent Publication 3
JP-A 2000-275520
Patent Publication 4
JP-A 2000-111798
Patent Publication 5
JP-A 2002-267930

However, all such zoom lenses as described in the above patent publications do hardly have wide enough angles of view and high enough zoom ratios. For the negative-lens-unit-leadoff-type zoom lens having a high zoom ratio and a wide angle of view, it is required to provide proper determination of a power profile across each lens group and a lens arrangement within each lens group. To slim down the first lens group for compactness, it is preferable to make the entrance pupil position shallow as well known in the art; however, the magnification of the second lens group must be increased to this end. Consequently, some considerable load is applied on the second lens group, rendering it difficult to correct such aberrations as astigmatism and chromatic aberration of magnification and resulting in an increased sensitivity to production errors. To achieve a wide-angle arrangement in this case, the first lens group must have a certain negative power; however, as the negative power of the first lens group becomes too strong, there is an increase in the thickness of the first lens group. A sensible tradeoff between a wide-angle, high-zoom-ratio arrangement and a small-format arrangement may be achieved by diminishing the size of an image pickup device. Given the same number of pixels, however, the pixel pitch must be diminished and insufficient sensitivity must be covered by the optical system. This is unfavorable in consideration of a deterioration of image-formation capabilities due to the influence of diffraction.

In view of such problems with the prior art as described above, it is one object of the invention to provide a zoom optical system suitable for video cameras and digital cameras, and an imaging system that incorporates the same.

To accomplish the above object, the present invention provides a zoom optical system, comprising, in order from an object side thereof, a first lens group having a generally negative refracting power and a second lens group having a generally positive refracting power, wherein:

said first lens group comprises a negative single lens element including at least one aspheric surface and a positive single lens element with an air separation interposed between said negative single lens element and said positive single lens element, said second lens group comprises four lens elements inclusive of, in order from an object side thereof, a positive lens element, a cemented lens consisting of a positive lens element and a negative lens element and a positive lens element wherein the number of all lens elements is four, and further comprises at least one aspheric surface, and said zoom optical system is operable to vary a spacing between said lens groups for zooming and satisfies the following conditions:

$$1.1 < |f_1|/\sqrt{(f_W \cdot f_T)} < 2.2 \tag{1}$$

$$70° < 2\omega_W < 85° \tag{2}$$

$$15° < 2\omega_T < 24° \tag{3}$$

where $f_W$ is the focal length of the zoom optical system at the wide-angle end thereof, which satisfies condition (2), $f_T$ is the focal length of the zoom optical system at the telephoto end thereof, which satisfies condition (3), $f_1$ is the focal length of the first lens group, $\omega_W$ is the maximum image pickup half angle of view at the wide-angle end, and $\omega_T$ is the maximum image pickup half angle of view at the telephoto end.

Another zoom optical system of the invention comprises, in order from an object side thereof, a first lens group having a generally negative refracting power, a second lens group having a generally positive refracting power and a third lens group comprising a positive single lens element wherein the number of said lens element is one, wherein:

said first lens group comprises three lens elements inclusive of, in order from an object side thereof, a negative single lens element, a negative single lens element comprising an aspheric surface and a positive single lens element with an air separation interposed between said negative single lens element and said positive single lens element, said second lens group comprises four lens elements inclusive of, in order from an object side thereof, a positive lens element, a cemented lens consisting of a positive lens element and a negative lens element and a positive lens element wherein the number of all lens elements is four, and further comprises at least one aspheric surface, and said zoom optical system is operable to vary a spacing between adjacent lens groups for zooming and satisfies the following conditions:

$$1.1 < |f_1|/\sqrt{(f_W \cdot f_T)} < 2.2 \quad (1)$$

$$70° < 2\omega_W < 85° \quad (2)$$

$$15° < 2\omega_T < 24° \quad (3)$$

$$1.5 < (R_b + R_a)/(R_b - R_a) < 3 \quad (4)$$

$$0.6 < R_{2FR}/R_{2FF} < 1.0 \quad (11)$$

where $f_W$ is the focal length of the zoom optical system at the wide-angle end thereof, which satisfies condition (2), $f_T$ is the focal length of the zoom optical system at the telephoto end thereof, which satisfies condition (3), $f_1$ is the focal length of the first lens group, $\omega_W$ is the maximum image pickup half angle of view at the wide-angle end, $\omega_T$ is the maximum image pickup half angle of view at the telephoto end, $R_a$ is the axial radius of curvature of the object-side surface of the lens element located nearest to the object side in the second lens group, $R_b$ is the axial radius of curvature of the image plane-side surface of the lens element located nearest to the object side in the second lens group, $R_{2FF}$ is the axial radius of curvature of the surface of the cemented lens located nearest to the object side in the second lens group, and $R_{2FR}$ is the axial radius of curvature of the surface of the cemented lens located nearest to the image side in the second lens group.

Yet another zoom optical system of the invention comprises, in order from an object side thereof, a first lens group of negative refracting power, a second lens group of positive refracting power, and an aperture stop located on an image side with respect to said first lens group and having a variable aperture area, and has a zoom ratio of at least 3.4, wherein:

upon zooming from the wide-angle end to the telephoto end, a spacing between the respective lens groups is varied while said aperture stop moves in the same direction as does said second lens group, and the maximum area of an aperture portion in said aperture stop upon phototaking is smaller at the wide-angle end than at the telephoto end, with satisfaction of the following conditions (21) and (22):

$$-2 < f_1/\sqrt{(f_W \cdot f_T)} < -1 \quad (21)$$

$$1.05 < S_T/S_W < 4 \quad (22)$$

where $f_1$ is the focal length of the first lens group, $f_W$ is the focal length of the zoom optical system at the wide-angle end, $f_T$ is the focal length of the zoom optical system at the telephoto end, $S_W$ is the maximum area of the aperture portion in the aperture stop at the wide-angle end upon phototaking, and $S_T$ is the maximum area of the aperture portion in the aperture stop at the wide-angle end upon phototaking.

Advantages of, and requirement for the arrangements constructed according to the invention are now explained.

For size reductions of two-group zoom optical systems of negative-positive construction from their object sides, so far commonly used as zoom lenses for silver-halide film cameras, it is preferable to set an entrance pupil for the first lens group at a shallow position and increase the magnification of the positive rear lens group (the second lens group) at each focal length.

It is also known that an additional positive lens is added as a third lens group on an image side with respect to the second lens group so that the spacing between the respective lens groups can be varied upon zooming from the wide-angle end to the telephoto end. This third lens group could possibly be used for focusing as well. To obtain a zoom optical system well fit for video or digital cameras having an image pickup device, however, it is required to direct light to an image-formation position substantially parallel with the optical axis of the optical system. Furthermore, it is necessary to provide proper distribution of power to the second lens group and make proper correction for aberrations at the second lens group having an increased magnification.

The first lens group requires a negative lens and a positive lens for correction of chromatic aberrations, and if that negative lens is located nearest to the object side, it is then easy to make the angle of view wide with performance deterioration minimized.

Preferably in the invention, the first lens group is composed of, from its object side, a negative lens, a negative lens and a positive lens, and especially three lenses such that a first negative lens of meniscus shape convex on its object side, a second negative lens of meniscus shape convex on its object side and a third positive lens of meniscus shape convex on its object side. With this arrangement wherein two negative lenses of meniscus shape convex on their object sides are located on the object side, the angle of view can be kept large at the wide-angle end and off-axis light rays can be gradually bent to make good correction of off-axis aberrations, if any.

It is also preferable that the negative lens in the first lens group is composed of an aspheric surface, and that an air spacing is interposed between the negative lens and the positive lens. By correcting aberrations at both surfaces of this air spacing, off-axis performance for distortions or the like can be improved, and by using a single lens for each of the negative and positive lenses, the number of lenses involved can be reduced.

Preferably, the second lens group is composed of, in order from its object side, a positive lens, a cemented lens consisting of a positive lens and a negative lens and a positive lens, four lenses in all, because the sensitivity of lens parts and a frame for holding them to decentration due to fabrication errors can be minimized. It is also preferable that the lens located nearest to the object side in the second lens group has at least one aspheric surface, and that zooming is carried out by varying the spacing between the respective lens groups. It is then preferable to satisfy conditions (1) to (3).

Condition (1) defines a proper range of the sharing of refracting power in the first lens group. Coming short of the lower limit of 1.1 is not preferable, because the magnification of the second lens group becomes too high to be vulnerable to optical performance deterioration due to fabrication errors. Exceeding the upper limit of 2.2 is unfavorable for size reductions, because the optical system at the wide-angle end tends to become long.

That lower limit should be set at preferably 1.2, and more preferably 1.3, and the upper limit should be set at preferably 1.9, and more preferably 1.7, as in the following conditions (1') and (1").

$$1.2 < |f_1|/\sqrt{(f_W \cdot f_T)} < 1.9 \tag{1'}$$

$$1.3 < |f_1|/\sqrt{(f_W \cdot f_T)} < 1.7 \tag{1''}$$

Condition (2) defines the range of an angle of view at the wide-angle end that is a precondition for $f_W$ in condition (1) which the zoom optical system of the invention should satisfy. The lower limit should be set at preferably 72° and more preferably 75°, and the upper limit should be set at preferably 83° and more preferably 81°, as in the following conditions (2') and (2").

$$72° < 2\omega_W < 83° \tag{2'}$$

$$75° < 2\omega_W < 81° \tag{2''}$$

Condition (3) defines the range of an angle of view at the telephoto end that is a precondition for $f_T$ in condition (1) which the zoom optical system of the invention should satisfy. The lower limit should be set at preferably 16° and more preferably 17°, and the upper limit should be set at preferably 23.5° and more preferably 23°, as in the following conditions (3') and (3")

$$16° < 2\omega_T < 23.5° \tag{3'}$$

$$17° < 2\omega_T < 23° \tag{3'}$$

The above-described arrangement lends itself well to an imaging system incorporating a zoom optical system wherein while incident light onto an image-formation plane is kept substantially parallel with the optical axis thereof, aberrations are well corrected all the way from the wide-angle end to the telephoto end.

Preferable for the zoom optical system of the invention, it is preferable that all the refracting surfaces in the first lens group and the refracting surfaces in the second lens group except the surface located to the image side are each convex on the object side. With this arrangement wherein the refracting surfaces in the first lens group located on an object side of the zoom optical system with respect to a stop are all convex on the object side, since off-axis light rays are gradually bent, the amount of off-axis aberrations produced at the wide-angle end can be diminished. By permitting the refracting surfaces in the second lens group to be convex on the object side, the principal points can be positioned closer to the object side, so that the spacing between the second lens group and the first lens group can be narrower and, hence, high zoom ratios can be more easily ensured. It should be understood that the surface located nearest to the image side in the second lens group could be convex on the image side for the purpose of correcting off-axis aberrations such as spherical aberrations and coma occurring at the lens surfaces before that surface.

Preferably, the second negative lens in the first lens group is composed of an aspheric lens. The image side-concave surface—having a small radius of curvature—of the second lens group can have a degree of flexibility in correction of aberrations, because of being in contact with air. If the first negative lens located nearest to the object side is composed of an aspheric lens, then distortion occurring throughout a wider-angle arrangement may possibly be corrected. In consideration of a balance between an added cost resulting from a larger lens diameter and correction of other aberrations, however, it is still desirable to use an aspheric lens for the second negative lens, thereby making efficient correction for distortion and field of curvature. In this case, the aspheric surface should increase in the radius of curvature with distance from the optical axis toward its periphery; it is desired that the aspheric surface on the image side of the second negative lens in the first lens group satisfies the following condition (8).

$$38° < \theta < 64° \tag{8}$$

Here θ is the maximum value of an angle that the optical axis makes with a normal to the image plane side-aspheric surface of the second negative lens in the range of an effective light beam.

As the lower limit of 38° to condition (8) is not reached, any sufficient correction of aberrations can never be made because of a limited amount of asphericity, and exceeding the upper limit of 64° is not favorable for size reductions, because the optical system becomes long at the wide-angle end with an increased outer diameter. The lower limit should be set at preferably 40° and more preferably 46°, while the upper limit should be set at preferably 62° and more preferably 60°, as in the following conditions (8') and (8").

$$40° < \theta < 62° \tag{8'}$$

$$46° < \theta < 60° \tag{8''}$$

Preferably, the lens located nearest to the object side in the second lens group is configured in a meniscus shape that includes an aspheric surface at the surface located nearest to the object side and is convex on its object side. It is also preferable that the shape of the lens located nearest to the object side in the second lens group satisfies condition (4).

The lower limit of condition (4) should be set at preferably 2.0 and more preferably 2.3, while the upper limit should be set at preferably 2.9 and more preferably 2.8, as in the following conditions (4') and (4").

$$2.0 < (R_b + R_a)/(R_b - R_a) < 2.9 \tag{4'}$$

$$2.3 < (R_b + R_a)/(R_b - R_a) < 2.8 \tag{4''}$$

This arrangement enables the principal point positions of the second lens group to be brought closer to the object side while spherical aberrations and coma are kept small.

Preferably, the cemented lens in the second lens group is convex on the object side, the axial radii of curvature of both its object-and-image-side surfaces have close values as represented by condition (11), the image-side surface has the strongest negative power in the second lens group, and the cemented lens is in a meniscus shape that satisfies the following condition (12) or (13). This type is more difficult to have a larger front lens diameter than a positive-lens-unit-leadoff-type zoom lens, and so the aperture stop is preferably located just before the object-side surface in the second lens group. More preferably, the aperture stop is integral with the second lens group in view of simplicity of the mechanism involved. In addition, the F-number difference between the wide-angle end and the telephoto end can be kept small because of little or no dead space when the lenses are received at a collapsible lens mount.

By using the cemented lens as a part of the second lens group, it is possible to suppress aberrations produced by relative decentration of the negative lens in particular with respect to the positive lens. Preferably, the cemented lens component is such that as much aberration as possible is canceled out therein to reduce decentration sensitivity, and the degree of relative decentration with respect to the remaining single positive lens component is reduced. Preferably, the cemented lens satisfies condition (11).

Exceeding the upper limit of 1.0 to condition (11) may be favorable for correction of spherical aberrations, coma and astigmatism throughout the optical system, but there is a small effect of cementation on slacking of decentration sensitivity. As the lower limit of 0.6 is not reached, correction of spherical aberrations, coma and astigmatism throughout the optical system tends to become difficult.

More preferably, $$0.65 < R_{2FR}/R_{2FF} < 0.95 \tag{11'}$$

Even more preferably, $$0.7 < R_{2FR}/R_{2FF} < 0.9 \tag{11''}$$

For the cemented lens component in the second lens group, it is also preferable to satisfy the following condition (12):

$$0.22 < R_{2FR}/f_T < 0.40 \tag{12}$$

where $f_T$ is the focal length of the zoom optical system at the telephoto end, which satisfies condition (3), and $R_{2FR}$ is the axial radius of curvature of the surface nearest to the image side of the cemented lens in the second lens group.

As the upper limit of 0.40 to condition (12) is exceeded, decentration sensitivity becomes too strong, and the effect of cementation on slacking of decentration sensitivity becomes small. As the lower limit of 0.22 is not reached, aberrations throughout the optical system remain undercorrected.

More preferably, $$0.23 < R_{2FR}/f_T < 0.38 \tag{12'}$$

Even more preferably, $$0.24 < R_{2FR}/f_T < 0.36 \tag{12''}$$

For the cemented lens component in the second lens group, it is also preferable to satisfy the following condition (13):

$$1.0 < R_{2FR}/f_W < 1.7 \tag{13}$$

where $f_W$ is the focal length of the zoom optical system at the wide-angle end, which satisfies condition (2), and $R_{2FR}$ is the axial radius of curvature of the surface nearest to the image side of the cemented lens in the second lens group.

As the upper limit of 1.7 to condition (13) is exceeded, decentration sensitivity becomes too strong as in the foregoing, and the effect of cementation on slacking of decentration sensitivity becomes small. As the lower limit of 1.0 is not reached, aberrations throughout the optical system remain undercorrected.

More preferably, $$1.1 < R_{2FR}/f_W < 1.6 \tag{13'}$$

Even more preferably, $$1.2 < R_{2FR}/f_W < 1.5 \tag{13''}$$

When focusing is carried out with the third lens group located on the image side of the second lens group, a problem arises with aberration fluctuations. As asphericity in an amount larger than required is introduced in the third lens group, however, astigmatism remaining at the first and second lens groups must be corrected at the third lens group so as to make that asphericity effective. Moving the third lens group for focusing is not preferable because that balance tilts. Accordingly, when focusing is carried out with the third lens group, nearly all astigmatism must be removed at the first and second lens groups throughout the zooming zone. It is thus preferable that the first and second lens groups be composed as described above, and that the third lens group is composed of a spherical system or a reduced amount of asphericity. If the third lens group is composed of a positive single lens, substantial cost reductions can then be favorably achieved.

Regarding the achievement of high zoom ratios, it is preferable to satisfy the following condition (14):

$$-2.5 < d_W/f_1 < -1.0 \tag{14}$$

where $d_W$ is the distance from the surface nearest to the image side in the first lens group to the surface nearest to the object side in the second lens group at the wide-angle end.

Condition (14) defines the relation of the spacing between the first lens group and the second lens group with the power of the first lens group. By satsifying this condition, it is possible to obtain a zoom optical system suitable for a tradeoff between a larger-angle-of-view arrangement and a higher-zoom-ratio arrangement. As the upper limit of −1.0 of this condition is exceeded, the spacing between the first lens group and the second lens group becomes too wide to achieve compactness at the wide-angle end, and as the lower limit of −2.5 is not reached, no sufficiently high zoom ratio is obtainable.

More preferably, $$-2.3 < d_W/f_1 < -1.3 \tag{14'}$$

Even more preferably, $$-2.1 < d_W/f_1 < -1.5 \tag{14''}$$

Preferably, the zoom optical system of the invention is composed in such a way as to satisfy the following condition (5) or (6):

$$v_{pi} \leq v_{pi+1} (i=1, 2) \tag{5}$$

$$v_{pi} \leq v_{pi+1} (i=1, 2, 3) \tag{6}$$

where $v_{pi}$ is the Abbe number of an i-th positive lens as counted from the object side.

Conditions (5) and (6) are provided to make well-balanced correction for longitudinal chromatic aberration and chromatic aberration of magnification. Especially when the aperture stop is arranged between the first lens group and the second lens group, it is preferable to use a vitreous material of lower dispersion for a positive lens on the image side of the aperture stop located with distance from that stop, because the chromatic aberration of magnification can be well corrected.

The zoom optical system of the invention is composed in such a way as to satisfy the following condition:

$$n_{ni} \leq n_{ni+1} (i=1, 2, \ldots, m) \tag{7}$$

where m is the number of negative lenses throughout the lens system, and $n_{ni}$ is the refractive index of an i-th negative lens as counted from the object side.

For well-balanced correction of chromatic aberration of magnification, Petzval's sum and spherical aberrations, it is desired to satisfy condition (7).

When the zoom optical system of the invention further comprises a third lens group on the image side of the second lens group, it is desired that the third lens group consists of one positive lens and satisfies the following condition:

$$v_{p5} - v_{p1} > 40 \tag{9}$$

where $v_{p1}$ is the Abbe number of the positive single lens in the first lens group, and $v_{p5}$ is the Abbe number of the positive lens in the third lens group.

By allowing the first lens group and the second lens group to take primarily on zooming and correction of aberrations and constructing the third lens group of one lens, the whole lens barrel can be slimmed down.

More preferably, $$v_{p5}-v_{p1}>43 \qquad (9')$$

Even more preferably, $$v_{p5}-v_{p1}>46 \qquad (9'')$$

Condition (9) implies that the third lens group is formed of a low-dispersion glass, and that chromatic aberration of magnification can be diminished through the above-mentioned arrangement.

Preferably, all the negative lenses in the first lens group are provided with multicoatings on their object-side surfaces and with single-layer coatings on their image-side surfaces. A multicoating is applied onto the object-side surface of the meniscus lens that has a large radius of curvature to bring its reflectivity down, so that the influence of ghost light can be reduced. It is preferable to apply a single-layer coating onto the image side-surface that has a small radius of curvature, because that is helpful for stabilization of the reflectivity of the rim portion of the lens.

It is also preferable to satisfy the following condition (10):

$$D_{11}>D_{12}>D_{31}>D_{22}>D_{21} \qquad (10)$$

where $D_{11}$ is the maximum effective diameter of the surface nearest to the object side in the first lens group throughout the zooming zone, $D_{12}$ is the maximum effective diameter of the surface nearest to the image side in the first lens group throughout the zooming zone, $D_{31}$ is the maximum effective diameter of the surface nearest to the object side in the third lens group throughout the zooming zone, $D_{22}$ is the maximum effective diameter of the surface nearest to the image side in the second lens group throughout the zooming zone, and $D_{21}$ is the maximum effective diameter of the surface nearest to the object side in the second lens group throughout the zooming zone.

Regarding the first lens group, it is preferable to increase the diameter of a lens nearer to the object side, because light rays with a wide angle of view can be passed through the lens group while the whole group size is kept small. Regarding the second and subsequent lens groups, it is preferable to increase the diameter of a lens nearer to the image plane side and bring the object-side surface of the lens in contact with the lens barrel, because it is possible to decrease coma and field of curvature attributable to the decentration of the lenses due to fabrication errors in lens barrel's inner diameter and lens's outer diameter. It is also preferable to increase the outer diameter of a lens located far away from the stop, because it is possible to decrease deterioration in the quantity of rim rays at phototaken images.

The zoom optical system of the invention is also designed such that focusing on a near distance object point can be carried out by movement of the third lens group. If focusing is carried out by movement of the third lens group, then the barrel construction for other lens group can be simplified.

Further, electronic imaging pickup devices such as CCDs or CMOSs may be used as an image pickup device.

Furthermore, if a finder optical system for viewing subjects is provided on an optical path different from that for the zoom optical system, it is then possible to make power consumption lower as compared with when the subjects are viewed through a liquid crystal monitor mounted on an imaging system, etc.

Now, the third zoom optical system of the invention is explained.

According to the third zoom lens of the invention, the first lens group of negative refracting power, the aperture stop having a variable aperture area and the second lens group of positive refracting power that moves in the same direction as does the stop during zooming are located in this order. This lens type is constructed in the form of a retrofocus type wherein a wider-angle arrangement can be easily set up and the diameter of the first lens group can be smaller than a positive-lens-unit-leadoff-type zoom lens. It is thus possible to obtain a small-format zoom lens without increasing lens barrel size.

Since the image of the aperture stop as viewed from the entrance side becomes larger with distance from the wide-angle side, F-number changes can be easily restrained.

Here, when the zoom lens is constructed with a zoom ratio of as high as 3.4 or greater, F-number changes become too large as described above, rendering it difficult to correct aberrations with a small lens arrangement.

To reduce the size of, and enhance the performance of a negative-lens-unit-leadoff-type zoom lens having a zoom ratio of as high as 3.4 or greater, the third zoom lens system of the invention is designed such that the maximum area upon phototaking of an aperture portion in the aperture stop is smaller at the wide-angle end than at the telephoto end, thereby keeping F-number changes small.

As the lower limit of 3.4 to this zoom ratio is not satisfied, there is little influence on optical performance even when the maximum area of the aperture portion in the variable stop is kept constant; the merit of reducing the aperture area at the wide-angle end become small.

It is understood that the diameter of the lens group positioned in front of the stop is largely affected by an effective light beam at or near the wide-angle end. As the aperture area of the stop at the wide-angle end becomes small, however, the diameter of the lenses in front of the stop can be diminished. This spillover effect on such a diameter decrease is particularly true in the case where there is only one lens group of negative refracting power in front of the stop.

In addition, conditions (21) and (22) should be satisfied according to the invention.

Condition (21) defines the focal length of the first lens group in terms of the average focal length of the zoom lens for the purpose of making the whole zoom lens compact.

As the upper limit of −1 to condition (21) is exceeded or the focal length of the first lens group becomes short, the magnification of the second lens group at the telephoto end tends to become too large, often leading to some large performance deterioration due to fabrication errors, and the diameter of the second lens group tends to become large as well. As the lower limit of −2 is not reached or the focal length of the first lens group becomes large, on the other hand, the zoom lens becomes long at the wide-angle end, and the diameter of the first lens group tends to become large. This in turn leads to an increase in the whole size of an associated camera body and some considerable design restrictions. When aspheric surfaces are used for the first lens group, their processing cost rises.

Condition (22) defines the ratio between the maximum area $S_W$ of the aperture portion in the aperture stop upon phototaking at the wide-angle end and the maximum area $S_T$ of the aperture portion in the aperture stop upon phototaking at the telephoto end.

To achieve a high zoom ratio with the aforesaid zoom lens arrangement of negative power at the front, it is preferable to increase the full-aperture area, because when the full-aperture area (the maximum area of the aperture portion in the aperture stop upon phototaking) on the telephoto side is small, resolution tends to drop under the influence of diffraction. As the lower limit of 1.05 to condition (22) is not reached or the maximum area ratio becomes small, the full-aperture area at the telephoto end becomes as small as can be vulnerable to the influence of diffraction, or the full-aperture area at the wide-angle end becomes too large for correction of coma. As the upper limit of 4 is exceeded, on the other hand, the full-aperture area at the wide-angle end becomes too small, resulting in some considerable limitation on control of light quantity.

Preferably, the lower limit to condition (21) should be set at −1.7, especially −1.6 while the upper limit should be set at −1.2, especially −1.35.

Preferably, the lower limit to condition (22) should be set at 1.2, especially 1.3 while the upper limit should be set at 3, especially 2.

It is here noted that the upper limit to the zoom ratio should preferably be set at 5.5. A high zoom ratio that is greater than 5.5 is easily achievable with a zoom lens comprising a positive lens group at the front.

For the third zoom optical system of the invention, it is preferable that the first lens group comprises a negative lens including at least one aspheric surface and a positive lens, the second lens group comprises at least one aspheric surface, a third lens group is located on the image side of the second lens group, and focusing on a near distance object point is carried out by movement of the third lens group.

To make the angle of view at the telephoto end wide, it is preferable that a negative lens having an aspheric surface(s) is located in the first lens group having negative refracting power. This negative lens cooperates with the positive lens in the first lens group to facilitate correction of chromatic aberrations, etc. In this case, it is the second lens group that has a chief refracting power, and incorporation of an aspheric surface(s) therein facilitates correction of both axial and off-axis aberrations. A lens barrel can be simplified and slimmed down by adoption of a rear focusing mode by the third lens group.

Referring here to the aperture shape of the aperture stop, it is preferable that the maximum aperture shape upon phototaking at the telephoto end is substantially circular, and the maximum aperture upon phototaking at the wide-angle end is configured by up to 7 stop blades.

To achieve beautiful blurred images, it is preferable that the shape of the aperture stop is as close to a circle as possible, because the depth of subject becomes shallow at the telephoto end. More exactly, the aperture stop should preferably be of substantially circular shape wherein the value found by dividing the minimum length by the maximum length of the diameter of the aperture portion inclusive of the optical axis is 0.95 or greater. To make the aperture stop smaller on the wide-angle side than at the telephoto end, it is preferable that stop blades are located in such a way as to overlap a circular aperture that provides an aperture stop at the telephoto end, thereby forming a small aperture portion. In view of blurred images, the more the stop blades, the closer the shape of the aperture stop is to a circle at the wide-angle end. However, if a stop member between the first and second lens groups becomes thick, that is unfavorable for high zoom ratios, because the lens arrangement upon received at a collapsible lens mount becomes thick or it is impossible to render the spacing between the first and second lens groups narrow. For this reason, the number of stop blades should be limited to up to 7.

Preferably, the aperture shape of the aforesaid aperture stop should be configured by two stop blades at the wide-angle end.

Constructing the aperture stop of two stop blades is favorable for high zoom ratios, because the stop member is simplified and it is easy to narrow down the spacing between the first and second lens groups.

Further, it is preferable to satisfy the following conditions (23) and (24):

$$-0.01 < M_W/f_W < -0.002 \quad (23)$$

$$-0.006 < M_T/f_W < 0.015 \quad (24)$$

where $M_W$ is a d-line amount of spherical aberrations at a position corresponding to 0.7 of the aperture ratio of a circle whose center is on the optical axis and which has the same area as the maximum area of the aperture portion in the aperture stop upon phototaking at the wide-angle end, $M_T$ is a d-line amount of spherical aberrations at a position corresponding to 0.7 of the aperture ratio of a circle whose center is on the optical axis and which has the same area as the maximum area of the aperture portion in the aperture stop upon phototaking at the telephoto end, and $f_W$ is the focal length of the zoom lens system at the wide-angle end.

For well-balanced reductions of aberrations throughout the optical system from the wide-angle end to the telephoto end, it is preferable that spherical aberrations at the wide-angle end remain slightly under-corrected and spherical aberrations at the telephoto end are reduced down to nearly zero or remain slightly over-corrected so that conditions (23) and (24) are satisfied at the same time.

As the lower limit of −0.01 to condition (23) is not reached or negative spherical aberrations at the wide-angle end become large, resolution on the wide-angle end side becomes noticeably worse.

As the upper limit of −0.002 to condition (23) is exceeded, some more lenses are often needed for satisfaction of condition (24).

As the lower limit of −0.006 to condition (24) is not reached or spherical aberrations at the telephoto end remain undercorrected, some more lenses are often needed for correction of aberrations that satisfies condition (23).

As the upper limit of 0.015 to condition (24) is exceeded or spherical aberrations at the telephoto end remain over-corrected, resolution on the telephoto end side becomes noticeably worse.

Preferably, the lower limit to condition (23) should be set at −0.008, especially −0.007 or the upper limit should be set at −0.003.

Preferably, the lower limit to condition (24) should be set at −0.002, especially 0, more especially 0.003 or the upper limit should be set at 0.01, especially 0.008.

Further, it is desired that the first lens group comprise, in order from its object side, up to two negative meniscus lenses, each convex on its object side, and one positive meniscus lens convex on its object side.

This arrangement enables the farthest off-axis light beam to be gently refracted, and the negative lens cooperates with the positive lens to facilitate correction of chromatic aberrations, etc. It is thus possible to achieve a wide-angle zoom lens.

Furthermore, it is desired that the first lens group comprises negative meniscus lenses each convex on its object side, and all such negative lenses are provided with multi-coatings on their object-side surfaces and single-layer coatings on their image-side surfaces.

A multicoating is applied onto the object-side surface of each meniscus lens having a large radius of curvature, so that its reflectivity can be brought down to reduce the influence of ghost light. For the image-side surface of the meniscus lens having a small radius of curvature, it is preferable to have a single-layer coating, because the reflectivity of the rim portion of the lens can be easily stabilized.

Preferably, the second lens group consists of, in order from its object side, a positive lens convex on its object side, a positive lens convex on its object side, a negative lens and a positive lens, four lenses in all.

The second lens group is operable to move for a chief portion of zooming, and so it is preferable that the second lens group is composed of a positive lens component, a negative lens component and a positive lens component for the purpose of suppressing aberration fluctuations and facilitating correction of various aberrations.

To bring the principal points of the second lens group nearer to the object side to achieve a high zoom ratio, it is preferable that the positive lens component is composed of two positive lenses, each convex on its object side.

As described above, the second lens group is composed of a positive lens convex on its object side, a positive lens convex on its object side, a negative lens and a positive lens, four lenses in all, so that aberration fluctuations due to the high zoom ratio can be suppressed with a few lenses.

In this case, the negative lens in the second lens group could be cemented to either one of the adjacent positive lenses, so that chromatic aberrations could be better corrected.

Alternatively, the negative lens in the second lens group could be cemented to the adjacent lens on the object side and the concave surface of that negative lens could be in contact with a space on the image side, so that the principal points of the second lens group could be easily brought nearer to the object side while the function of correcting chromatic aberrations is maintained.

Preferably, a third lens group of positive refracting power is located on the image side of the second lens group to set up a three-group-type zoom lens.

With this three-group-type zoom lens, it is easy to make emergent light beams toward the image side parallel while the lenses received at a collapsible lens mount are kept thin. In particular, it is suitable for a zoom lens used for electronic imaging systems having an electronic image pickup device. In view of compactness, the third lens group should preferably be composed of one lens.

For the three-group-type zoom lens wherein the third lens group of positive refracting power is located on the mage side of the second lens group, it is preferable that focusing on a near distance object point is carried out by movement of the third lens group, with satisfaction of the following conditions:

$$1.0 < f_2/\sqrt{(f_T \cdot f_W)} < 2.0 \quad (25)$$

$$1.6 < f_3/\sqrt{(f_T \cdot f_W)} < 3.6 \quad (26)$$

where $f_2$ is the focal length of the second lens group, and $f_3$ is the focal length of the third lens group.

Especially for the third zoom optical system composed of a first lens group of negative refracting power, a second lens group of positive refracting power and a third lens group of positive refracting power, it is preferable to have a proper refracting power in such a way as to satisfy the aforesaid conditions, because compactness, high zoom ratios and telecentricity can be easily satisfied.

As the lower limit of 1.0 to condition (25) with respect to the focal length of the second lens group is not reached, the focal length of the second lens group becomes too short with the result that aberrations tend to occur. As the upper limit of 2.0 is exceeded, compactness is hard to achieve because of an increase in the amount of movement of the second lens group.

Preferably, the lower limit to condition (25) should be set at 1.1, especially 1.3, more especially 1.5 while the upper limit should be set at 1.8, especially 1.7.

As the lower limit of 1.6 to condition (26) with respect to the focal length of the third lens group is not reached, it is difficult to gain telecentricity because of a large angle change in an emergent light beam at a high zoom ratio. As the upper limit of 3.6 is exceeded, the amount of focusing movement of the third lens group becomes large, leading to difficulty in a simplification of the arrangement involved, inclusive of a moving mechanism.

Preferably, the lower limit to condition (26) should be set at 1.8, especially 2.0, more especially 2.5 while the upper limit should be set at 3.2, especially 3.0.

Preferably, the aforesaid zoom lens is composed of up to three lens groups.

With this arrangement, the moving mechanism can be simplified with a deceased thickness of the lenses upon received at the collapsible lens mount. In particular, a three-group-type zoom lens of negative-positive-positive arrangement is best suited for use on a small-format electronic imaging system, because a basic two-group-type zoom lens of negative-positive arrangement is provided with a final positive lens group operable to locate the pupil at a far position.

Further, the spacing at the wide-angle end between the surface nearest to the image side in the first lens group and the aperture stop should preferably satisfy the following condition:

$$-3.0 < D_{1S}/f_1 < -0.8 \quad (27)$$

where $D_{1S}$ is the spacing at the wide-angle end between the surface nearest to the image side in the first lens group and the aperture stop.

Condition (27) is a requisite for suppressing an increase in the length of the zoom lens and easily imparting a high zoom ratio thereto. As the lower limit of -3.0 is not reached, the zoom lens becomes long at the wide-angle end or the focal length of the first lens group becomes short; in either case, aberrations tend to occur. As the upper limit of -0.8 is exceeded, a surface-to-surface spacing at the wide-angle end becomes narrow, rendering it difficult to obtain any high zoom ratio.

Preferably, the lower limit to condition (27) should be set at -2.5, especially -2, because the length of the zoom lens at the wide-angle end can be reduced or the upper limit should be set at -1.2, especially -1.6, because higher zoom ratios can be easily obtainable.

The above third zoom optical system, together with an image pickup device located on the image side thereof, can provide an imaging system. That zoom optical system is best suited for use on a small-format electronic imaging system.

For such an imaging system, it is preferable to have an angle of view of at least 70° at the wide-angle end upon phototaking.

A zoom lens having a high zoom ratio and an angle of view at least 70° at the wide-angle end upon phototaking is more preferable because the effect of satisfying conditions (21) and (22) is much more enhanced.

For the third zoom optical system as described above, it is preferable to satisfy the following condition (28):

$$D_{11} > D_{12} > D_{31} > D_{22} > D_{21} \qquad (28)$$

where $D_{11}$ is the maximum effective diameter of the surface nearest to the object side in the first lens group throughout the zooming zone, $D_{12}$ is the maximum effective diameter of the surface nearest to the image side in the first lens group throughout the zooming zone, $D_{31}$ is the maximum effective diameter of the surface nearest to the object side in the third lens group throughout the zooming zone, $D_{22}$ is the maximum effective diameter of the surface nearest to the image side in the second lens group throughout the zooming zone, and $D_{21}$ is the maximum effective diameter of the surface nearest to the object side in the second lens group throughout the zooming zone.

Regarding the first lens group, it is preferable to increase the diameter of a lens nearer to the object side, because light rays with a wide angle of view can be passed through the lens group while the whole group size is kept small. Regarding the second and subsequent lens groups, it is preferable to increase the diameter of a lens nearer to the image plane side and bring the object-side surface of the lens in contact with the lens barrel, because it is possible to decrease coma and field of curvature attributable to the decentration of the lenses due to fabrication errors in lens barrel's inner diameter and lens's outer diameter. It is also preferable to increase the outer diameter of a lens located far away from the stop, because it is possible to decrease drops in the quantity of rim rays at phototaken images.

When the maximum effective diameter of the second lens group is larger on the side nearest to the image plane, it is possible to reduce the reflection of a light beam incident on the second lens group at the edges of the lenses, thereby reducing the occurrence of ghost light.

Preferably, the above imaging system further comprise a memory section that bears information corresponding to the maximum aperture area depending on zooming and a control section capable of controlling the maximum aperture area of the aperture stop upon phototaking in response to the information from said memory section and the information about zooming.

Thus, the maximum aperture area at the time of phototaking is controlled by the control section in response to the information about zooming and the information from the memory section.

It should be understood that, in the invention, conditions (1) to (28) (inclusive of their subordinate conditions) could be applied in any combinations, and that some conditions could be omitted.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 11(a), 11(b) and 11(c) are aberration diagrams for Example 4 upon focused on an object point at infinity.

FIGS. 16(a), 16(b) and 16(c) are illustrative of the variable stop of FIG. 15 in a full-aperture state at the wide-angle end (a), in an aperture state (b) on the way to the telephoto end and in a full-aperture state at the telephoto end (c).

DESCRIPTION OF THE PREFERRED EMBODIMENTS

Examples 1–7 of the zoom lens (zoom optical system) of the invention are now explained. FIGS. 1–7 are illustrative in lens section of Examples 1–7 at the wide-angle end (a), in an intermediate state (b) and at the telephoto end (c) upon focused on an object point at infinity. Throughout these figures, a first lens group is indicated at G1, an aperture stop at S, a second lens group at G2, a third lens group at G3, a plane-parallel plate that forms a low-pass filter applied with an IR cut coat at LF, a plane-parallel plate for a cover glass in an electronic image pickup device at CG and an image plane at I. It should be noted that the cover glass CG may be provided with a wavelength range-limiting multilayer film, and that the cover glass CG may be allowed to have a low-pass filter action.

EXAMPLE 1

Figure 1A:
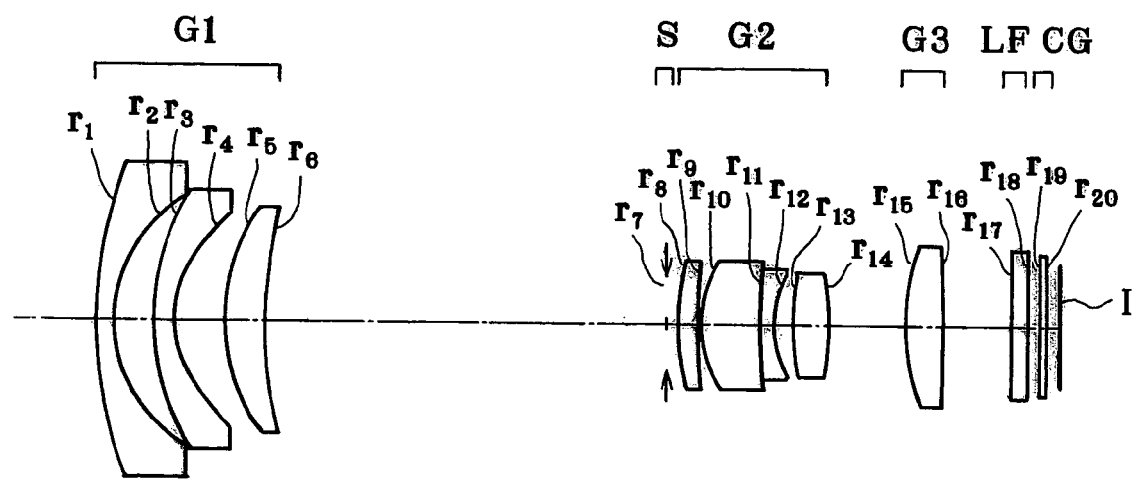
FIGS. 1(a), 1(b) and 1(c) are illustrative in lens section of Example 1 of the zoom lens (zoom optical system) of the invention at a wide-angle end (a), in an intermediate state (b) and at a telephoto end, upon focused on an object point at infinity.
Figure 1B:
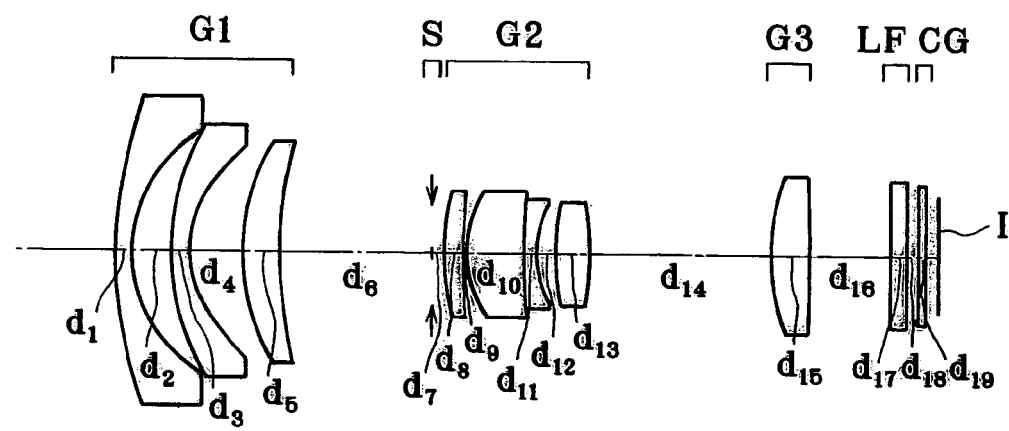
Figure 1C:
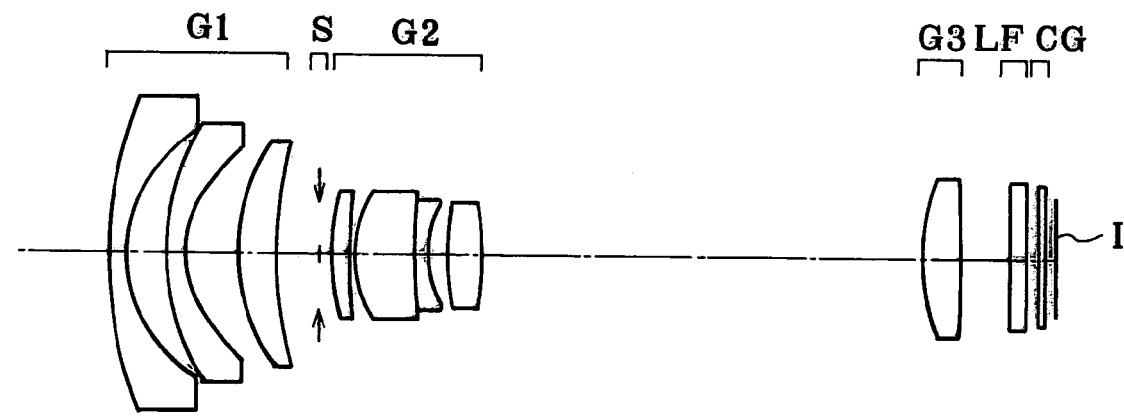

As shown in FIG. 1, Example 1 is directed to an image-formation optical system comprising, in order from its object side, a first lens group G1 of negative refracting power, an aperture stop S, a second lens group G2 of positive refracting power and a third lens group G3 of positive refracting power. Upon zooming from the wide-angle end to the telephoto end of the optical system, the first lens group G1 moves in a convex locus toward the image side of the optical system, and is positioned nearer to the image side at the telephoto end than at the wide-angle end. The second lens group G2 moves together with the aperture stop S monotonously toward the object side. The third lens group G3 moves in a convex locus toward the object side, and is positioned nearer to the image side at the telephoto end than at the wide-angle end.

The first lens group G1 is composed of, in order from its object side, two negative meniscus lenses each convex on the object side and a positive meniscus lens convex on its object side, the second lens group G2 is composed of, in order from its object side, a positive meniscus lens convex on its object side, a cemented lens consisting of a positive meniscus lens convex on its object side and a negative meniscus lens convex on its object side and a double-convex positive lens, and the third lens group G3 is composed of one double-convex positive lens.

Three aspheric surfaces are used; one at the image-side surface of the second negative meniscus lens in the first lens group G1, one at the surface nearest to the object side in the second lens group G2 and one at the surface nearest to the image side in the second lens group G2.

EXAMPLE 2

Figure 2A:
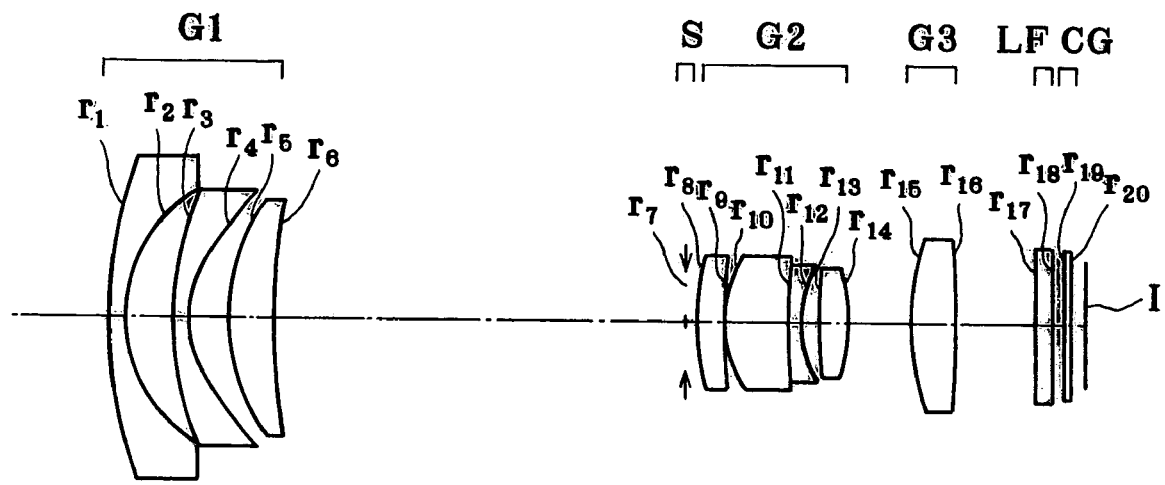
FIGS. 2(a), 2(b) and 2(c) are illustrative in lens section of the zoom lens of Example 2, as in FIGS. 1(a), 1(b) and 1(c).
Figure 2B:
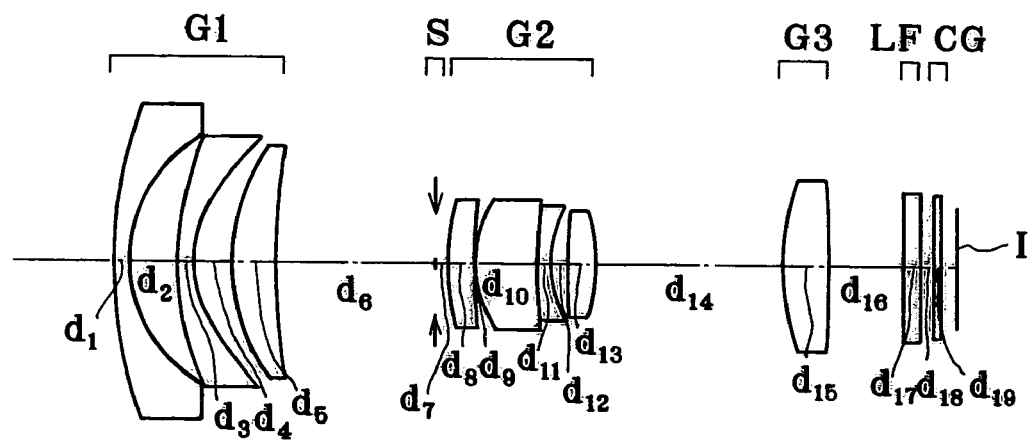
Figure 2C:
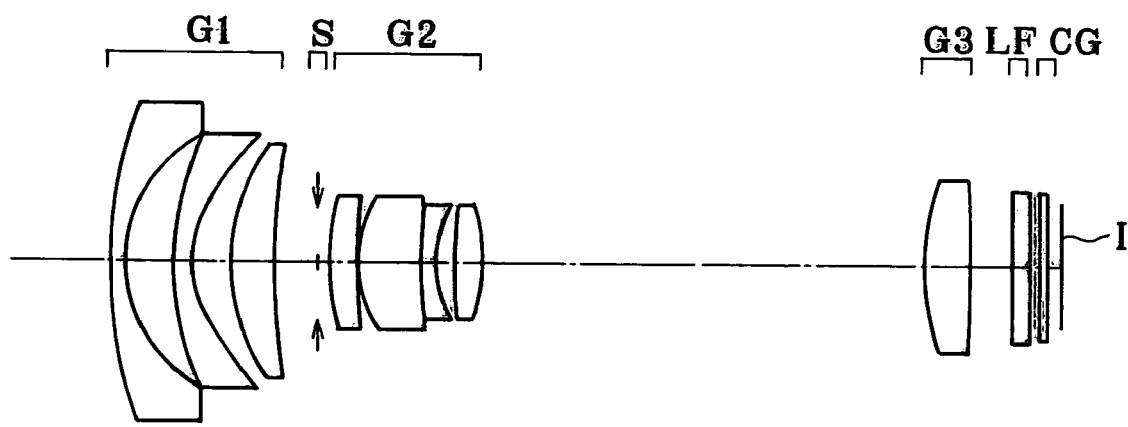

As shown in FIG. 2, Example 2 is directed to an image-formation optical system comprising, in order from its object side, a first lens group G1 of negative refracting power, an aperture stop S, a second lens group G2 of positive refracting power and a third lens group G3 of positive refracting power. Upon zooming from the wide-angle end to the telephoto end of the optical system, the first lens group G1 moves in a convex locus toward the image side of the optical system, and is positioned nearer to the image side at the telephoto end than at the wide-angle end. The second lens group G2 moves together with the aperture stop S monotonously toward the object side, and the third lens group G3 moves toward the image side.

The first lens group G1 is composed of, in order from its object side, two negative meniscus lenses each convex on the object side and a positive meniscus lens convex on its object side, the second lens group G2 is composed of, in order from its object side, a positive meniscus lens convex on its object side, a cemented lens consisting of a positive meniscus lens convex on its object side and a negative meniscus lens convex on its object side and a double-convex positive lens, and the third lens group G3 is composed of one double-convex positive lens.

Three aspheric surfaces are used; one at the image-side surface of the second negative meniscus lens in the first lens group G1, one at the surface nearest to the object side in the second lens group G2 and one at the object-side surface in the third lens group G3.

EXAMPLE 3

Figure 3A:
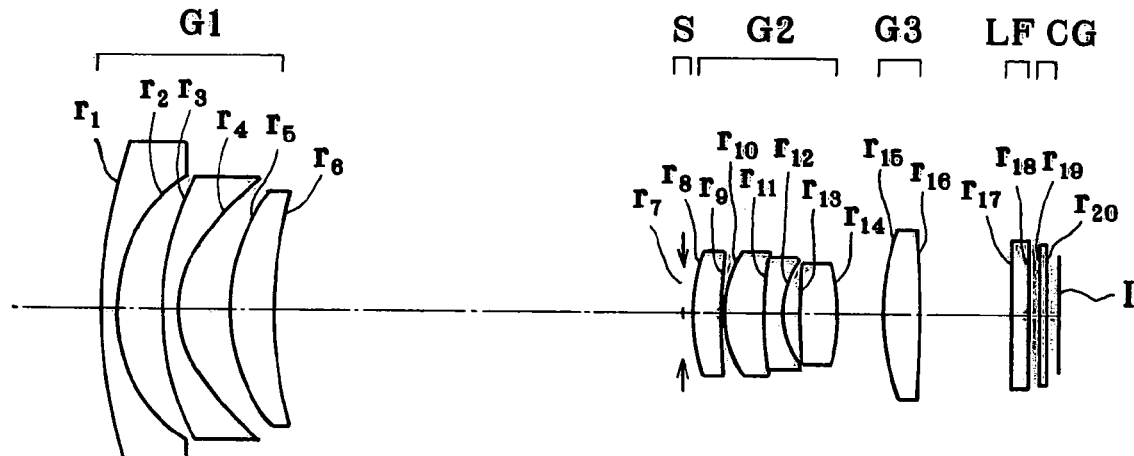
FIGS. 3(a), 3(b) and 3(c) are illustrative in lens section of the zoom lens of Example 3, as in FIGS. 1(a), 1(b) and 1(c).
Figure 3B:
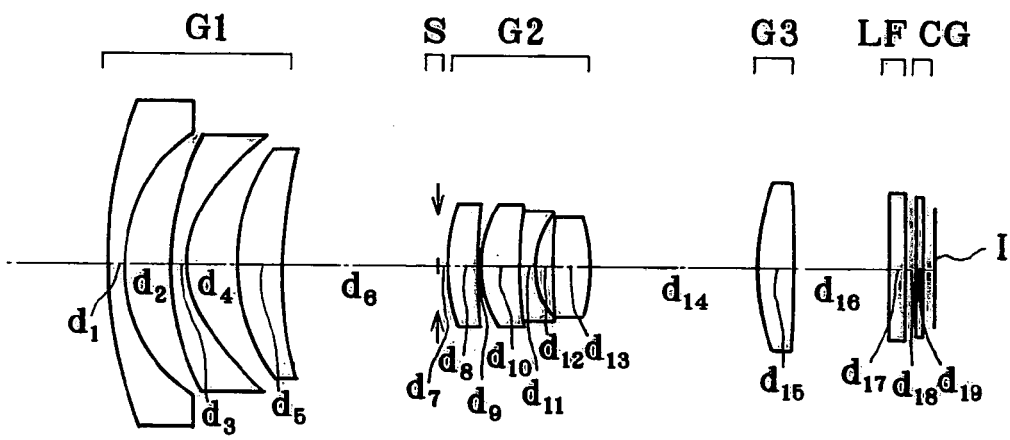
Figure 3C:
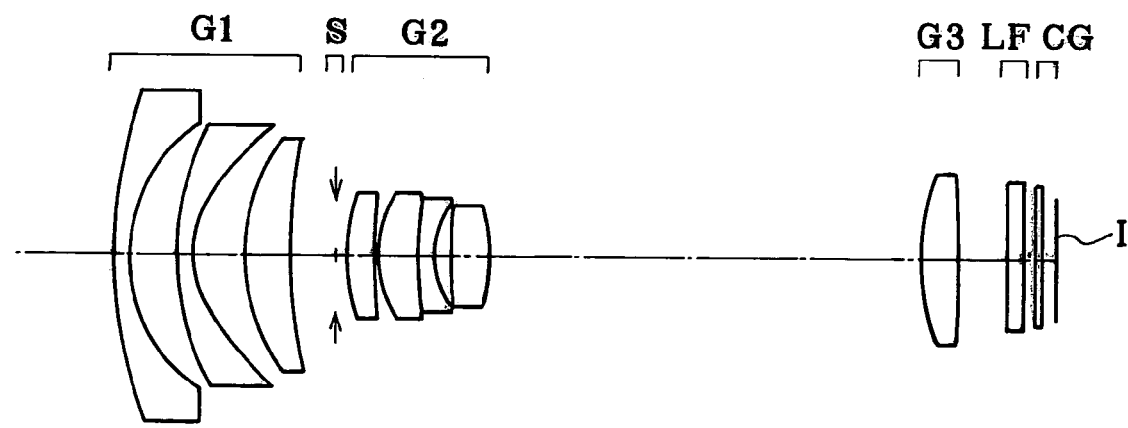

As shown in FIG. 3, Example 3 is directed to an image-formation optical system comprising, in order from its object side, a first lens group G1 of negative refracting power, an aperture stop S, a second lens group G2 of positive refracting power and a third lens group G3 of positive refracting power. Upon zooming from the wide-angle end to the telephoto end of the optical system, the first lens group G1 moves in a convex locus toward the image side of the optical system, and is positioned nearer to the image side at the telephoto end than at the wide-angle end. The second lens group G2 moves together with the aperture stop S monotonously toward the object side. The third lens group G3 moves in a convex locus toward the object side, and is positioned nearer to the image side at the telephoto end than at the wide-angle end.

The first lens group G1 is composed of, in order from its object side, two negative meniscus lenses each convex on the object side and a positive meniscus lens convex on its object side, the second lens group G2 is composed of, in order from its object side, a positive meniscus lens convex on its object side, a cemented lens consisting of a positive meniscus lens convex on its object side and a negative meniscus lens convex on its object side and a double-convex positive lens, and the third lens group G3 is composed of one double-convex positive lens.

Two aspheric surfaces are used; one at the image-side surface of the second negative meniscus lens in the first lens group G1 and one at the surface nearest to the object side in the second lens group G2.

EXAMPLE 4

Figure 4A:
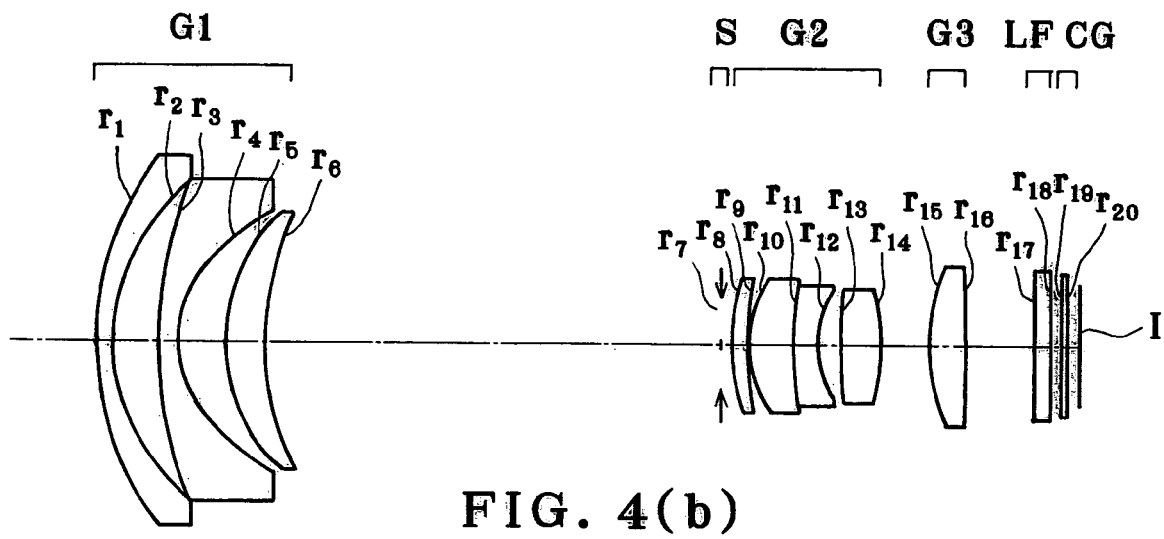
FIGS. 4(a), 4(b) and 4(c) are illustrative in lens section of the zoom lens of Example 4, as in FIGS. 1(a), 1(b) and 1(c).
Figure 4B:
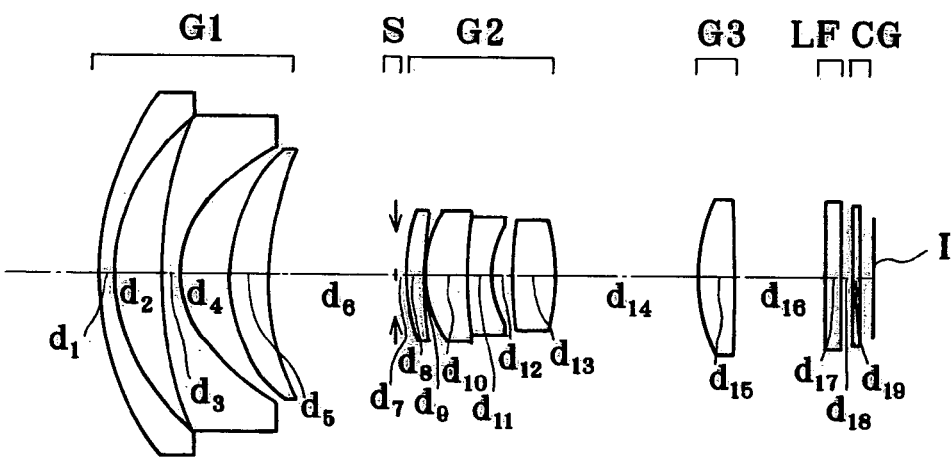
Figure 4C:
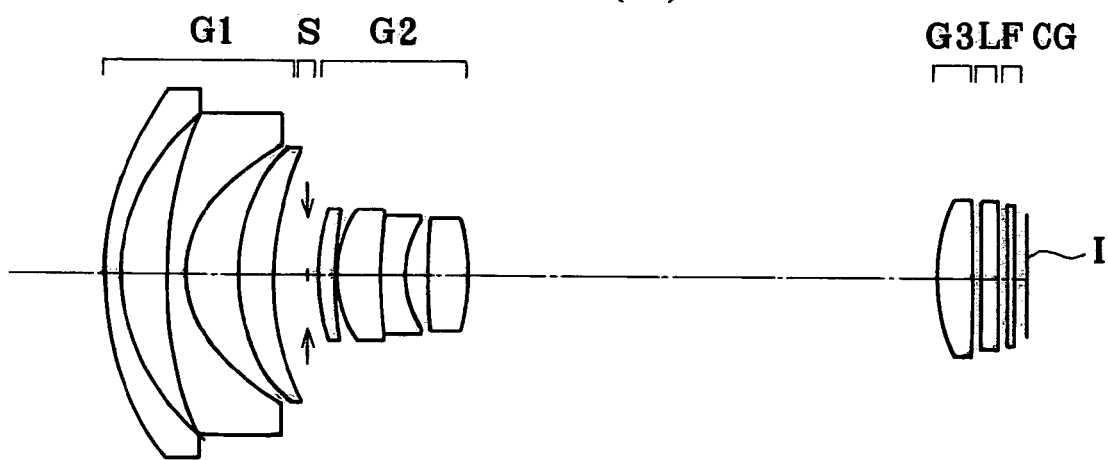

As shown in FIG. 4, Example 4 is directed to an image-formation optical system comprising, in order from its object side, a first lens group G1 of negative refracting power, an aperture stop S, a second lens group G2 of positive refracting power and a third lens group G3 of positive refracting power. Upon zooming from the wide-angle end to the telephoto end of the optical system, the first lens group G1 moves in a convex locus toward the image side of the optical system, and is positioned nearer to the image side at the telephoto end than at the wide-angle end. The second lens group G2 moves together with the aperture stop S monotonously toward the object side. The third lens group G3 moves in a convex locus toward the object side, and is positioned nearer to the image side at the telephoto end than at the wide-angle end.

The first lens group G1 is composed of, in order from its object side, two negative meniscus lenses each convex on the object side and a positive meniscus lens convex on its object side, the second lens group G2 is composed of, in order from its object side, a positive meniscus lens convex on its object side, a cemented lens consisting of a positive meniscus lens convex on its object side and a negative meniscus lens convex on its object side and a double-convex positive lens, and the third lens group G3 is composed of one double-convex positive lens.

Three aspheric surfaces are used; one at the image-side surface of the second negative meniscus lens in the first lens group G1, one at the object-side surface of the positive meniscus lens nearest to the object side in the second lens group G2 and one at the object-side surface of the double-convex positive lens nearest to the image side in the second lens group G2.

EXAMPLE 5

Figure 5A:
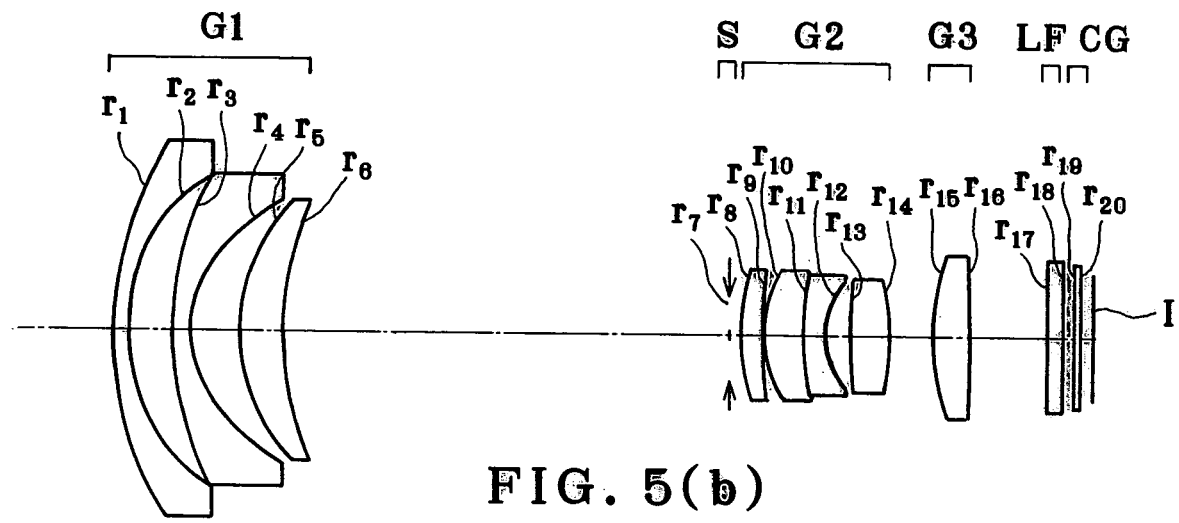
FIGS. 5(a), 5(b) and 5(c) are illustrative in lens section of the zoom lens of Example 5, as in FIGS. 1(a), 1(b) and 1(c).
Figure 5B:
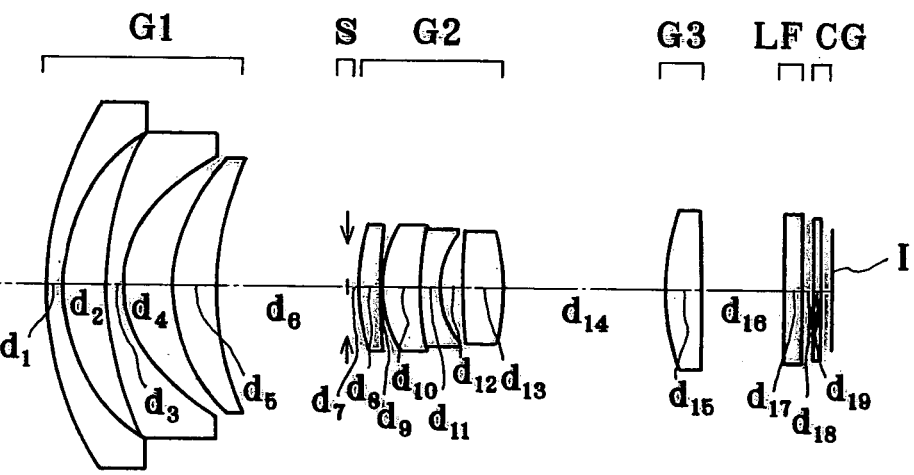
Figure 5C:
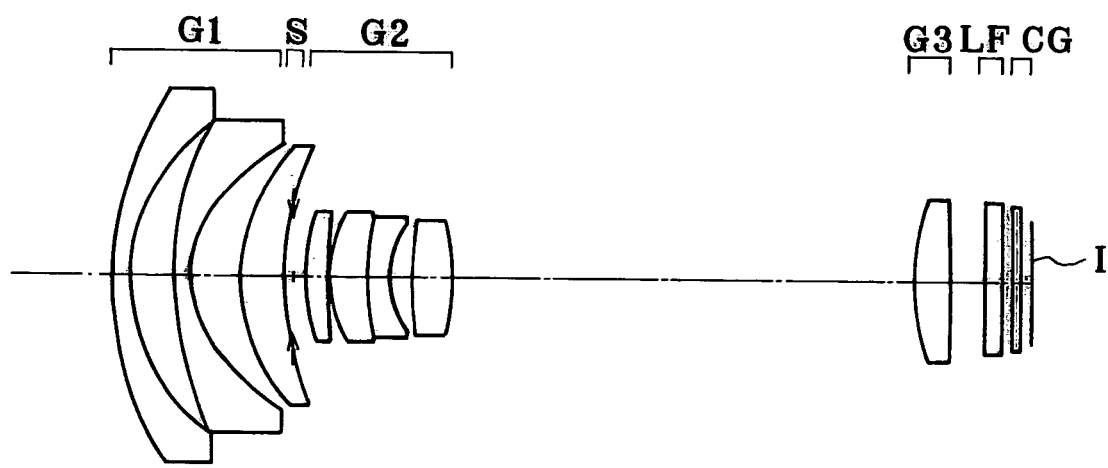

As shown in FIG. 5, Example 5 is directed to an image-formation optical system comprising, in order from its object side, a first lens group G1 of negative refracting power, an aperture stop S, a second lens group G2 of positive refracting power and a third lens group G3 of positive refracting power. Upon zooming from the wide-angle end to the telephoto end of the optical system, the first lens group G1 moves in a convex locus toward the image side of the optical system, and is positioned nearer to the image side at the telephoto end than at the wide-angle end. The second lens group G2 moves together with the aperture stop S monotonously toward the object side, and the third lens group G3 moves in a convex locus toward the object side, and is positioned nearer to the image side at the telephoto end than at the wide-angle end.

The first lens group G1 is composed of, in order from its object side, two negative meniscus lenses each convex on the object side and a positive meniscus lens convex on its object side, the second lens group G2 is composed of, in order from its object side, a positive meniscus lens convex on its object side, a cemented lens consisting of a positive meniscus lens convex on its object side and a negative meniscus lens convex on its object side and a double-convex positive lens, and the third lens group G3 is composed of one double-convex positive lens.

Four aspheric surfaces are used; one at the image-side surface of the second negative meniscus lens in the first lens group G1, one at the object-side surface of the positive meniscus lens nearest to the object side in the second lens group G2, one at the object-side surface of the double-convex positive lens nearest to the image side in the second lens group G2, and one at the image-side surface in the third lens group G3.

EXAMPLE 6

Figure 6A:
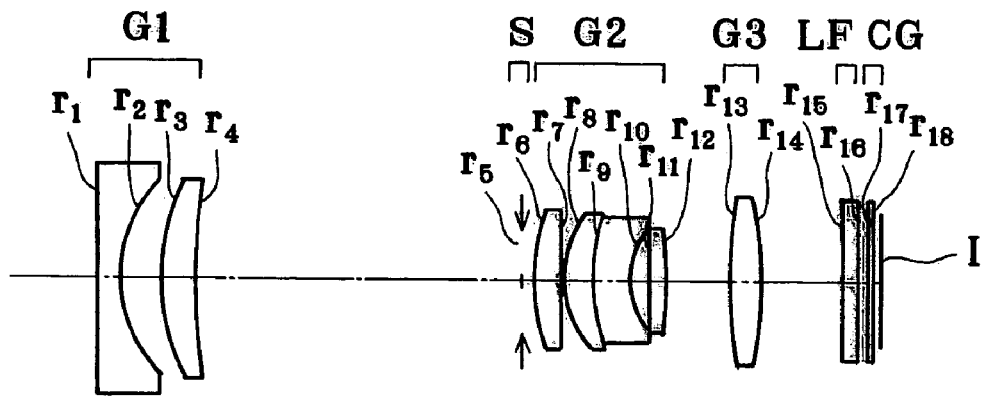
FIGS. 6(a), 6(b) and 6(c) are illustrative in lens section of the zoom lens of Example 6, as in FIGS. 1(a), 1(b) and 1(c).
Figure 6B:
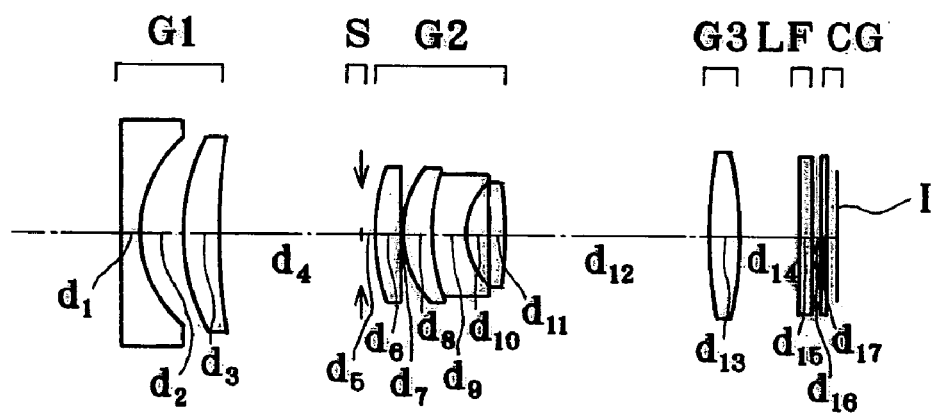
Figure 6C:
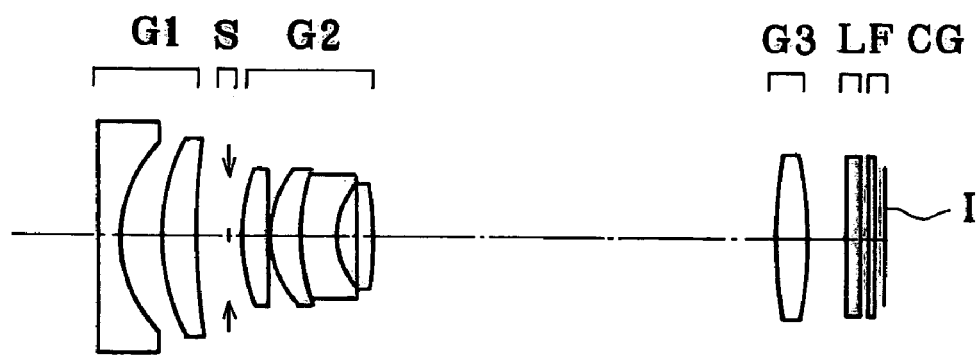

As shown in FIG. 6, Example 6 is directed to an image-formation optical system comprising, in order from its object side, a first lens group G1 of negative refracting power, an aperture stop S, a second lens group G2 of positive refracting power and a third lens group G3 of positive refracting power. Upon zooming from the wide-angle end to the telephoto end of the optical system, the first lens group G1 moves in a convex locus toward the image side of the optical system, and is positioned slightly nearer to the object side at the telephoto end than at the wide-angle end. The second lens group G2 moves together with the aperture stop S monotonously toward the object side, and the third lens group G3 moves toward the image side.

The first lens group G1 is composed of, in order from its object side, a negative meniscus lens convex on its object side and a positive meniscus lens convex on its object side, the second lens group G2 is composed of, in order from its object side, a double-convex positive lens, a cemented lens consisting of a positive meniscus lens convex on its object side and a negative meniscus lens convex on its object side and a double-convex positive lens and a double-convex positive lens, and the third lens group G3 is composed of one double-convex positive lens.

Three aspheric surfaces are used; one at the image-side surface of the negative meniscus lens in the first lens group G1 and two at the both surfaces of the double-convex positive lens nearest to the object side in the second lens group G2.

EXAMPLE 7

Figure 7A:
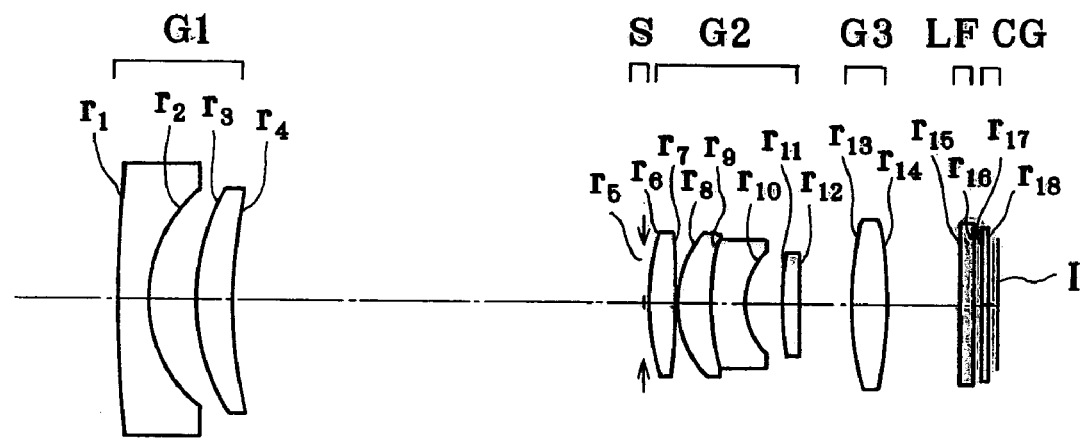
FIGS. 7(a), 7(b) and 7(c) are illustrative in lens section of the zoom lens of Example 7, as in FIGS. 1(a), 1(b) and 1(c).
Figure 7B:
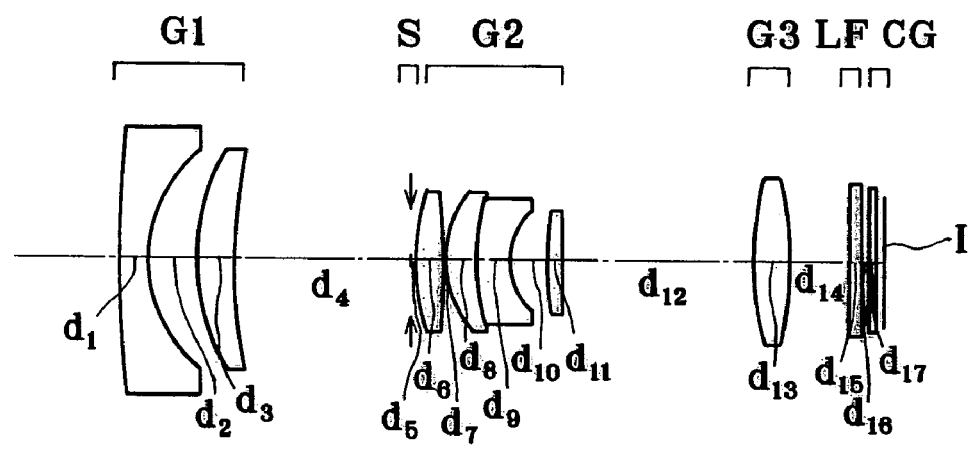
Figure 7C:
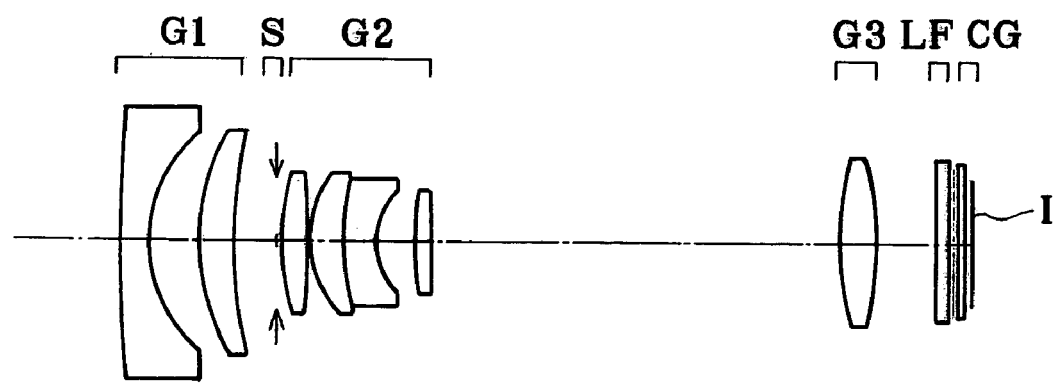
Figure 8A:
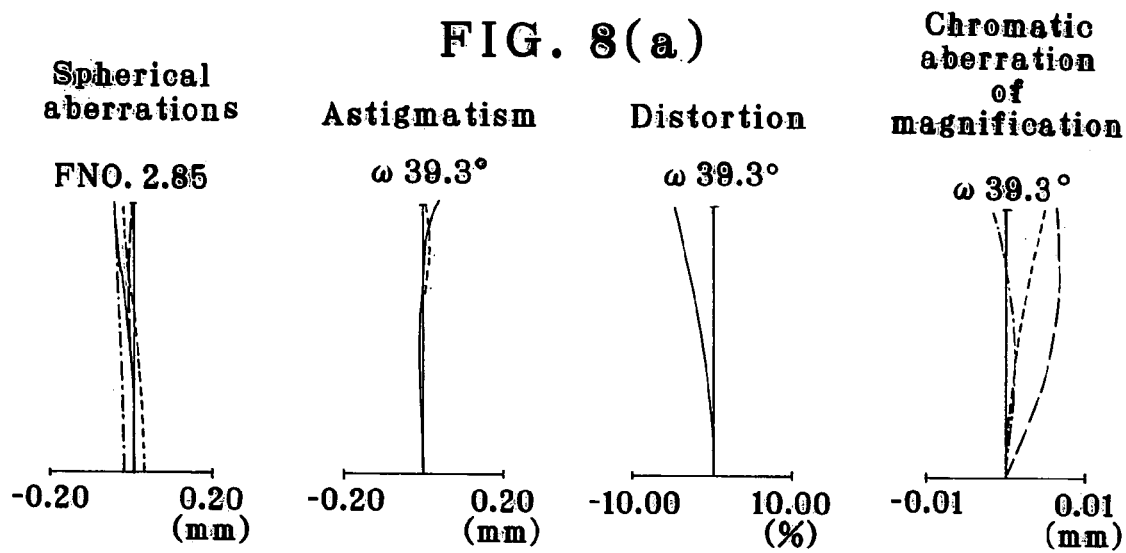
FIGS. 8(a), 8(b) and 8(c) are aberration diagrams for Example 1 upon focused on an object point at infinity.
Figure 8B:
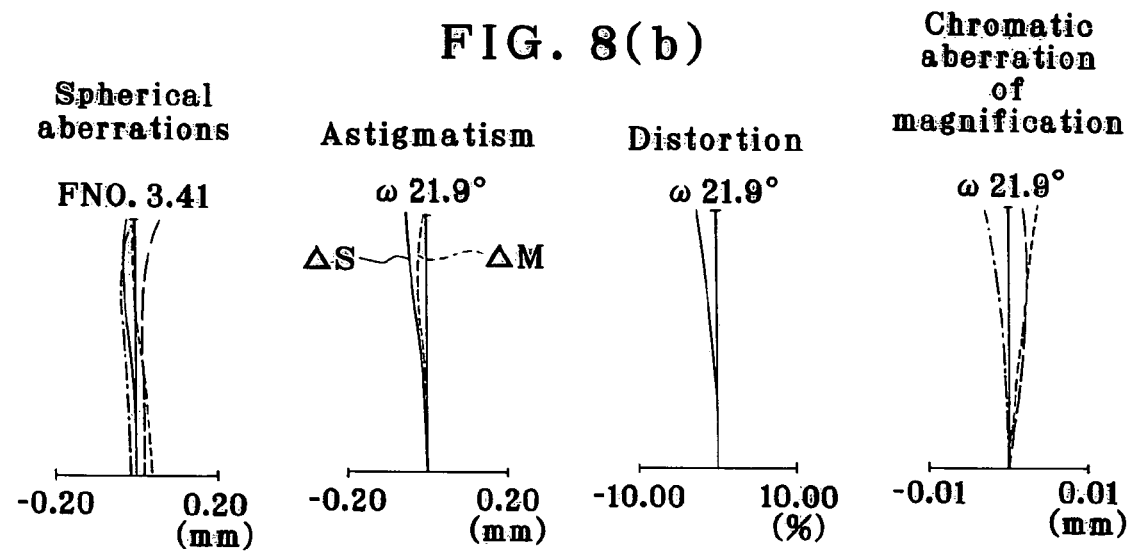
Figure 8C:
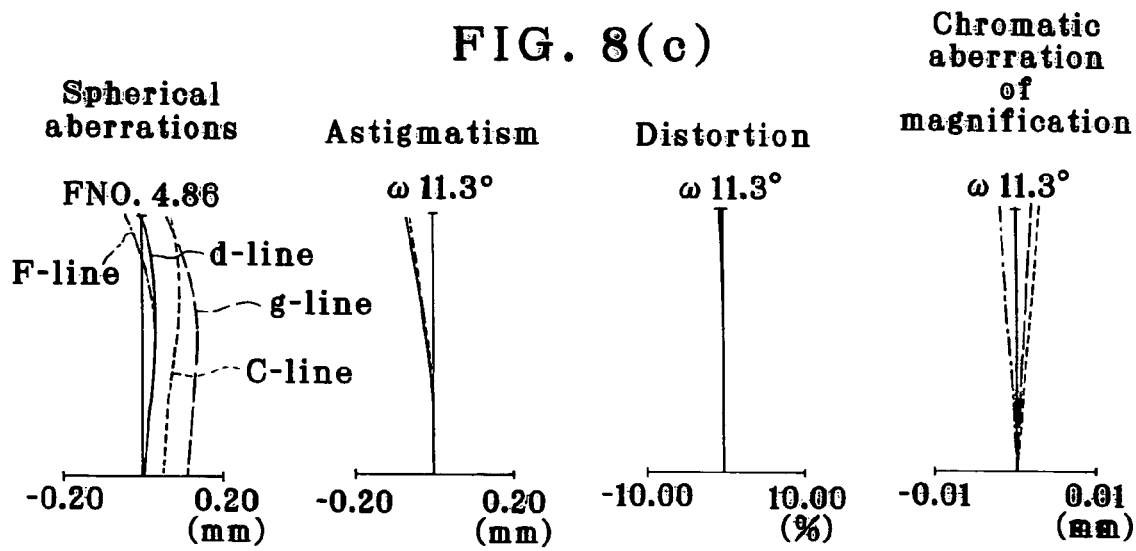
Figure 9A:
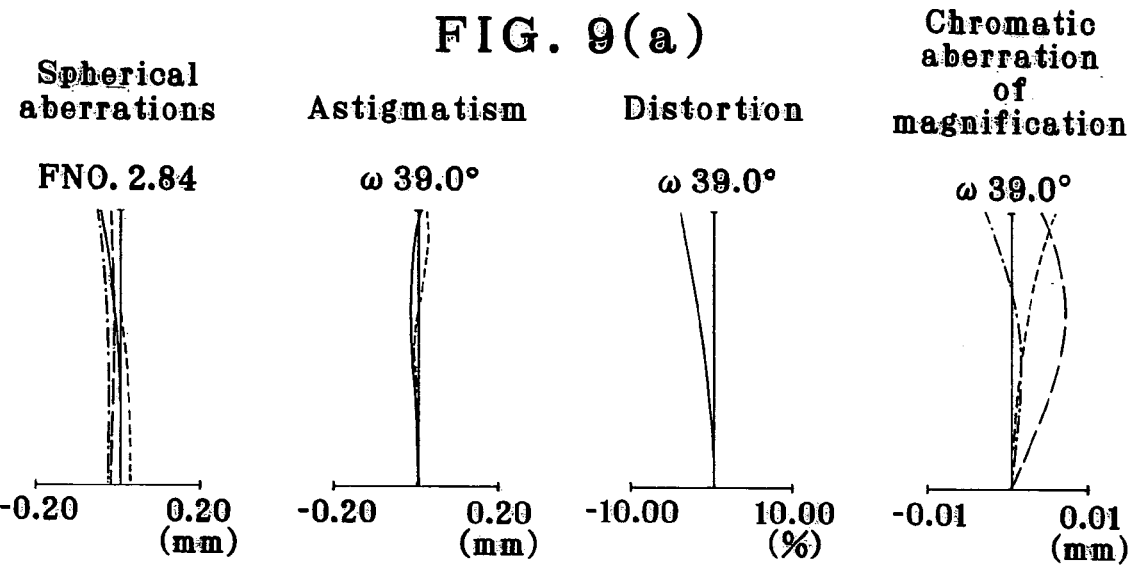
FIGS. 9(a), 9(b) and 9(c) are aberration diagrams for Example 2 upon focused on an object point at infinity.
Figure 9B:
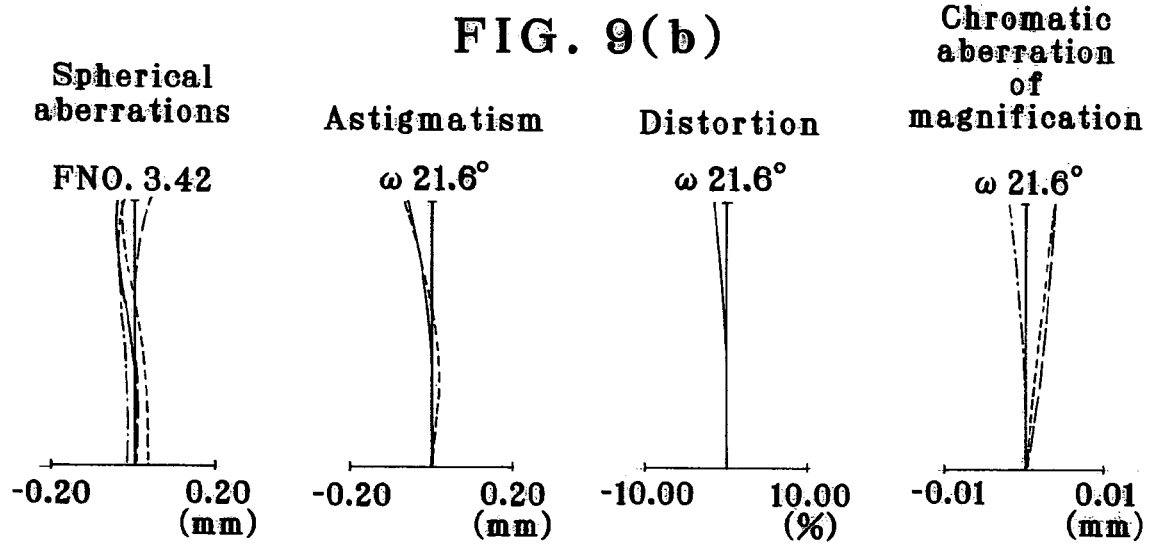
Figure 9C:
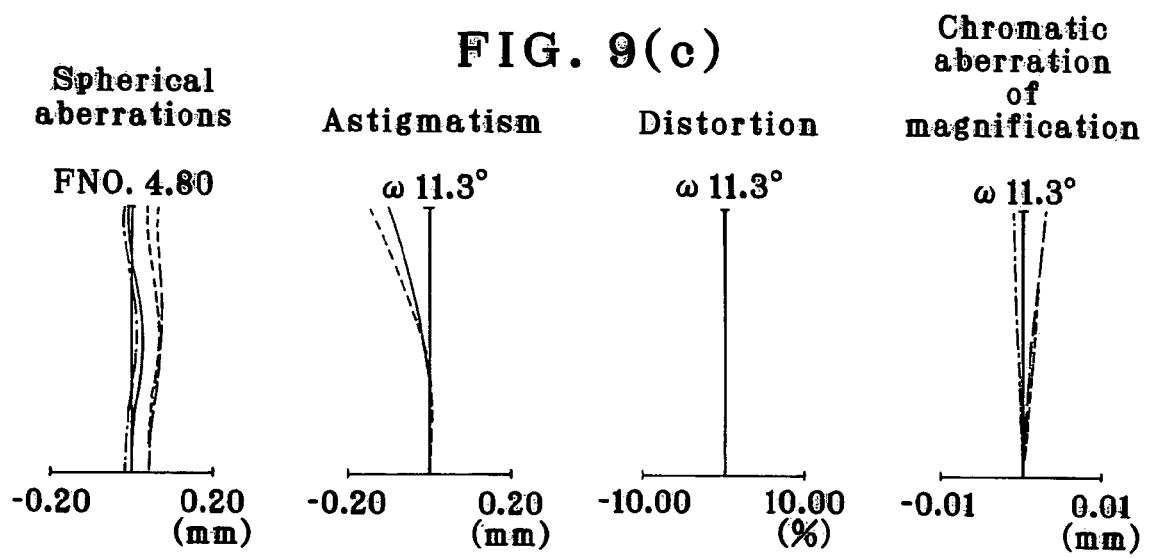
Figure 10A:
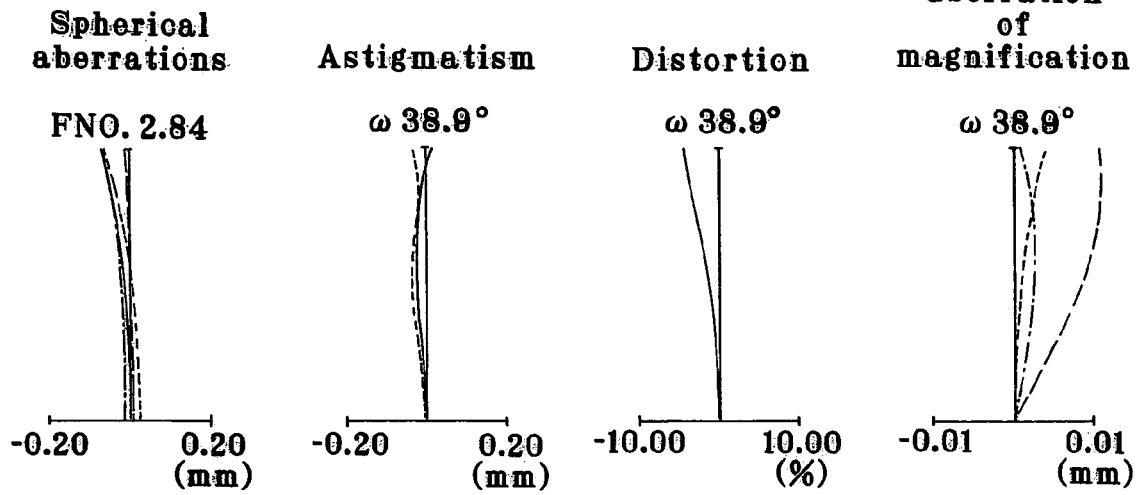
FIGS. 10(a), 10(b) and 10(c) are aberration diagrams for Example 3 upon focused on an object point at infinity.
Figure 10B:
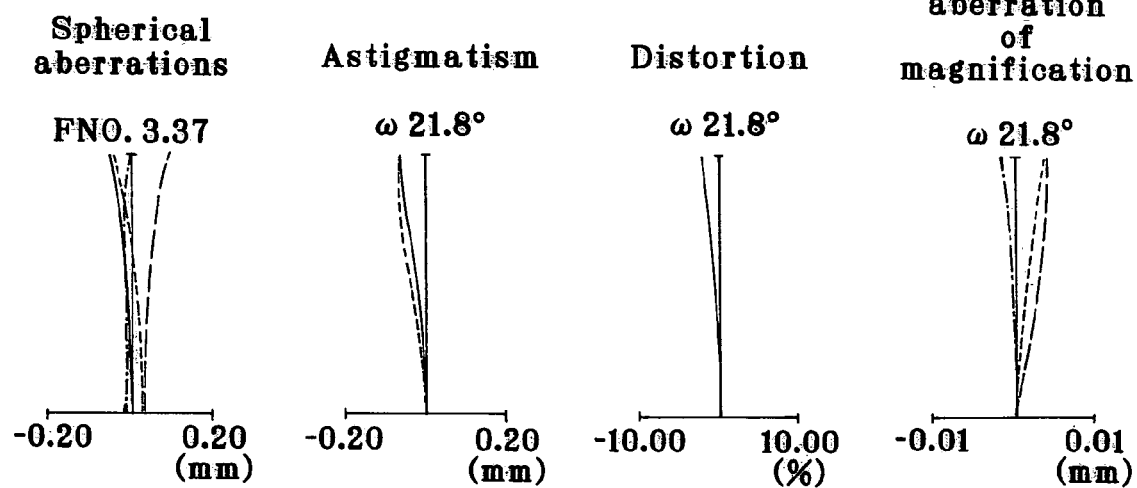
Figure 10C:
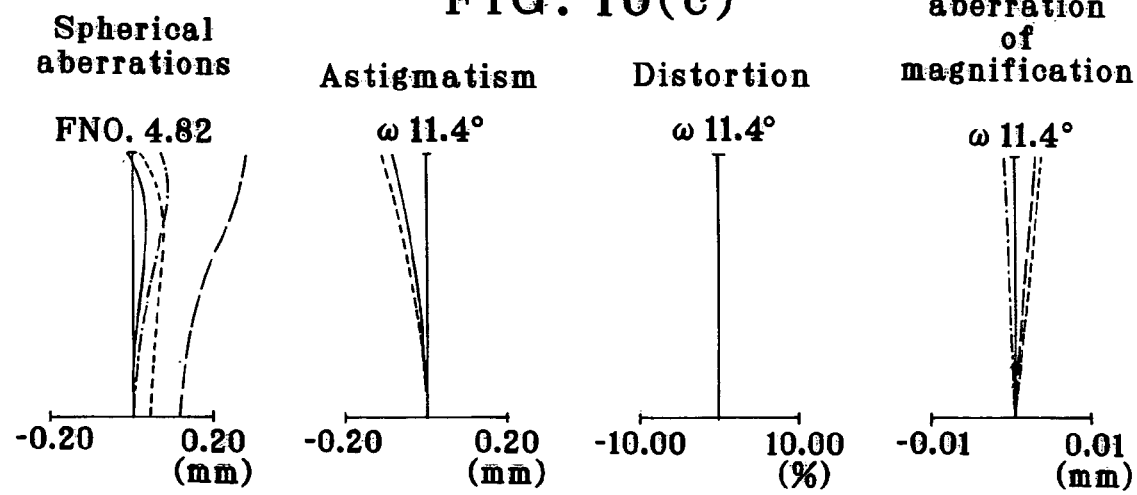
Figure 12A:
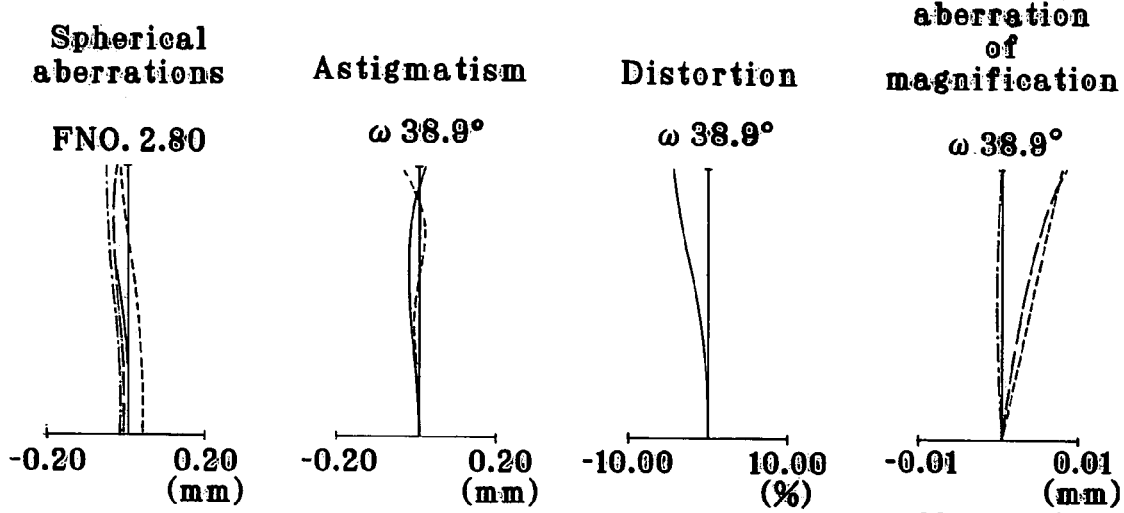
FIGS. 12(a), 12(b) and 12(c) are aberration diagrams for Example 5 upon focused on an object point at infinity.
Figure 12B:
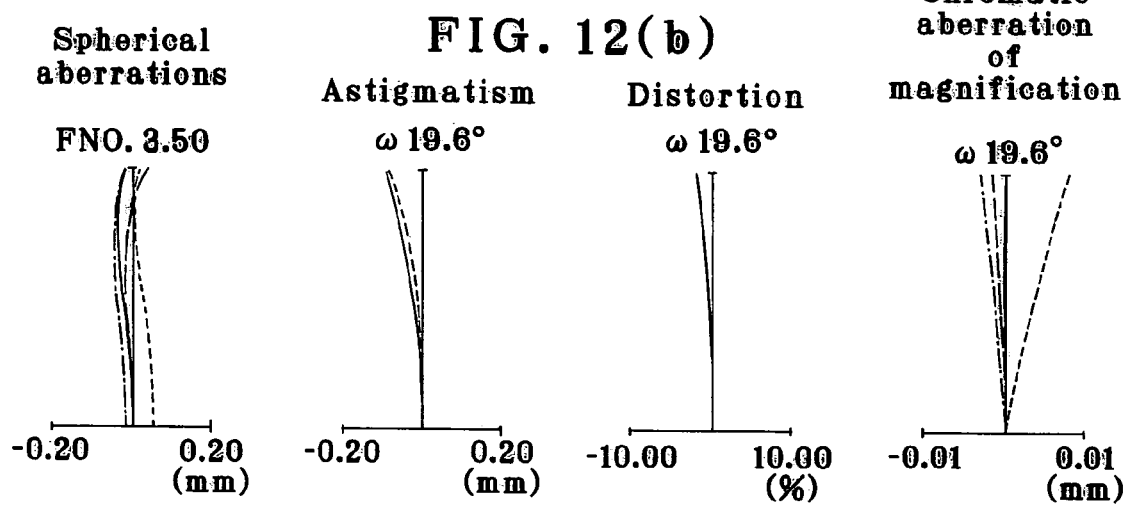
Figure 12C:
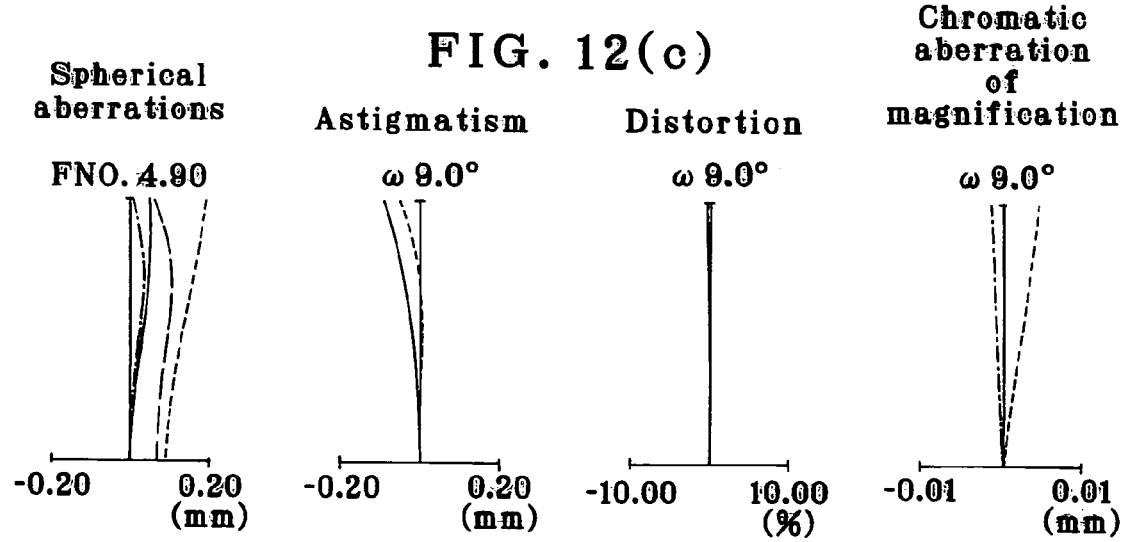
Figure 13A:
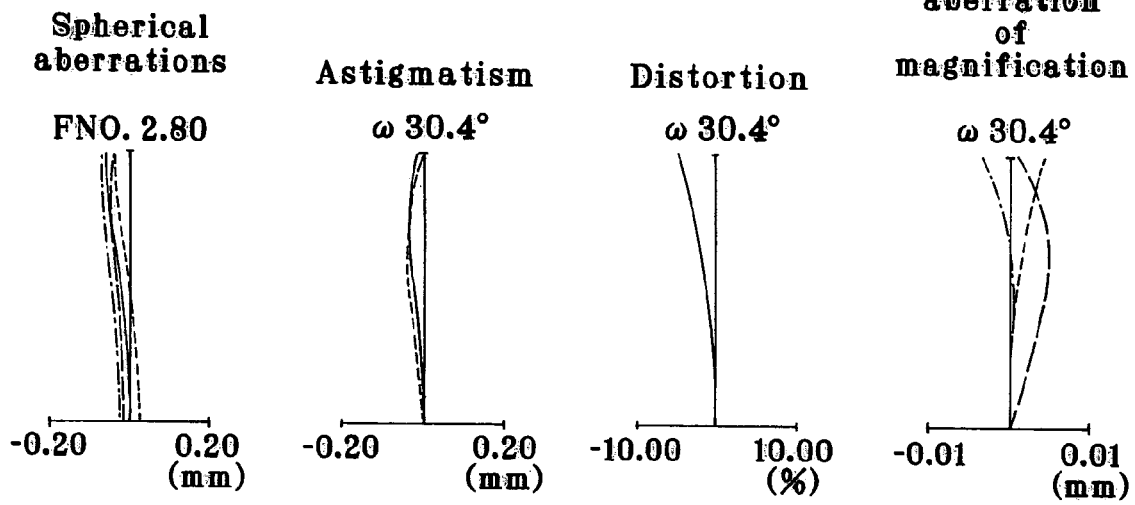
FIGS. 13(a), 13(b) and 13(c) are aberration diagrams for Example 6 upon focused on an object point at infinity.
Figure 13B:
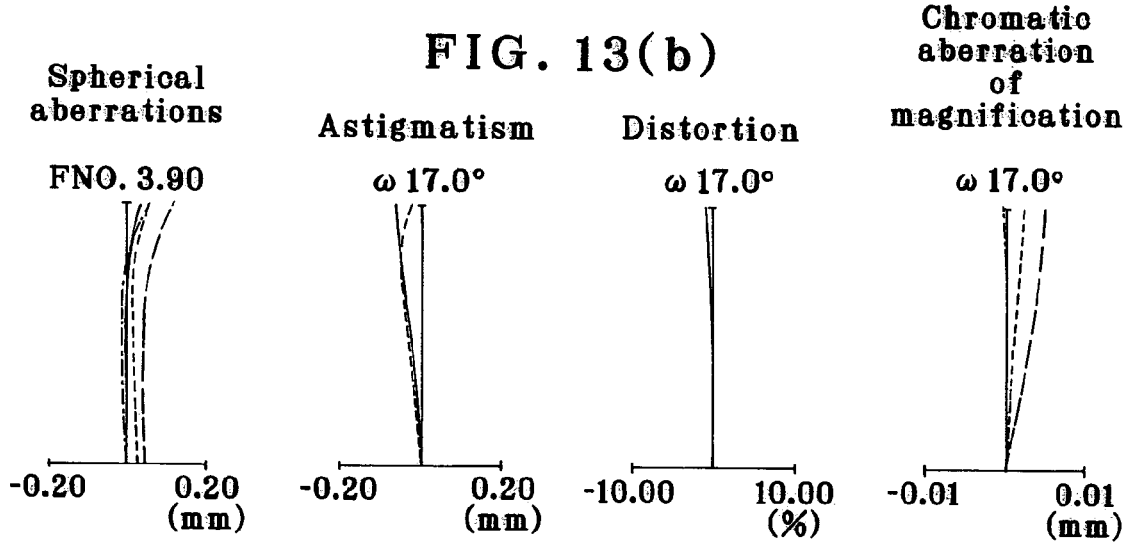
Figure 13C:
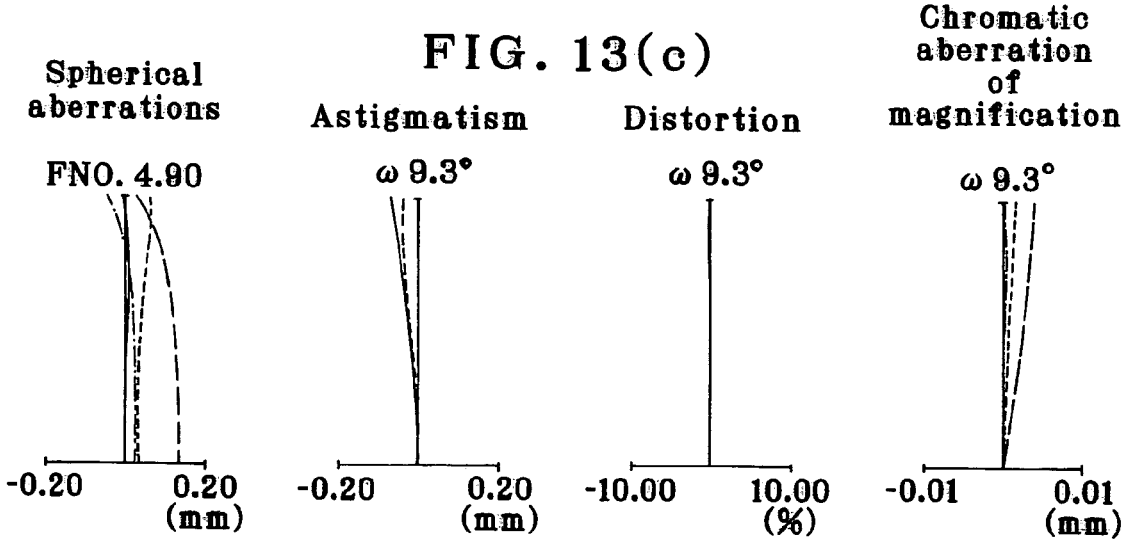
Figure 14A:
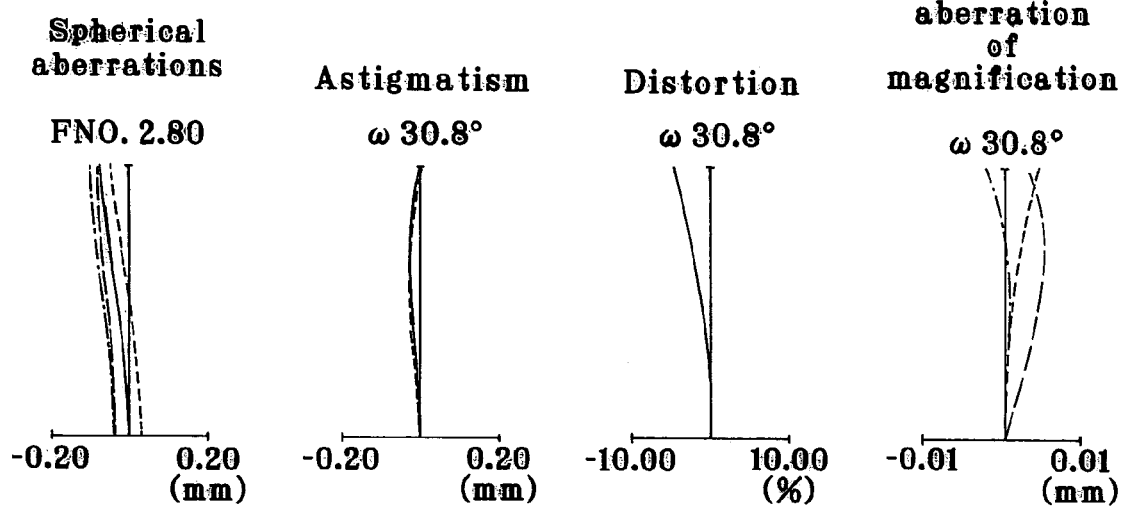
FIGS. 14(a), 14(b) and 14(c) are aberration diagrams for Example 7 upon focused on an object point at infinity.
Figure 14B:
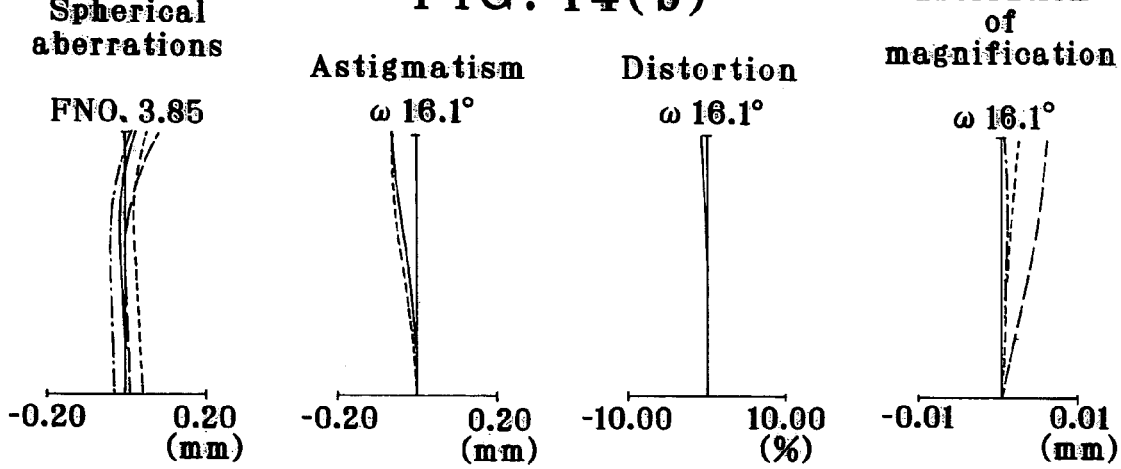
Figure 14C:
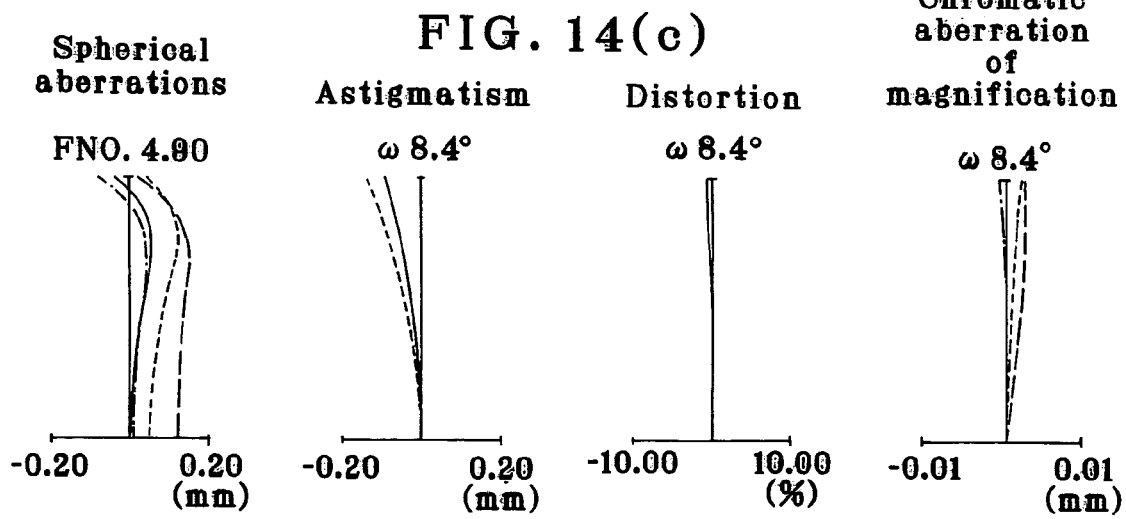

As shown in FIG. 7, Example 7 is directed to an image-formation optical system comprising, in order from its object side, a first lens group G1 of negative refracting power, an aperture stop S, a second lens group G2 of positive refracting power and a third lens group G3 of positive refracting power. Upon zooming from the wide-angle end to the telephoto end of the optical system, the first lens group G1 moves in a convex locus toward the image side of the optical system, and is positioned slightly nearer to the image side at the telephoto end than at the wide-angle end. The second lens group G2 moves together with the aperture stop S monotonously toward the object side, and the third lens group G3 moves in a convex locus toward the image side, and is positioned nearer to the image side at the telephoto end than at the wide-angle end.

The first lens group G1 is composed of, in order from its object side, a negative meniscus lens convex on its object side and a positive meniscus lens convex on its object side, the second lens group G2 is composed of, in order from its object side, a double-convex positive lens, a cemented lens consisting of a positive meniscus lens convex on its object side and a negative meniscus lens convex on its object side and a positive meniscus lens convex on its object side, and the third lens group G3 is composed of one double-convex positive lens.

Two aspheric surfaces are used; one at the image-side surface of the negative meniscus lens in the first lens group G1 and one at the object-side surface of the double-convex positive lens nearest to the object side in the second lens group G2.

In each example, the negative meniscus lens in the first lens group G1 is applied with a multicoating on its object-side surface and with a single-layer coating on its image-side surface.

Numerical data on each of the above examples are set out below. The symbols used hereinafter but not herein-before have the following meanings:

f: focal length of the zoom optical system,
$F_{No}$: F-number,
2ω: angle of view,
WE: wide-angle end,
ST: intermediate state,
TE: telephoto end,
$\phi_s/2$: stop diameter, $r_1, r_2, \ldots$ : radius of curvature of each lens,
$d_1, d_2, \ldots$ : spacing between lens surfaces,
$n_{d1}, n_{d2}, \ldots$ : d-line refractive index of each lens, and
$\nu_{d1}, \nu_{d2}, \ldots$ : Abbe number of each lens.

Here let x be an optical axis provided that the direction of propagation of light is positive, and y be a direction orthogonal to the optical axis. Then, aspheric shape is given by $$x = (y^2/r)/[1+\{1-(K+1)(y/r)^2\}^{1/2}] + A_4 y^4 + A_6 y^6 + A_8 y^8 + A_{10} y^{10}$$

where r is a paraxial radius of curvature, K is a conical coefficient, and $A_4$, $A_6$, $A_8$ and $A_{10}$ are the $4^{th}$, $6^{th}$, $8^{th}$ and $10^{th}$ order aspheric coefficients, respectively.

EXAMPLE 1

| | | | |
|---|---|---|---|
| $r_1$ = 36.860 | $d_1$ = 1.20 | $n_{d1}$ = 1.74100 | $\nu_{d1}$ = 52.64 |
| $r_2$ = 11.241 | $d_2$ = 3.12 | | |
| $r_3$ = 20.005 | $d_3$ = 1.30 | $n_{d2}$ = 1.74330 | $\nu_{d2}$ = 49.33 |
| $r_4$ = 8.091 (Aspheric) | $d_4$ = 3.98 | | |
| $r_5$ = 15.491 | $d_5$ = 3.01 | $n_{d3}$ = 1.84666 | $\nu_{d3}$ = 23.78 |
| $r_6$ = 33.328 | $d_6$ = (Variable) | | |
| $r_7$ = ∞ (Stop) | $d_7$ = 0.80 | | |
| $r_8$ = 16.975 (Aspheric) | $d_8$ = 1.58 | $n_{d4}$ = 1.69350 | $\nu_{d4}$ = 53.21 |
| $r_9$ = 38.888 | $d_9$ = 0.28 | | |
| $r_{10}$ = 9.759 | $d_{10}$ = 4.61 | $n_{d5}$ = 1.72000 | $\nu_{d5}$ = 43.69 |
| $r_{11}$ = 47.955 | $d_{11}$ = 0.89 | $n_{d6}$ = 1.84666 | $\nu_{d6}$ = 23.78 |
| $r_{12}$ = 7.899 | $d_{12}$ = 1.51 | | |
| $r_{13}$ = 22.430 | $d_{13}$ = 2.80 | $n_{d7}$ = 1.48749 | $\nu_{d7}$ = 70.23 |
| $r_{14}$ = −19.802 (Aspheric) | $d_{14}$ = (Variable) | | |
| $r_{15}$ = 20.122 | $d_{15}$ = 2.85 | $n_{d8}$ = 1.49700 | $\nu_{d8}$ = 81.54 |
| $r_{16}$ = −152.133 | $d_{16}$ = (Variable) | | |
| $r_{17}$ = ∞ | $d_{17}$ = 1.30 | $n_{d9}$ = 1.54771 | $\nu_{d9}$ = 62.84 |
| $r_{18}$ = ∞ | $d_{18}$ = 0.80 | | |
| $r_{19}$ = ∞ | $d_{19}$ = 0.50 | $n_{d10}$ = 1.51633 | $\nu_{d10}$ = 64.14 |
| $r_{20}$ = ∞ | | | |

Aspherical Coefficients

4th surface

K = −0.842
$A_4$ = −6.74445 × 10⁻⁷
$A_6$ = −2.55662 × 10⁻⁷
$A_8$ = −4.63462 × 10⁻¹⁰
$A_{10}$ = −3.76434 × 10⁻¹¹

8th surface

K = −0.850
$A_4$ = −1.89434 × 10⁻⁵
$A_6$ = −7.45889 × 10⁻⁸
$A_8$ = 0
$A_{10}$ = 0

14th surface

K = −0.429
$A_4$ = 6.19289 × 10⁻⁵
$A_6$ = 6.31162 × 10⁻⁸
$A_8$ = 4.88137 × 10⁻⁸
$A_{10}$ = 0

Zooming Data (∞)

| | WE | ST | TE |
|---|---|---|---|
| f (mm) | 5.780 | 11.400 | 22.500 |
| $F_{NO}$ | 2.85 | 3.41 | 4.86 |
| 2ω (°) | 78.5 | 43.8 | 22.6 |
| $d_6$ | 31.27 | 11.71 | 3.43 |
| $d_{14}$ | 5.77 | 13.82 | 33.94 |
| $d_{16}$ | 5.27 | 6.22 | 3.79 |
| $\phi_s/2$ | 3.60 | 3.90 | 4.25 |

EXAMPLE 2

| | | | |
|---|---|---|---|
| $r_1$ = 35.867 | $d_1$ = 1.24 | $n_{d1}$ = 1.78590 | $\nu_{d1}$ = 44.20 |
| $r_2$ = 11.136 | $d_2$ = 3.38 | | |
| $r_3$ = 23.278 | $d_3$ = 1.30 | $n_{d2}$ = 1.74330 | $\nu_{d2}$ = 49.33 |
| $r_4$ = 8.404 (Aspheric) | $d_4$ = 3.03 | | |
| $r_5$ = 15.998 | $d_5$ = 3.11 | $n_{d3}$ = 1.84666 | $\nu_{d3}$ = 23.78 |
| $r_6$ = 51.708 | $d_6$ = (Variable) | | |
| $r_7$ = ∞ (Stop) | $d_7$ = 0.80 | | |
| $r_8$ = 18.343 (Aspheric) | $d_8$ = 2.11 | $n_{d4}$ = 1.69350 | $\nu_{d4}$ = 53.21 |
| $r_9$ = 39.619 | $d_9$ = 0.05 | | |
| $r_{10}$ = 9.929 | $d_{10}$ = 4.62 | $n_{d5}$ = 1.72000 | $\nu_{d5}$ = 43.69 |
| $r_{11}$ = 41.025 | $d_{11}$ = 1.04 | $n_{d6}$ = 1.84666 | $\nu_{d6}$ = 23.78 |
| $r_{12}$ = 8.029 | $d_{12}$ = 1.18 | | |
| $r_{13}$ = 26.936 | $d_{13}$ = 2.19 | $n_{d7}$ = 1.49700 | $\nu_{d7}$ = 81.54 |
| $r_{14}$ = −15.731 | $d_{14}$ = (Variable) | | |
| $r_{15}$ = 19.932 (Aspheric) | $d_{15}$ = 3.34 | $n_{d8}$ = 1.48749 | $\nu_{d8}$ = 70.23 |
| $r_{16}$ = −135.370 | $d_{16}$ = (Variable) | | |
| $r_{17}$ = ∞ | $d_{17}$ = 1.30 | $n_{d9}$ = 1.54771 | $\nu_{d9}$ = 62.84 |
| $r_{18}$ = ∞ | $d_{18}$ = 0.80 | | |
| $r_{19}$ = ∞ | $d_{19}$ = 0.50 | $n_{d10}$ = 1.51633 | $\nu_{d10}$ = 64.14 |
| $r_{20}$ = ∞ | | | |

Aspherical Coefficients

4th surface

K = −0.841
$A_4$ = −3.18836 × 10⁻⁵
$A_6$ = −2.83895 × 10⁻⁷
$A_8$ = 3.42260 × 10⁻¹¹
$A_{10}$ = −3.52479 × 10⁻¹¹

8th surface

K = −6.573
$A_4$ = 7.72043 × 10⁻⁵
$A_6$ = −8.85647 × 10⁻⁷
$A_8$ = 0
$A_{10}$ = 0

15th surface

K = −17.194
$A_4$ = 2.23176 × 10⁻⁴
$A_6$ = −2.70882 × 10⁻⁶
$A_8$ = 1.96635 × 10⁻⁸
$A_{10}$ = 0

Zooming Data (∞)

| | WE | ST | TE |
|---|---|---|---|
| f (mm) | 5.800 | 11.514 | 22.500 |
| $F_{NO}$ | 2.84 | 3.42 | 4.80 |
| 2ω (°) | 77.9 | 43.2 | 22.5 |
| $d_6$ | 30.62 | 11.65 | 3.20 |
| $d_{14}$ | 4.56 | 13.89 | 32.82 |
| $d_{16}$ | 5.79 | 5.36 | 2.99 |
| $\phi_s/2$ | 3.45 | 3.8 | 4.15 |

EXAMPLE 3

| | | | |
|---|---|---|---|
| $r_1$ = 38.881 | $d_1$ = 1.21 | $n_{d1}$ = 1.72916 | $\nu_{d1}$ = 54.68 |
| $r_2$ = 12.531 | $d_2$ = 3.50 | | |
| $r_3$ = 21.795 | $d_3$ = 1.30 | $n_{d2}$ = 1.74330 | $\nu_{d2}$ = 49.33 |
| $r_4$ = 8.298 (Aspheric) | $d_4$ = 4.02 | | |
| $r_5$ = 16.122 | $d_5$ = 3.39 | $n_{d3}$ = 1.84666 | $\nu_{d3}$ = 23.78 |
| $r_6$ = 36.855 | $d_6$ = (Variable) | | |
| $r_7$ = ∞ (Stop) | $d_7$ = 0.80 | | |
| $r_8$ = 15.694 (Aspheric) | $d_8$ = 2.25 | $n_{d4}$ = 1.74330 | $\nu_{d4}$ = 49.33 |
| $r_9$ = 34.961 | $d_9$ = 0.24 | | |
| $r_{10}$ = 9.281 | $d_{10}$ = 2.99 | $n_{d5}$ = 1.75700 | $\nu_{d5}$ = 47.82 |

-continued

| | | | |
|---|---|---|---|
| $r_{11} = 28.352$ | $d_{11} = 1.46$ | $n_{d6} = 1.84666$ | $\nu_{d6} = 23.78$ |
| $r_{12} = 7.211$ | $d_{12} = 1.27$ | | |
| $r_{13} = 45.498$ | $d_{13} = 2.83$ | $n_{d7} = 1.48749$ | $\nu_{d7} = 70.23$ |
| $r_{14} = -16.301$ | $d_{14}$ = (Variable) | | |
| $r_{15} = 19.658$ | $d_{15} = 2.70$ | $n_{d8} = 1.49700$ | $\nu_{d8} = 81.54$ |
| $r_{16} = -120.480$ | $d_{16}$ = (Variable) | | |
| $r_{17} = \infty$ | $d_{17} = 1.30$ | $n_{d9} = 1.54771$ | $\nu_{d9} = 62.84$ |
| $r_{18} = \infty$ | $d_{18} = 0.80$ | | |
| $r_{19} = \infty$ | $d_{19} = 0.50$ | $n_{d10} = 1.51633$ | $\nu_{d10} = 64.14$ |
| $r_{20} = \infty$ | | | |

Aspherical Coefficients

4th surface

K = −0.869
$A_4 = 7.72245 \times 10^{-6}$
$A_6 = 2.93661 \times 10^{-8}$
$A_8 = -1.62810 \times 10^{-9}$
$A_{10} = -1.46177 \times 10^{-11}$ 8th surface K = −2.394
$A_4 = 2.73461 \times 10^{-5}$
$A_6 = -1.11350 \times 10^{-7}$
$A_8 = 0$
$A_{10} = 0$ Zooming Data (∞)

| | WE | ST | TE |
|---|---|---|---|
| f (mm) | 5.840 | 11.501 | 22.504 |
| $F_{NO}$ | 2.84 | 3.37 | 4.82 |
| 2ω (°) | 77.8 | 43.6 | 22.7 |
| $d_6$ | 31.46 | 11.93 | 3.64 |
| $d_{14}$ | 3.53 | 12.82 | 33.10 |
| $d_{16}$ | 6.99 | 7.12 | 3.66 |
| $\phi_s/2$ | 3.45 | 3.85 | 4.20 |

EXAMPLE 4

| | | | |
|---|---|---|---|
| $r_1 = 23.444$ | $d_1 = 1.20$ | $n_{d1} = 1.63930$ | $\nu_{d1} = 44.87$ |
| $r_2 = 15.500$ | $d_2 = 3.60$ | | |
| $r_3 = 35.523$ | $d_3 = 1.30$ | $n_{d2} = 1.74320$ | $\nu_{d2} = 49.34$ |
| $r_4 = 8.249$ (Aspheric) | $d_4 = 3.89$ | | |
| $r_5 = 13.662$ | $d_5 = 2.80$ | $n_{d3} = 1.84666$ | $\nu_{d3} = 23.78$ |
| $r_6 = 22.847$ | $d_6$ = (Variable) | | |
| $r_7 = \infty$ (Stop) | $d_7 = 0.80$ | | |
| $r_8 = 14.631$ (Aspheric) | $d_8 = 1.40$ | $n_{d4} = 1.77250$ | $\nu_{d4} = 49.60$ |
| $r_9 = 34.012$ | $d_9 = 0.10$ | | |
| $r_{10} = 10.239$ | $d_{10} = 3.19$ | $n_{d5} = 1.77250$ | $\nu_{d5} = 49.60$ |
| $r_{11} = 26.955$ | $d_{11} = 1.83$ | $n_{d6} = 1.84666$ | $\nu_{d6} = 23.78$ |
| $r_{12} = 7.358$ | $d_{12} = 1.71$ | | |
| $r_{13} = 36.600$ (Aspheric) | $d_{13} = 3.14$ | $n_{d7} = 1.58313$ | $\nu_{d7} = 59.38$ |
| $r_{14} = -21.350$ | $d_{14}$ = (Variable) | | |
| $r_{15} = 16.805$ | $d_{15} = 2.70$ | $n_{d8} = 1.49700$ | $\nu_{d8} = 81.54$ |
| $r_{16} = -153.231$ | $d_{16}$ = (Variable) | | |
| $r_{17} = \infty$ | $d_{17} = 1.30$ | $n_{d9} = 1.54771$ | $\nu_{d9} = 62.84$ |
| $r_{18} = \infty$ | $d_{18} = 0.80$ | | |
| $r_{19} = \infty$ | $d_{19} = 0.50$ | $n_{d10} = 1.51633$ | $\nu_{d10} = 64.14$ |
| $r_{20} = \infty$ | | | |

Aspherical Coefficients

4th surface

K = −0.595
$A_4 = 8.57632 \times 10^{-6}$
$A_6 = 2.89918 \times 10^{-8}$
$A_8 = 1.20170 \times 10^{-9}$
$A_{10} = -2.23755 \times 10^{-11}$ 8th surface K = −2.293
$A_4 = 5.18474 \times 10^{-5}$
$A_6 = -3.33636 \times 10^{-7}$
$A_8 = -1.97514 \times 10^{-9}$
$A_{10} = 0$ 13th surface K = −0.059
$A_4 = 9.11545 \times 10^{-8}$
$A_6 = 8.13085 \times 10^{-7}$
$A_8 = -1.60810 \times 10^{-10}$
$A_{10} = 0$ Zooming Data (∞)

| | WE | ST | TE |
|---|---|---|---|
| f (mm) | 5.900 | 12.897 | 28.525 |
| $F_{NO}$ | 2.80 | 3.60 | 4.90 |
| 2ω (°) | 77.1 | 39.4 | 17.8 |
| $d_6$ | 34.95 | 9.91 | 2.60 |
| $d_{14}$ | 3.84 | 11.20 | 36.06 |
| $d_{16}$ | 5.12 | 6.76 | 0.52 |
| $\phi_s/2$ | 3.27 | 3.32 | 4.37 |

EXAMPLE 5

| | | | |
|---|---|---|---|
| $r_1 = 26.139$ | $d_1 = 1.20$ | $n_{d1} = 1.74320$ | $\nu_{d1} = 49.34$ |
| $r_2 = 14.200$ | $d_2 = 3.30$ | | |
| $r_3 = 26.285$ | $d_3 = 1.30$ | $n_{d2} = 1.74320$ | $\nu_{d2} = 49.34$ |
| $r_4 = 8.448$ (Aspheric) | $d_4 = 3.66$ | | |
| $r_5 = 13.750$ | $d_5 = 3.39$ | $n_{d3} = 1.84666$ | $\nu_{d3} = 23.78$ |
| $r_6 = 23.170$ | $d_6$ = (Variable) | | |
| $r_7 = \infty$ (Stop) | $d_7 = 0.80$ | | |
| $r_8 = 15.165$ (Aspheric) | $d_8 = 1.72$ | $n_{d4} = 1.78800$ | $\nu_{d4} = 47.37$ |
| $r_9 = 33.388$ | $d_9 = 0.10$ | | |
| $r_{10} = 9.515$ | $d_{10} = 2.96$ | $n_{d5} = 1.74320$ | $\nu_{d5} = 49.34$ |
| $r_{11} = 26.822$ | $d_{11} = 1.58$ | $n_{d6} = 1.84666$ | $\nu_{d6} = 23.78$ |
| $r_{12} = 7.283$ | $d_{12} = 1.63$ | | |
| $r_{13} = 35.704$ (Aspheric) | $d_{13} = 3.10$ | $n_{d7} = 1.58313$ | $\nu_{d7} = 59.38$ |
| $r_{14} = -19.396$ | $d_{14}$ = (Variable) | | |
| $r_{15} = 18.643$ | $d_{15} = 2.70$ | $n_{d8} = 1.49700$ | $\nu_{d8} = 81.54$ |
| $r_{16} = -371.719$ (Aspheric) | $d_{16}$ = (Variable) | | |
| $r_{17} = \infty$ | $d_{17} = 1.30$ | $n_{d9} = 1.54771$ | $\nu_{d9} = 62.84$ |
| $r_{18} = \infty$ | $d_{18} = 0.80$ | | |
| $r_{19} = \infty$ | $d_{19} = 0.50$ | $n_{d10} = 1.51633$ | $\nu_{d10} = 64.14$ |
| $r_{20} = \infty$ | | | |

Aspherical Coefficients

4th surface

K = −0.606
$A_4 = 5.96675 \times 10^{-6}$
$A_6 = -5.12154 \times 10^{-10}$
$A_8 = 1.15133 \times 10^{-9}$
$A_{10} = -2.21290 \times 10^{-11}$ 8th surface K = −2.476
$A_4 = 4.45482 \times 10^{-5}$
$A_6 = -4.22739 \times 10^{-7}$
$A_8 = -1.96055 \times 10^{-9}$
$A_{10} = 0$ 13th surface K = −0.199
$A_4 = 8.95360 \times 10^{-6}$
$A_6 = 7.49249 \times 10^{-7}$ -continued $A_8 = 3.59024 \times 10^{-10}$
$A_{10} = 0$
16th surface $K = 0.000$
$A_4 = 1.54951 \times 10^{-5}$
$A_6 = -4.91310 \times 10^{-7}$
$A_8 = 1.39082 \times 10^{-11}$
$A_{10} = 0$ Zooming Data ($\infty$)

|  | WE | ST | TE |
|---|---|---|---|
| f (mm) | 5.845 | 12.902 | 28.549 |
| $F_{NO}$ | 2.80 | 3.50 | 4.90 |
| $2\omega$ (°) | 77.8 | 39.1 | 17.9 |
| $d_6$ | 33.92 | 10.03 | 0.76 |
| $d_{14}$ | 3.21 | 12.00 | 34.73 |
| $d_{16}$ | 5.73 | 6.16 | 2.60 |
| $\phi_s/2$ | 3.26 | 3.49 | 4.16 |

EXAMPLE 6

| $r_1 = 21714.389$ | $d_1 = 1.30$ | $n_{d1} = 1.80610$ | $\nu_{d1} = 40.92$ |
| $r_2 = 8.162$ (Aspheric) | $d_2 = 2.87$ | | |
| $r_3 = 14.791$ | $d_3 = 2.40$ | $n_{d2} = 1.84666$ | $\nu_{d2} = 23.78$ |
| $r_4 = 50.672$ | $d_4$ = (Variable) | | |
| $r_5 = \infty$ (Stop) | $d_5 = 0.80$ | | |
| $r_6 = 13.330$ (Aspheric) | $d_6 = 1.90$ | $n_{d3} = 1.69350$ | $\nu_{d3} = 53.21$ |
| $r_7 = -272.159$ (Aspheric) | $d_7 = 0.10$ | | |
| $r_8 = 7.488$ | $d_8 = 2.10$ | $n_{d4} = 1.61800$ | $\nu_{d4} = 63.33$ |
| $r_9 = 17.487$ | $d_9 = 2.27$ | $n_{d5} = 1.84666$ | $\nu_{d5} = 23.78$ |
| $r_{10} = 5.383$ | $d_{10} = 1.50$ | | |
| $r_{11} = 12241145.775$ | $d_{11} = 1.15$ | $n_{d6} = 1.61800$ | $\nu_{d6} = 63.33$ |
| $r_{12} = -25.461$ | $d_{12}$ = (Variable) | | |
| $r_{13} = 33.000$ | $d_{13} = 2.00$ | $n_{d7} = 1.61800$ | $\nu_{d7} = 63.33$ |
| $r_{14} = -33.000$ | $d_{14}$ = (Variable) | | |
| $r_{15} = \infty$ | $d_{15} = 0.96$ | $n_{d8} = 1.54771$ | $\nu_{d8} = 62.84$ |
| $r_{16} = \infty$ | $d_{16} = 0.60$ | | |
| $r_{17} = \infty$ | $d_{17} = 0.50$ | $n_{d9} = 1.51633$ | $\nu_{d9} = 64.14$ |
| $r_{18} = \infty$ | | | |

Aspherical Coefficients

2nd surface $K = -0.744$
$A_4 = 1.01099 \times 10^{-11}$
$A_6 = 2.55746 \times 10^{-7}$
$A_8 = -4.50803 \times 10^{-9}$
$A_{10} = 0$
6th surface $K = 0.000$
$A_4 = -1.07809 \times 10^{-5}$
$A_6 = -3.65463 \times 10^{-7}$
$A_8 = 0$
$A_{10} = 0$
7th surface $K = 0.000$
$A_4 = 5.59162 \times 10^{-5}$
$A_6 = -1.63843 \times 10^{-7}$
$A_8 = 0$
$A_{10} = 0$ -continued Zooming Data ($\infty$)

|  | WE | ST | TE |
|---|---|---|---|
| f (mm) | 7.952 | 14.692 | 27.270 |
| $F_{NO}$ | 2.80 | 3.90 | 4.90 |
| $2\omega$ (°) | 60.8 | 33.9 | 18.5 |
| $d_4$ | 22.28 | 9.82 | 2.20 |
| $d_{12}$ | 4.16 | 13.63 | 27.21 |
| $d_{14}$ | 5.64 | 4.00 | 2.80 |
| $\phi_s/2$ | 3.37 | 3.37 | 4.01 |

EXAMPLE 7

| $r_1 = 110.048$ | $d_1 = 2.00$ | $n_{d1} = 1.80400$ | $\nu_{d1} = 46.57$ |
| $r_2 = 8.847$ (Aspheric) | $d_2 = 3.52$ | | |
| $r_3 = 15.019$ | $d_3 = 2.60$ | $n_{d2} = 1.80518$ | $\nu_{d2} = 25.42$ |
| $r_4 = 34.932$ | $d_4$ = (Variable) | | |
| $r_5 = \infty$ (Stop) | $d_5 = 0.30$ | | |
| $r_6 = 17.789$ (Aspheric) | $d_6 = 1.92$ | $n_{d3} = 1.69350$ | $\nu_{d3} = 53.21$ |
| $r_7 = -62.142$ | $d_7 = 0.10$ | | |
| $r_8 = 7.284$ | $d_8 = 2.30$ | $n_{d4} = 1.61800$ | $\nu_{d4} = 63.33$ |
| $r_9 = 15.673$ | $d_9 = 2.50$ | $n_{d5} = 1.84666$ | $\nu_{d5} = 23.78$ |
| $r_{10} = 5.221$ | $d_{10} = 2.60$ | | |
| $r_{11} = 29.011$ | $d_{11} = 1.15$ | $n_{d6} = 1.51742$ | $\nu_{d6} = 52.43$ |
| $r_{12} = 482171.189$ | $d_{12}$ = (Variable) | | |
| $r_{13} = 26.000$ | $d_{13} = 2.47$ | $n_{d7} = 1.48749$ | $\nu_{d7} = 70.23$ |
| $r_{14} = -26.000$ | $d_{14}$ = (Variable) | | |
| $r_{15} = \infty$ | $d_{15} = 0.96$ | $n_{d8} = 1.54771$ | $\nu_{d8} = 62.84$ |
| $r_{16} = \infty$ | $d_{16} = 0.60$ | | |
| $r_{17} = \infty$ | $d_{17} = 0.50$ | $n_{d9} = 1.51633$ | $\nu_{d9} = 64.14$ |
| $r_{18} = \infty$ | | | |

Aspherical Coefficients

2nd surface $K = -0.581$
$A_4 = -9.74609 \times 10^{-11}$
$A_6 = 6.60366 \times 10^{-8}$
$A_8 = -1.64695 \times 10^{-9}$
$A_{10} = 0$
6th surface $K = 0.000$
$A_4 = -3.89622 \times 10^{-5}$
$A_6 = -2.55361 \times 10^{-7}$
$A_8 = 0$
$A_{10} = 0$ Zooming Data ($\infty$)

|  | WE | ST | TE |
|---|---|---|---|
| f (mm) | 7.840 | 15.493 | 30.176 |
| $F_{NO}$ | 2.80 | 3.85 | 4.90 |
| $2\omega$ (°) | 61.5 | 32.2 | 16.8 |
| $d_4$ | 29.24 | 12.49 | 3.10 |
| $d_{12}$ | 3.55 | 13.22 | 28.68 |
| $d_{14}$ | 5.04 | 4.00 | 4.10 |
| $\phi_s/2$ | 3.64 | 3.75 | 4.50 |

Aberration diagrams for Examples 1–7 upon focused on an object point at infinity are given in FIGS. 8–14 wherein (a), (b) and (c) stand for spherical aberrations, astigmatism, distortion and chromatic aberrations, respectively, at the wide-angle end (a), in the intermediate state (b) and at the telephoto end (c).

Set out below are the values of conditions (1)–(4), (8), (9), (11)–(14) and (21)–(27) and the values of $D_{11}$, $D_{12}$, $D_{31}$, $D_{22}$ and $D_{21}$ with respect to conditions (10) and (28) in Examples 1–7.

| Conditions | Example 1 | Example 2 | Example 3 | Example 4 | Example 5 | Example 6 | Example 7 |
|---|---|---|---|---|---|---|---|
| (1) | 1.41 | 1.48 | 1.54 | 1.54 | 1.50 | | |
| (2) | 78.5° | 77.9° | 77.8° | 77.1° | 77.8° | | |
| (3) | 22.6° | 22.5° | 22.7° | 17.8° | 17.9° | | |
| (4) | 2.55 | 2.72 | 2.63 | 2.51 | 2.66 | | |
| (8) | 44.1° | 40.8° | 46.2° | 57.3° | 55.5° | | |
| (9) | 57.76 | 46.45 | 57.76 | 57.76 | 57.76 | | |
| (11) | 0.81 | 0.81 | 0.78 | 0.72 | 0.77 | | |
| (12) | 0.35 | 0.36 | 0.32 | 0.26 | 0.26 | | |
| (13) | 1.37 | 1.38 | 1.23 | 1.25 | 1.25 | | |
| (14) | −1.99 | −1.86 | −1.83 | −1.79 | −1.79 | | |
| (21) | −1.41 | −1.48 | −1.54 | −1.54 | −1.50 | −1.44 | −1.48 |
| (22) | 1.39 | 1.45 | 1.48 | 1.79 | 1.64 | 1.41 | 1.53 |
| (23) | −0.005 | −0.004 | −0.006 | −0.006 | −0.006 | −0.005 | −0.006 |
| (23) | 0.006 | 0.001 | 0.006 | −0.005 | 0.010 | 0.000 | 0.007 |
| (25) | 1.67 | 1.65 | 1.71 | 1.45 | 1.42 | 1.12 | 1.15 |
| (26) | 3.15 | 3.14 | 2.99 | 2.35 | 2.76 | 1.83 | 1.76 |
| (27) | −1.95 | −1.82 | −1.78 | −1.75 | −1.74 | −1.05 | −1.29 |
| $D_{11}$ | 27.7 | 27.3 | 29.0 | 31.7 | 31.7 | 19.1 | 22.6 |
| $D_{12}$ | 17.9 | 18.1 | 18.4 | 20.1 | 19.9 | 14.2 | 16.5 |
| $D_{31}$ | 14.6 | 14.3 | 14.7 | 13.5 | 13.7 | 12.9 | 13.3 |
| $D_{22}$ | 13.0 | 13.1 | 12.8 | 13.5 | 13.5 | 12.1 | 12.1 |
| $D_{21}$ | 10.5 | 10.5 | 10.4 | 10.8 | 10.5 | 10.2 | 10.9 |

In Examples 1–7, focusing is carried out by movement of the third lens group G3 toward the object side.

The stop diameter φs/2 in the numerical data given above is the value of the radius of an aperture stop of circular shape.

Figure 15:
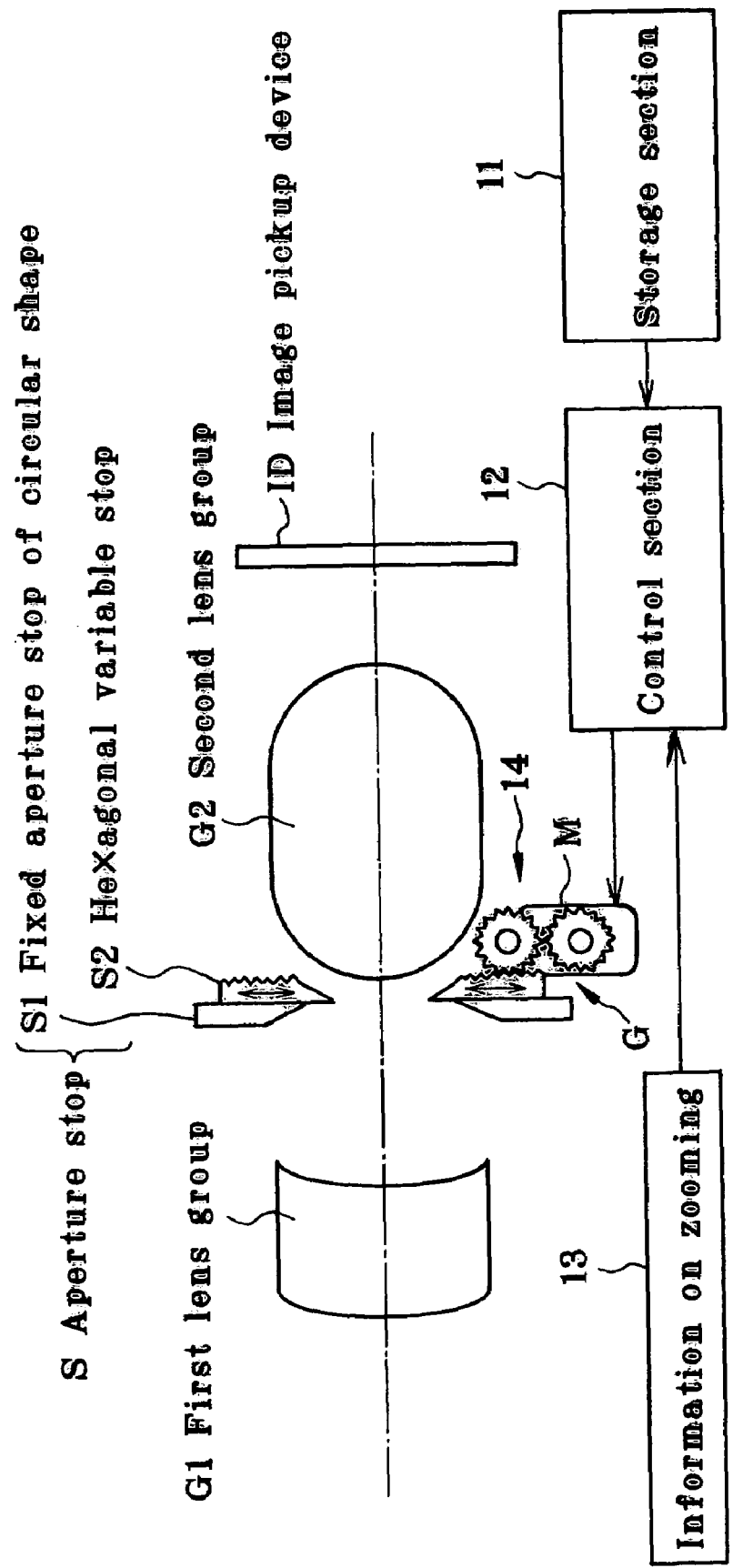
FIG. 15 is a sectional schematic, inclusive of an optical axis, of a variable stop comprising a fixed aperture stop member of circular shape and a variable stop member of hexagonal shape.

As shown typically in FIG. 15, the stop S in each example could be composed of a fixed aperture stop member S1 of circular shape and a hexagonal variable stop member S2 located adjacent thereto and comprising six stop blades. For instance, when the stop at the wide-angle end is of regular hexagon in shape as shown in FIG. 16(a), it is preferable that its diagonal length has the following values, because the aperture stop can have an area substantially equal to the area of the stop in Examples 1–7 at the wide-angle end.

| | (1) | $S_W$ | (2) | $S_T$ |
|---|---|---|---|---|
| Ex. 1 | 7.92 | 40.7 | 8.50 | 56.7 |
| Ex. 2 | 7.59 | 37.4 | 8.30 | 54.1 |
| Ex. 3 | 7.59 | 37.4 | 8.40 | 55.4 |
| Ex. 4 | 7.19 | 33.6 | 8.74 | 60 |
| Ex. 5 | 7.16 | 33.3 | 8.32 | 54.5 |
| Ex. 6 | 7.41 | 35.7 | 8.02 | 50.5 |
| Ex. 7 | 8.00 | 41.6 | 9.00 | 63.6 |

(1): Diagonal length of regular hexagon at the wide-angle end, and (2): diameter of circle at the telephoto end.

In this case, too, the stop blades are retracted at the telephoto end as shown in FIG. 16(c), so that only the fixed aperture stop member S1 of circular shape can have an aperture stop function that determines an axial light beam diameter. This then allows regular hexagon to become large with distance from the wide-angle end toward the telephoto end side. On the way to the telephoto end side, the regular hexagon overlaps the circular aperture stop member at the apexes, assuming on a substantially circular shape on the telephoto end side. It is noted that FIG. 16(a) is illustrative of a full-aperture state at the wide-angle end, FIG. 16(b) is illustrative of an aperture state on the way to the telephoto end, and FIG. 16(c) is illustrative of a full-aperture state at the telephoto end, with a regular hexagonal opening indicating an aperture portion in the hexagonal variable stop member S2 and a circle indicating an aperture portion in the fixed aperture stop member S1 of circular shape. Hatched areas in FIGS. 15(a), 15(b) and 15(c) indicate an overlapping portion of both aperture portions.

Thus, the variable stop member is designed to move the six stop blades located around the optical axis. The six stop blades of the hexagonal variable stop member S2 are controlled by means of power means 14 (e.g., a motor M and a gear G). In a state retracted to a maximum, the fixed stop member S1 having a circular aperture portion is exposed to view, so that the aperture area of the variable stop member can be varied.

Further, if a full-aperture stop position corresponding to zooming is previously stored in a memory section 11 such as a memory or the like and the power means 14 is controlled by a control section 12 in response to zooming information 13 (information on helicoidal movement for zooming, not shown) and information stored in the memory section 11, then the aperture state of the variable stop member S2 is controlled so that the aperture area suitable for zooming can be obtained.

Alternatively, a fixed stop member such as a turret or the like having a plurality of shape-fixed stop elements could be inserted into or deinserted from an optical path through a zoom lens for controlling the maximum aperture area.

If the apertures formed in the fixed stop member such as a turret or the like are all rounded with varying areas, it is then possible to form clearly blurred images upon phototaking in a full-zooming state and at a minimum F-number, regardless of simplicity in the fixed stop member.

When the maximum aperture area is controlled by insertion or deinsertion of the fixed stop member in or from the optical path, the fixed stop member could be designed such that the shape-fixed stop element having an aperture area corresponding to the maximum area depending on zooming is arranged on the optical axis.

When a stop of fixed aperture area is located in an optical path, it is acceptable to locate a shutter on a separate optical path.

The variable stop could be provided in various constructions. FIG. 17 is illustrative of a variable stop comprising five stop blades, which may also serve as a shutter. In FIG. 17, each stop blade is drawn as undersized for the sake of simplicity; in actual applications, however, an edge portion that forms an aperture in the stop blade is longer than shown in FIG. 17.

It is noted that aperture shape is not always limited to that determined by an even number of stop blades. As shown typically in FIG. 17, five stop blades could be used in such a way as to assume on a small, substantially pentagonal aperture shape when the aperture shape is rendered small. Thus, an odd number of stop blades (e.g., 7) may be used in the invention.

Alternatively, the edge portions of the stop blades on the optical axis side could be delimited by concave lines in such a way that aperture shape becomes close to a circle, thereby achieving clearly blurred images.

It is acceptable that the stop also serves as a shutter upon phototaking, thereby reducing the number of parts involved.

Figure 17A:
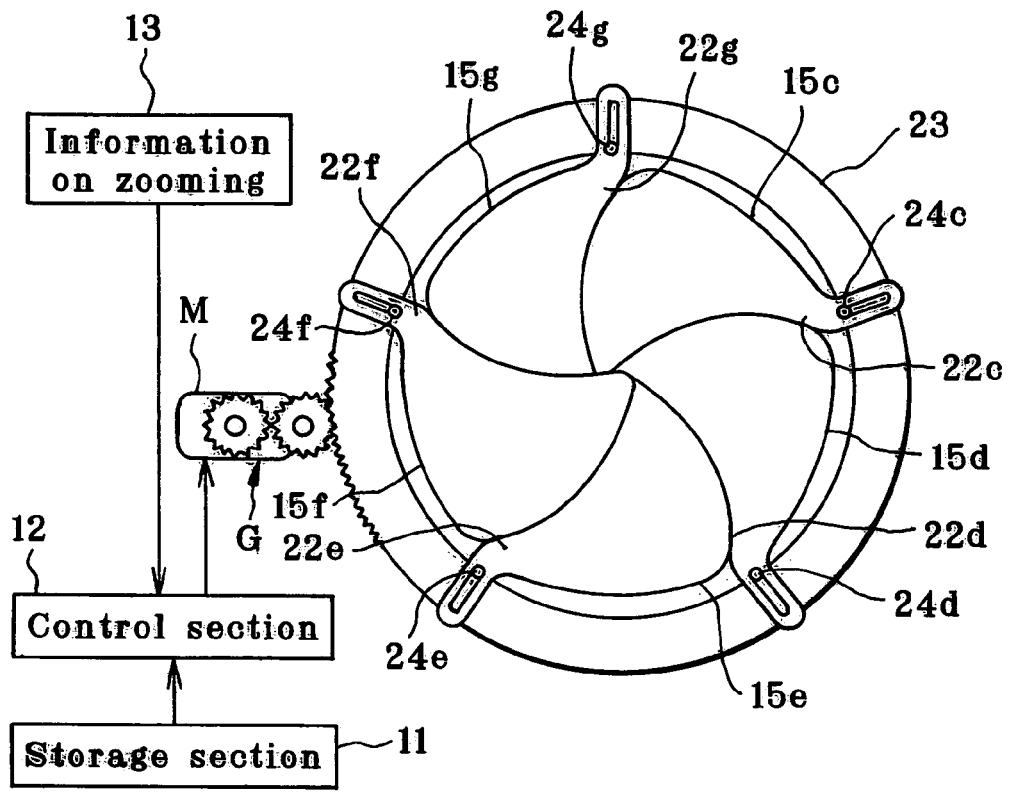
FIGS. 17(a) and 17(b) are illustrative of a variable stop comprising 5 stop blades in a closed state (a) and an full-aperture state (b).
Figure 17B:
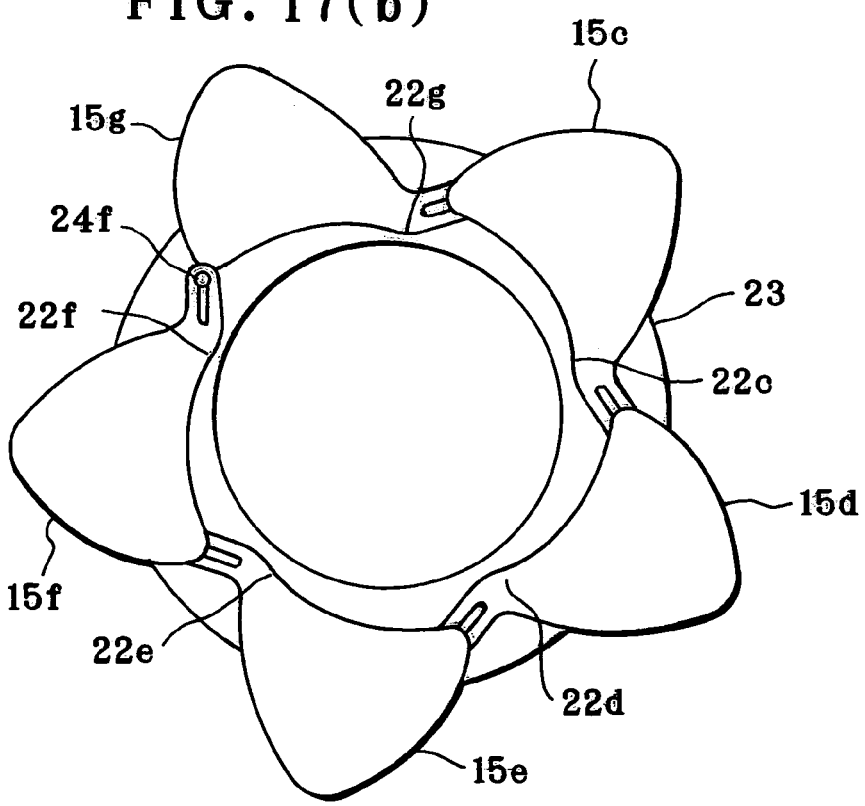

FIGS. 17(a) and 17(b) are now more specifically explained. FIGS. 17(a) and 17(b) are illustrative of one embodiment of the variable stop in a closed state and a full-aperture state, respectively. Opaque stop blades (shielding members) 15c, 15d, 15e, 15f and 15g are rotatable around fixed pins 22c, 22d, 22e, 22f and 22g, respectively. As a ring connector 23 is rotated by power means 14 (e.g., a motor M and gears G), projection portions 24c, 24d, 24e, 24f and 24g fixed on the ring connector 23 give pushes on the base ends of the shielding members 15c, 15d, 15e, 15f and 15g, thereby drawing the shielding members 15c, 15d, 15e, 15f and 15g outwardly, and in a state where they are drawn to a maximum, the fixed stop having a circular aperture portion is exposed to view. In this way, the combined variable stop and shutter is operable to transmit or shield light.

With a full-aperture stop position corresponding to zooming previously stored in a memory section 11 such as a memory or the like, the power means 14 is controlled at a control section 12 in response to zooming information 13 (information on helicoidal movement for zooming, not shown) and the information stored in the memory section 11, so that the full-aperture state of a variable stop member S2 can be controlled. In this way, it is possible to provide determination of a suitable aperture area depending on zooming.

It should be understood that with data stored in the memory section 11, the aperture area could be continuously determined throughout zooming. Alternatively, the aperture stop could be linearly controlled at three states at or near the wide-angle end, in or near an intermediate state and at or near the telephoto end. It should also be understood that control could be made at two, five or more stages.

Figure 18A:
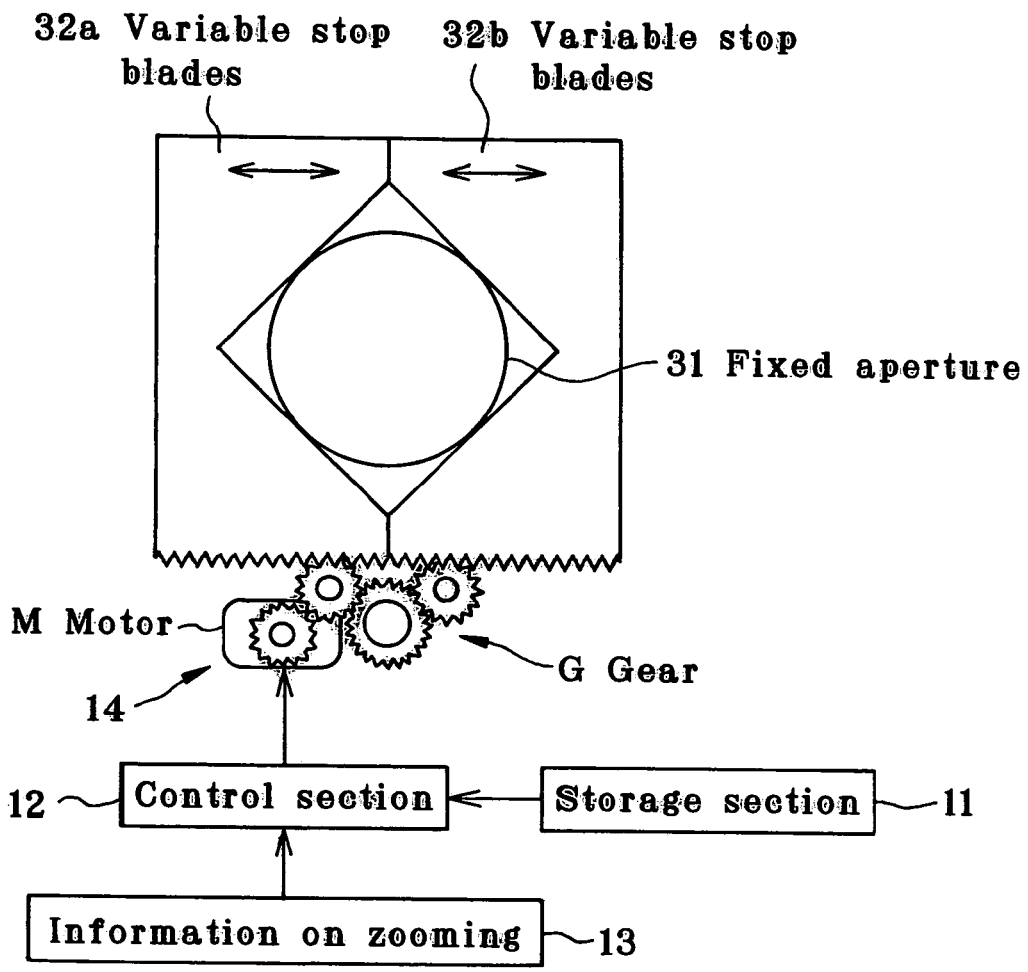
FIGS. 18(a) and 18(b) are illustrative of a variable stop comprising a circular fixed aperture and two stop blades in a full-aperture state at the telephoto end (a) and a full-aperture state at the wide-angle end (b).
Figure 18B:
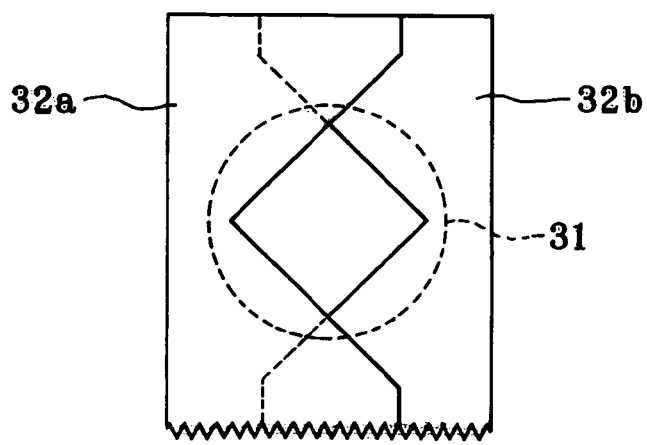

The variable stop could be provided in various constructions so far known in the art. For instance, FIGS. 18(a) and 18(b) are illustrative of another embodiment of the variable stop in a full-aperture state at the telephoto end and the wide-angle end, respectively. As shown, two stop blades 32a and 32b move in or near the front or rear of a fixed aperture 31 of circular shape to make aperture shape variable. Preferably at this time, the stop blades 32a and 32b could be configured in a shape concave on the optical axis side. This variable stop could also serve as a shutter.

FIGS. 18(a) and 18(b) are now more specifically explained. Two variable stop blades 32a and 32b are each provided with a guide groove (not shown) in the moving direction. The edges of two variable stop blades 32a and 32b are configured in such a way as to give a square aperture shape with its center on the optical axis of the zoom lens. Movement of two variable stop blades 32a and 32b is controlled by operation of a motor M that has a rotary gear M meshing with a saw-toothed gear of the variable stops 32a and 32b (not shown). A stop substrate provided with a fixed aperture 31 of circular shape around the optical axis of the zoom lens is provided with fixed pins (not shown) that are fitted in the guide grooves for the purpose of reducing variable stop shakes during movement. How to control the maximum area of the aperture in the stop upon phototaking is much the same as in FIGS. 15 and 17, and so is not specifically explained.

The present zoom lens constructed as described above may be applied to phototaking systems where object images formed through an image-formation optical system are received at image pickup devices such as CCDS, inter alia, digital cameras or video cameras as well as PCs and telephone sets which are typical information processors, in particular, easy-to-carry cellular phones. Given below are some such embodiments.

Figure 19:
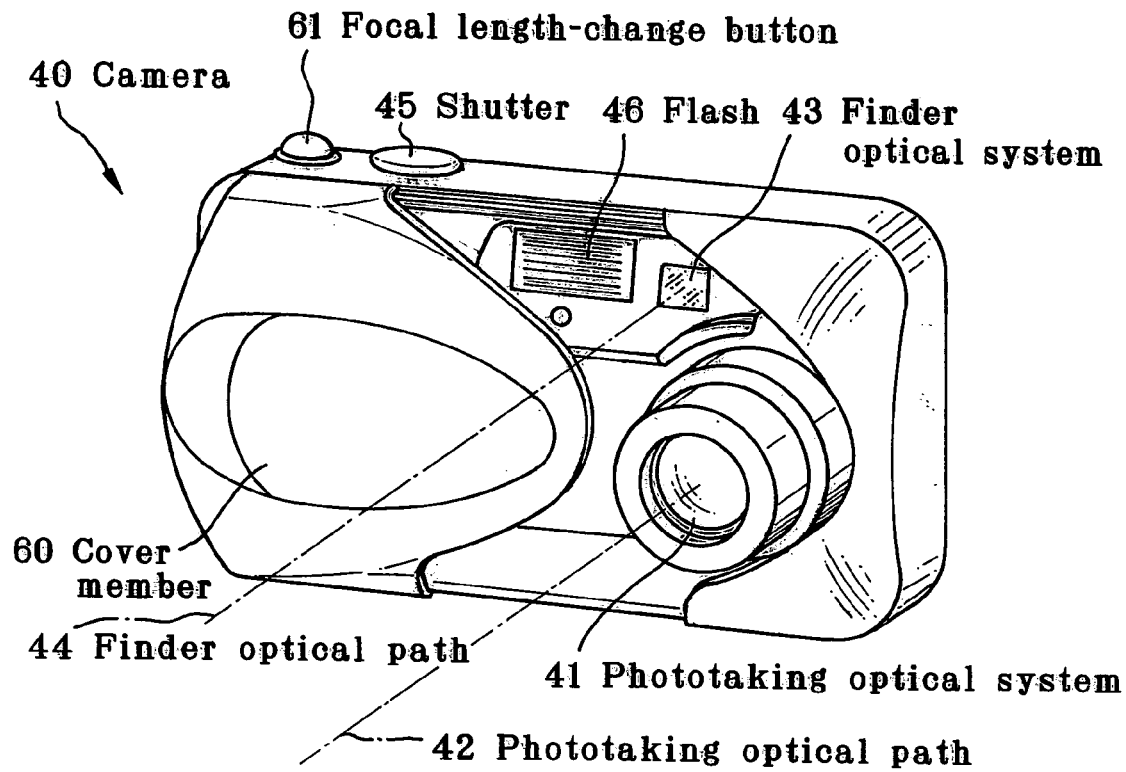
FIG. 19 is a front perspective view illustrative of the outward appearance of a digital camera with the zoom optical system of the invention built in it.
Figure 20:
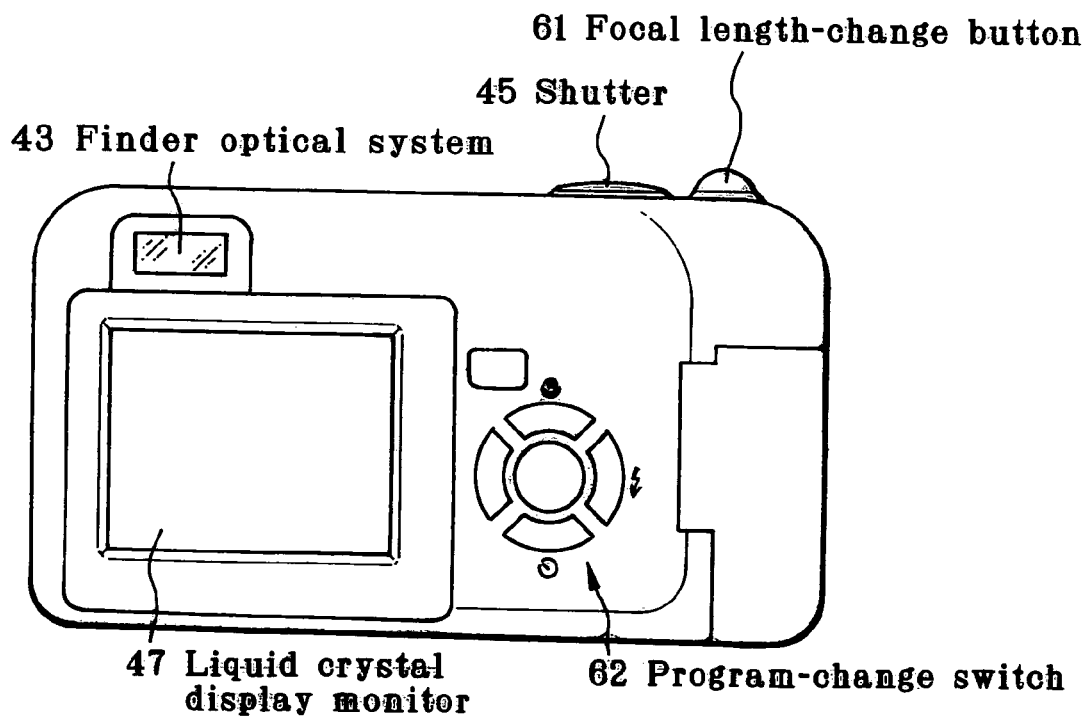
FIG. 20 is a rear perspective view of the digital camera shown in FIG. 19.
Figure 21:
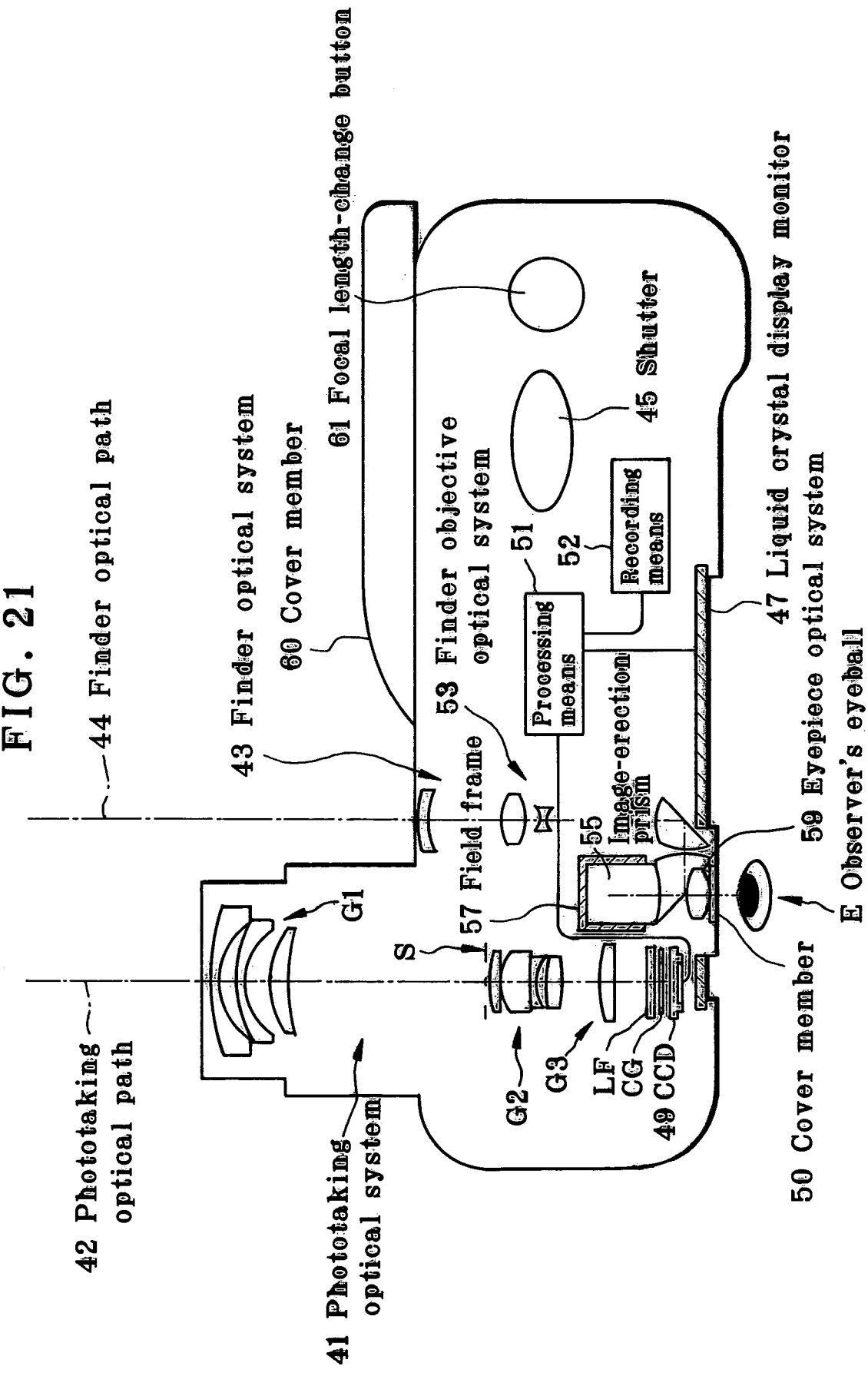
FIG. 21 is a sectional view of the digital camera shown in FIG. 19.

FIGS. 19, 20 and 21 are conceptual illustrations of a phototaking optical system 41 for digital cameras, in which the zoom optical system of the invention is built. FIG. 19 is a front perspective view of the outside appearance of a digital camera 40, and FIG. 20 is a rear perspective view of the same. FIG. 21 is a schematic perspective plan view of the construction of the digital camera 40. It is noted that the FIGS. 19 and 21 show that the phototaking optical system 41 is not received at a collapsible lens mount. In this embodiment, the digital camera 40 comprises a phototaking optical system 41 including a phototaking optical path 42, a finder optical system 43 including a finder optical path 44, a shutter 45, a flash 46, a liquid crystal monitor 47, a focal length-change button 61, a program-change switch 62 and so on. When the phototaking optical system 41 is received at the collapsible lens mount, a cover 60 is slid to cover the phototaking optical system 41, finder optical system 43 and flash 61. As the cover 60 is opened to set the camera 40 ready for phototaking, the phototaking optical system 41 is taken out of the lens collapsible lens mount, as shown in FIG. 21. As the shutter 45 mounted on the upper portion of the camera 40 is pressed down, phototaking takes place through the phototaking optical system 41, for instance, the zoom optical system of Example 1. An object image formed by the phototaking optical system 41 is formed on the image pickup plane of a CCD 49 via a low-pass filter LF provided with an IR cut coating and a cover glass CG. The object image received at CCD 49 is shown as an electronic image on the liquid crystal monitor 47 via processing section 51, which monitor is mounted on the back of the camera. This processing section 51 is connected with recording section 52 in which the phototaken electronic image may be recorded. It is here noted that the recording section 52 may be provided separately from the processing section 51 or, alternatively, it may be constructed in such a way that images are electronically recorded and written therein by means of floppy discs, memory cards, MOs or the like. This camera could also be constructed in the form of a silver halide camera using a silver halide film in place of CCD 49.

Moreover, a finder objective optical system 53 is located on the finder optical path 44. The finder objective optical system 53 is built up of a zoom optical system that comprises a plurality of lens groups (three groups in FIGS. 19–21) and changes in focal length in association with the zoom optical system that is the phototaking optical system 41. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer.

With the thus constructed digital camera 40, it is possible to achieve high performance and size reductions, because the phototaking optical system 41 is of high performance and compactness, and can be received at the collapsible lens mount.

Figure 22:
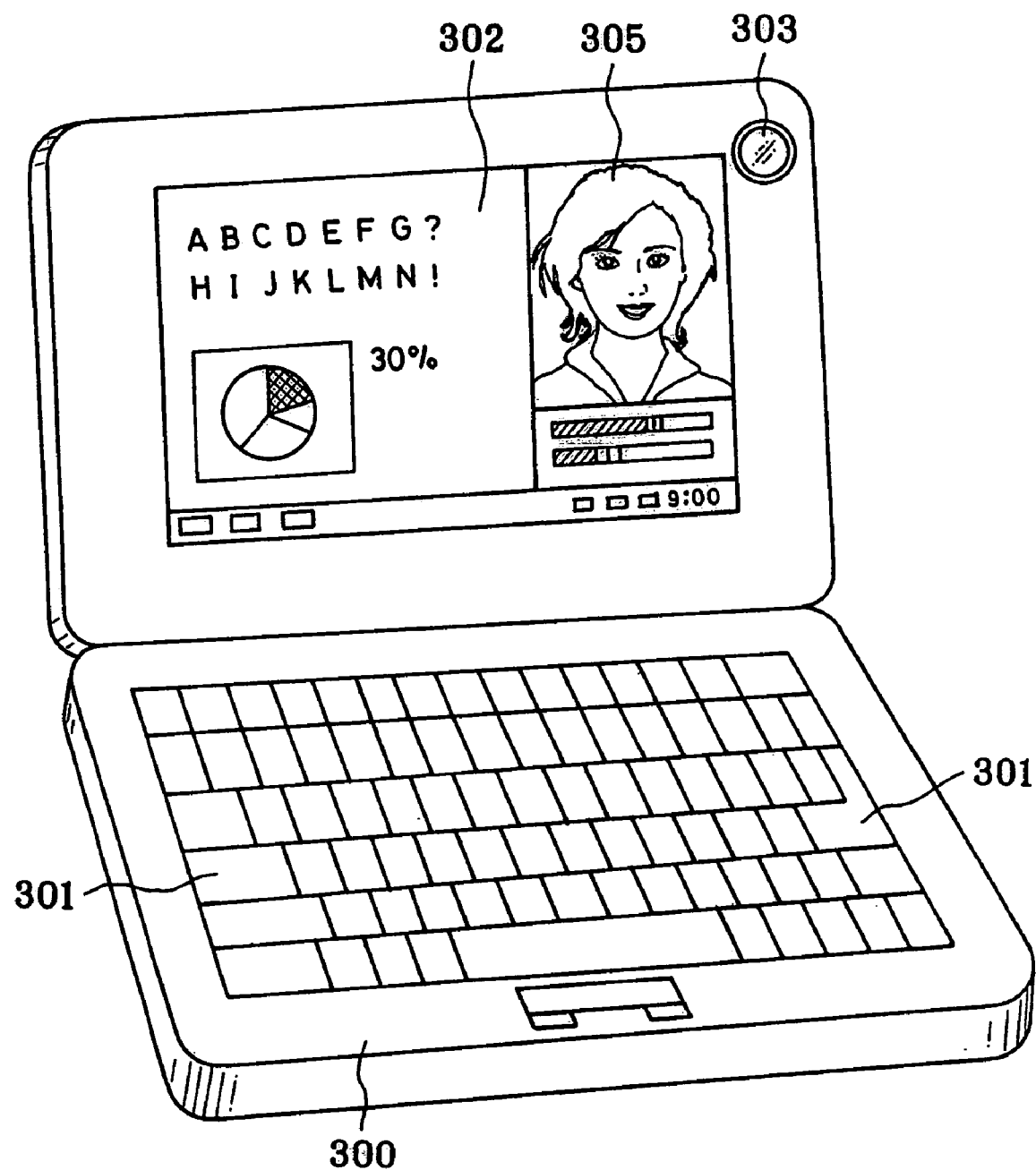
FIG. 22 is a front perspective schematic of personal computer with a cover opened, wherein the zoom optical system of the invention is incorporated as an objective optical system in it.
Figure 23:
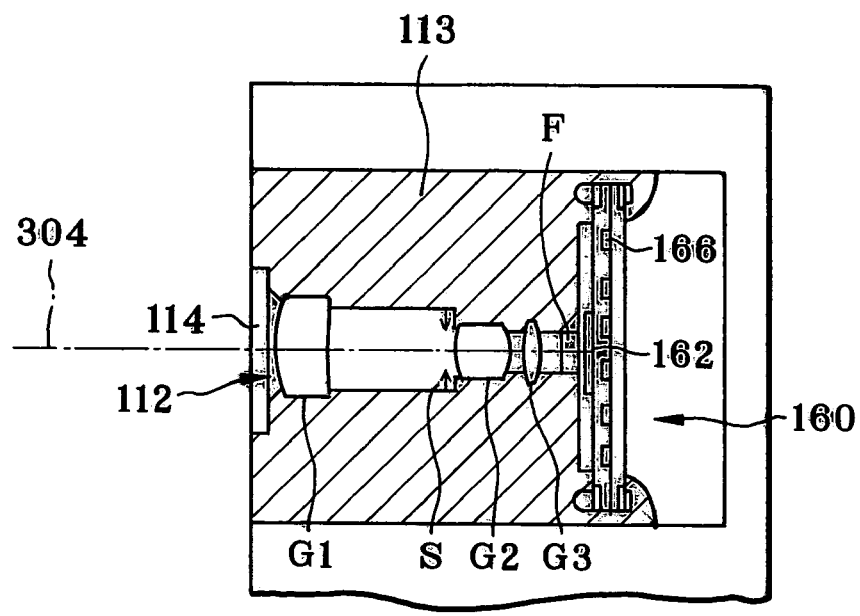
FIG. 23 is a sectional schematic of a phototaking optical system in the personal computer.
Figure 24:
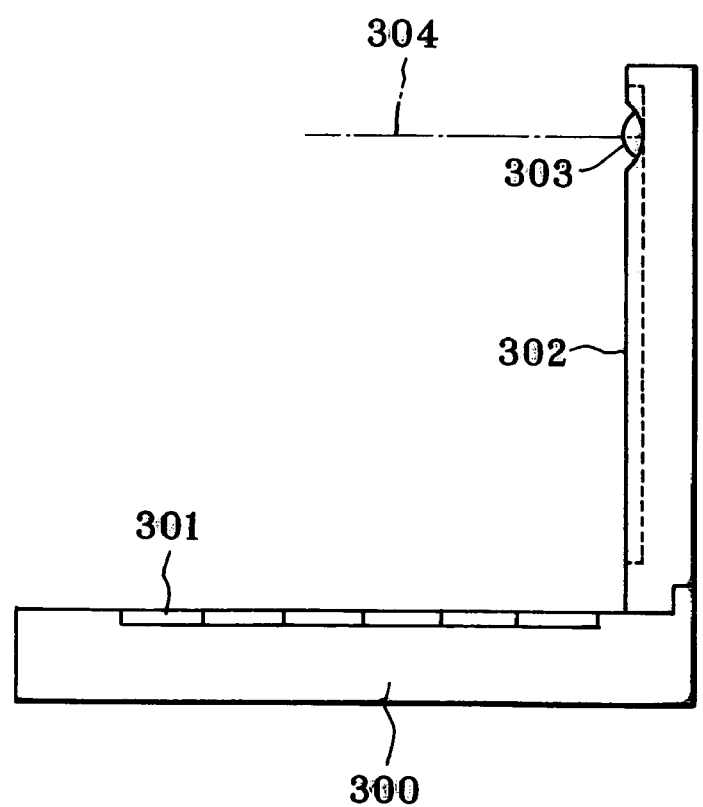
FIG. 24 is a side schematic of the state of FIG. 22.

FIGS. 22, 23 and 24 are illustrative of a personal computer that is one example of the information processor in which the zoom optical system of the invention is built as an objective optical system. FIG. 22 is a front perspective view of a personal computer 300 with a cover opened, FIG. 23 is a sectional view of a phototaking optical system 303 in the personal computer 300, and FIG. 24 is a side view of the state of FIG. 22. As shown in FIGS. 22–24, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use could be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the right-upper portion of the monitor 302, it could be located somewhere around the monitor 302 or keyboard 301.

This phototaking optical system 303 comprises, on a phototaking optical path 304, an objective lens 112 comprising the zoom optical system according to the invention and an image pickup device chip 162 for receiving an image. These are built in the personal computer 300.

Here an optical low-pass filter F is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112. It is here noted that driving mechanisms for the zoom optical system contained in the lens barrel 113 are not shown.

An object image received at the image pickup device chip 162 is entered via a terminal 166 in the processing means of the personal computer 300, and shown as an electronic image on the monitor 302. As an example, an image 305 taken of the operator is shown in FIG. 22. This image 305 may be shown on a personal computer on the other end via suitable processing means and the Internet or telephone line.

Figure 25A:
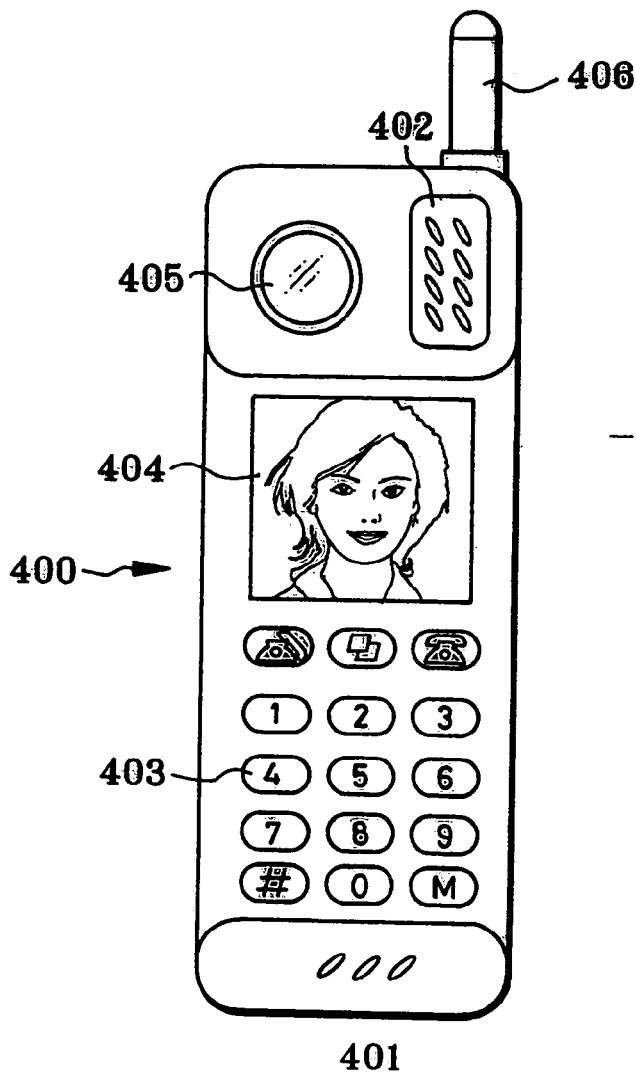
FIGS. 25(*a*) and 25(*b*) are a front view and a side view of a cellular phone with the zoom optical system of the invention incorporated as an objective optical system in it, and FIG. 25(*c*) is a side view of its phototaking optical system.
Figure 25B:
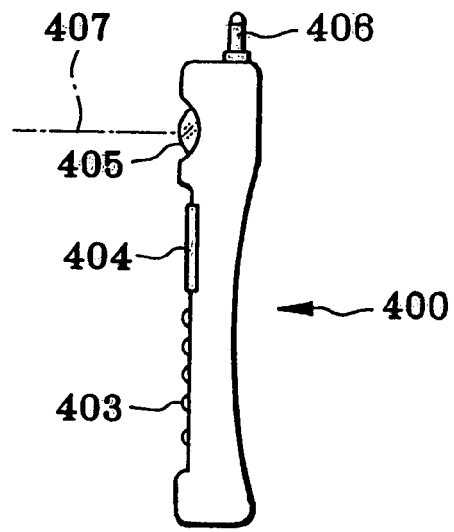
Figure 25C:
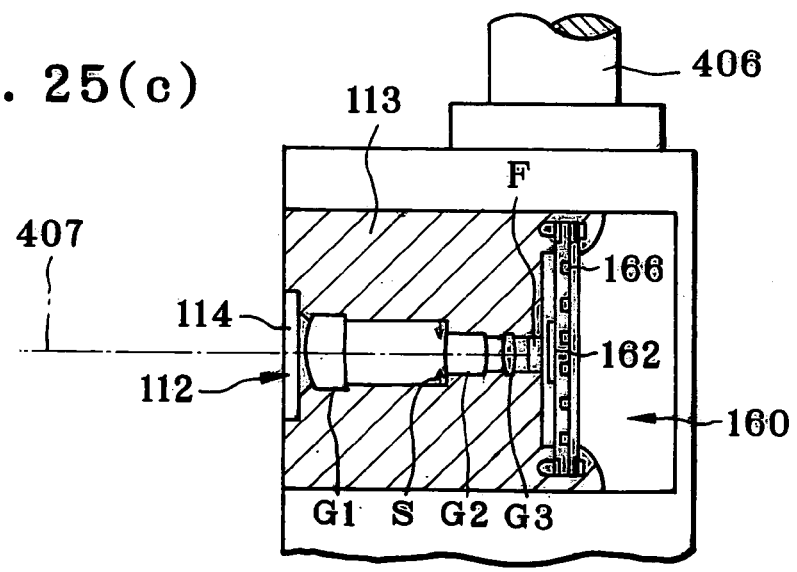

FIGS. 25(a), 25(b) and 25(c) are illustrative of a telephone set that is one example of the information processor in which the zoom optical system of the invention is built in the form of a phototaking optical system, especially a convenient-to-carry cellular phone. FIG. 25(a) and FIG. 25(b) are a front and a side view of a cellular phone 400, respectively, and FIG. 25(c) is a sectional view of a phototaking optical system 405. As shown in FIGS. 25(a), 25(b) and 25(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 comprising the zoom optical system of the invention and an image pickup device chip 162 for receiving an object image. These are built in the cellular phone 400.

Here an optical low-pass filter F is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112. It is here noted that driving mechanisms for the zoom optical system contained in the lens barrel 113 are not shown.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

According to the invention as described above, there can be provided a small-format zoom optical system that is fully corrected in terms of various aberrations such as astigmatism and chromatic aberration of magnification while the total thickness of a lens arrangement upon received at a collapsible lens amount is reduced, and has a stable, high image-formation capability from infinity to near distances and a high zoom ratio at a wide angle of view, lending itself to video cameras and digital cameras, and an imaging system that incorporates the same.

There can also be provided a zoom optical system that is more reduced in terms of full-aperture F-number fluctuations with zooming than an prior art optical system for facilitation of correction of aberrations, and can have a compact, high zoom-ratio, wide-angle arrangement, lending itself to video cameras and digital cameras, and an imaging system that incorporates the same.

What is claimed is:

1. A zoom optical system, comprising, in order from an object side thereof, a first lens group having a generally negative refracting power and a second lens group having a generally positive refracting power, wherein:

said first lens group comprises a negative single lens element including at least one aspheric surface and a positive single lens element with an air separation interposed between said negative single lens element and said positive single lens element, said second lens group comprises four lens elements inclusive of, in order from an object side thereof, a positive lens element, a cemented lens consisting of a positive lens element and a negative lens element and a positive lens element wherein the number of all lens elements is four, and further comprises at least one aspheric surface, and said zoom optical system is operable to vary a spacing between said lens groups for zooming and satisfies the following conditions:

$$1.1 < |f_1| / \sqrt{(f_W \cdot f_T)} < 2.2 \quad (1)$$

$$70° < 2\omega_W < 85° \quad (2)$$

$$15° < 2\omega_T < 24° \quad (3)$$

where $f_W$ is a focal length of the zoom optical system at a wide-angle end thereof, which satisfies condition (2),
$f_T$ is a focal length of the zoom optical system at a telephoto end thereof, which satisfies condition (3),
$f_1$ is a focal length of the first lens group,
$\omega_W$ is a maximum image pickup half angle of view at the wide-angle end, and
$\omega_T$ is a maximum image pickup half angle of view at the telephoto end.

2. The zoom optical system according to claim 1, wherein all refracting surfaces in said first lens group and refracting surfaces in said second lens group except a refracting surface nearest to the image side are convex on object sides thereof.

3. The zoom optical system according to claim 1, wherein the lens element nearest to the object side in said second lens group satisfies the following condition:

$$1.5 < (R_b + R_a)/(R_b - R_a) < 3 \quad (4)$$

where $R_a$ is an axial radius of curvature of an object-side surface of the lens element located nearest to the object side in the second lens group, and
$R_b$ is an axial radius of curvature of an image plane-side surface of the lens element located nearest to the object side in the second lens group.

4. The zoom optical system according to claim 1, which further satisfies the following condition:

$$\nu_{pi} \leq \nu_{pi+1} (i=1, 2) \quad (5)$$

where $\nu_{pi}$ is an Abbe number of an i-th positive lens element as counted from the object side.

5. The zoom optical system according to claim 1, which further satisfies the following condition:

$$\nu_{pi} \leq \nu_{pi+1} (i=1, 2, 3) \quad (6)$$

where $\nu_{pi}$ is an Abbe number of an i-th positive lens element as counted from the object side.

6. The zoom optical system according to claim 1, which further satisfies the following condition:

$$n_{ni} \leq n_{ni+1} (i=1, 2, \ldots, m) \quad (7)$$

where m is the number of negative lens elements throughout a lens system, and
$n_{ni}$ is a refractive index of an i-th negative lens element as counted from the object side.

7. The zoom optical system according to claim 1, wherein said first lens group comprises three lens elements inclusive of, in order from an object side thereof, a first negative lens element of meniscus shape, a second negative lens element of meniscus lens and a third positive lens element of meniscus shape.

8. The zoom optical system according to claim 7, wherein said second negative lens element is an aspheric lens element.

9. The zoom optical system according to claim 7, wherein said second negative lens element has an aspheric surface on an image plane side thereof, wherein said aspheric surface satisfies the following condition:

$$38° < \theta < 64° \quad (8)$$

where θ is a maximum value of an angle that an optical axis makes with a normal to an image plane side-aspheric surface of the second negative lens element in a range of an effective light beam.

10. The zoom optical system according to claim 7, wherein all negative lens elements in said first lens group are provided with multicoatings on object-side surfaces thereof and single-layer coatings on image-side surfaces thereof.

11. The zoom optical system according to claim 1, which further comprises on an image side of said second lens group a third lens group comprising one positive lens element, wherein the following condition is satisfied:

$$\nu_{p5} - \nu_{p1} > 40 \quad (9)$$

where $\nu_{p1}$ is an Abbe number of the positive single lens element in the first lens group, and
$\nu_{p5}$ is an Abbe number of the positive lens element in the third lens group.

12. The zoom optical system according to claim 1, which further comprises a third lens group on an image side of said second lens group, wherein focusing is carried out by movement of said third lens group.

13. The zoom optical system according to claim 1, wherein a lens element nearest to the object side in said second lens group comprises an aspheric surface at a surface nearest to the object side, and is of meniscus shape convex on the object side thereof.

14. The zoom optical system according to claim 1, which further comprises an aperture stop integral with said second lens group.

15. The zoom optical system according to claim 1, wherein said cemented lens in said second lens group satisfies the following condition:

$$0.6 < R_{2FR}/R_{2FF} < 1.0 \quad (11)$$

where $R_{2FF}$ is an axial radius of curvature of a surface nearest to the object side in the cemented lens in the second lens group, and
$R_{2FR}$ is an axial radius of curvature of a surface nearest to the image side in the cemented lens in the second lens group.

16. The zoom optical system according to claim 1, which further satisfies the following condition:

$$-2.5 < d_W/f_1 < -1.0 \quad (14)$$

where $d_W$ is a distance from a surface nearest to the image side in the first lens group to a surface nearest to the object side in the second lens group at the wide-angle end.

17. The zoom optical system according to claim 1, wherein said cemented lens in said second lens group satisfies the following condition:

$$0.22 < R_{2FR}/f_T < 0.40 \quad (12)$$

where $f_T$ is a focal length of the zoom optical system at the telephoto end, which satisfies condition (3), and
$R_{2FR}$ is an axial radius of curvature of a surface nearest to the image side in the cemented lens in the second lens group.

18. An imaging system, comprising the zoom optical system according to claim 1 and an image pickup device located on a side of an image plane formed by said zoom optical system.

19. The imaging system according to claim 18, wherein said image pickup device is an electronic image pickup device.

20. The imaging system according to claim 18, wherein a finder optical system for viewing a subject is provided on an optical path different from that for said zoom optical system.

21. A zoom optical system, comprising, in order from an object side thereof, a first lens group having a generally negative refracting power, a second lens group having a generally positive refracting power and a third lens group comprising a positive single lens element wherein the number of said lens element is one, wherein:
said first lens group comprises three lens elements inclusive of, in order from an object side thereof, a negative single lens element, a negative single lens element comprising an aspheric surface and a positive single lens element with an air separation interposed between said negative single lens element and said positive single lens element, said second lens group comprises four lens elements inclusive of, in order from an object side thereof, a positive lens element, a cemented lens consisting of a positive lens element and a negative lens element and a positive lens element wherein the number of all lens elements is four, and further comprises at least one aspheric surface, and said zoom optical system is operable to vary a spacing between adjacent lens groups for zooming and satisfies the following conditions:

$$1.1 < |f_1|/\sqrt{(f_W \cdot f_T)} < 2.2 \quad (1)$$

$$70° < 2\omega_W < 85° \quad (2)$$

$$15° < 2\omega_T < 24° \quad (3)$$

$$1.5 < (R_b + R_a)/(R_b - R_a) < 3 \quad (4)$$

$$0.6 < R_{2FR}/R_{2FF} < 1.0 \quad (11)$$

where $f_W$ is a focal length of the zoom optical system at a wide-angle end thereof, which satisfies condition (2),
$f_T$ is a focal length of the zoom optical system at a telephoto end thereof, which satisfies condition (3),
$f_1$ is a focal length of the first lens group,
$\omega_W$ is a maximum image pickup half angle of view at the wide-angle end,
$\omega_T$ is a maximum image pickup half angle of view at the telephoto end,
$R_a$ is an axial radius of curvature of an object-side surface of the lens element located nearest to the object side in the second lens group,
$R_b$ is an axial radius of curvature of an image plane-side surface of the lens element located nearest to the object side in the second lens group,
$R_{2FF}$ is an axial radius of curvature of a surface nearest to the object side of the cemented lens in the second lens group, and
$R_{2FR}$ is an axial radius of curvature of a surface nearest to the object side of the cemented lens in the second lens group.

22. The zoom optical system according to claim 2, which further comprises a third lens group on an image side of said second lens group, wherein the following condition is satisfied:

$$D_{11} > D_{12} > D_{31} > D_{22} > D_{21} \quad (10)$$

where $D_{11}$ is a maximum effective diameter of a surface nearest to the object side in the first lens group throughout a zooming zone,
$D_{12}$ is a maximum effective diameter of a surface nearest to the image side in the first lens group throughout the zooming zone,
$D_{31}$ is a maximum effective diameter of a surface nearest to the object side in the third lens group throughout the zooming zone,
$D_{22}$ is a maximum effective diameter of a surface nearest to the image side in the second lens group throughout the zooming zone, and
$D_{21}$ is a maximum effective diameter of a surface nearest to the object side in the second lens group throughout the zooming zone.

23. An zoom optical system, comprising, in order from an object side thereof, a first lens group of negative refracting power, a second lens group of positive refracting power, and an aperture stop located on an image side with respect to said first lens group and having a variable aperture area, and having a zoom ratio of at least 3.4, wherein:
upon zooming from a wide-angle end to a telephoto end of said zoom optical system, a spacing between the respective lens groups is varied while said aperture stop moves in the same direction as does said second lens group, and a maximum area of an aperture portion in said aperture stop upon phototaking is smaller at the wide-angle end than at the telephoto end, with satisfaction of the following conditions (21) and (22):

$$-2 < f_1/\sqrt{(f_W \cdot f_T)} < -1 \quad (21)$$

$$1.05 < S_T/S_W < 4 \quad (22)$$

where $f_1$ is a focal length of the first lens group,
$f_W$ is a focal length of the zoom optical system at the wide-angle end,
$f_T$ is a focal length of the zoom optical system at the telephoto end,
$S_W$ is the maximum area of the aperture portion in the aperture stop at the wide-angle end upon phototaking, and
$S_T$ is the maximum area of the aperture portion in the aperture stop at the telephoto end upon phototaking.

24. The zoom optical system according to claim 23, which further comprises a third lens group on an image side of said second lens group, wherein said first lens group comprises two lens elements inclusive of a negative lens element comprising at least one aspheric surface and a positive lens element wherein the total number of all lens elements in said first lens group is two, said second lens group comprises at least one aspheric surface, and focusing on a near distance object point is carried out by movement of said third lens group.

25. An imaging system comprising the zoom optical system according to claim 24 wherein said zoom optical system satisfies the following condition (28), and an image pickup device located on an image side thereof:

$$D_{11} > D_{12} > D_{31} > D_{22} > D_{21} \quad (28)$$

where $D_{11}$ is a maximum effective diameter of a surface nearest to the object side in the first lens group throughout a zooming zone,
$D_{12}$ is a maximum effective diameter of a surface nearest to the image side in the first lens group throughout the zooming zone,
$D_{31}$ is a maximum effective diameter of a surface nearest to the object side in the third lens group throughout the zooming zone, $D_{22}$ is a maximum effective diameter of a surface nearest to the image side in the second lens group throughout the zooming zone, and $D_{21}$ is a maximum effective diameter of a surface nearest to the object side in the second lens group throughout the zooming zone.

26. The zoom optical system according to claim 23, wherein an aperture shape of said aperture stop is such that a maximum aperture shape upon phototaking at the telephoto end assumes on a substantial circle and a maximum aperture shape upon phototaking at the wide-angle end is determined by up to seven stop blades.

27. The zoom optical system according to claim 26, wherein the aperture shape of said aperture stop at the wide-angle end is determined by two stop blades.

28. The zoom optical system according to claim 23, which satisfies the following conditions (23) and (24):

$$-0.01 < M_W/f_W < -0.002 \quad (23)$$

$$-0.006 < M_T/f_W < 0.015 \quad (24)$$

where $M_W$ is a d-line amount of spherical aberrations at a position corresponding to 0.7 of an aperture ratio of a circle whose center is on the optical axis and which has the same area as the maximum area of the aperture portion in the aperture stop upon phototaking at the wide-angle end, $M_T$ is a d-line amount of spherical aberrations at a position corresponding to 0.7 of the aperture ratio of a circle whose center is on the optical axis and which has the same area as the maximum area of the aperture portion in the aperture stop upon phototaking at the telephoto end, and $f_W$ is a focal length of the zoom lens system at the wide-angle end.

29. The zoom optical system according to claim 23, wherein said first lens group comprises, in order from an object side thereof, up to two negative meniscus lens elements and one positive meniscus lens element convex on object sides thereof.

30. The zoom optical system according to claim 23, wherein said second lens group comprises negative meniscus lens elements convex on object sides thereof, and all said negative lens elements are provided with multi-coatings on object-side surfaces thereof and single-layer coatings on image-side surfaces thereof.

31. The zoom optical system according to claim 23, wherein said second lens group comprises four lens elements inclusive of, in order from an object side thereof, a positive lens element convex on an object side thereof, a positive lens element convex on an object side thereof, a negative lens element and a positive lens element.

32. The zoom optical system according to claim 31, wherein said negative lens element in said second lens group is cemented to either one of the positive lens elements adjacent thereto.

33. The zoom optical system according to claim 32, wherein said negative lens element in said second lens group is cemented to the positive lens element that is adjacent thereto and located on the object side, and is in contact with a space at a concave surface on an image side thereof.

34. The imaging system according to claim 33, which further comprises a memory section that bears information corresponding to a maximum aperture area depending on zooming, and a control section for controlling a maximum aperture area upon phototaking of said aperture stop in response to information from said memory section and information on zooming.

35. The zoom optical system according to claim 23, wherein said second lens group comprises on an image side thereof a third lens group comprising up to two lens elements, thereby setting up a three-group-type zoom lens.

36. The zoom optical system according to claim 23, which is set up as a three-group-type zoom lens comprising a third lens group of positive refracting power on an image side of said second lens group, wherein focusing on a near distance object point is carried out by movement of said third lens group, and the following conditions are satisfied:

$$1.0 < f_2/\sqrt{(f_T f_W)} < 2.0 \quad (25)$$

$$1.6 < f_3/\sqrt{(f_T f_W)} < 3.6 \quad (26)$$

where $f_2$ is a focal length of the second lens group, and
$f_3$ is a focal length of the third lens group.

37. The zoom optical system according to claim 23, which is set up as a zoom optical system comprising up to three lens groups.

38. The zoom optical system according to claim 23, wherein a spacing between a surface nearest to the image side in said first lens group and said aperture stop at the wide-angle end satisfies the following condition:

$$-3.0 < D_{1s}/f_1 < -0.8 \quad (27)$$

where $D_{1s}$ is a spacing between the surface nearest to the image side and the aperture stop at the wide-angle end.

39. The zoom optical system according to claim 23, wherein said aperture stop is arranged between said first lens group and said second lens group.

40. The zoom optical system according to claim 23, wherein said aperture stop is integral with said second lens group.

41. An imaging system, comprising the zoom optical system according to claim 23 and an image pickup device located on an image side thereof.

42. The imaging system according to claim 41, wherein said image pickup device is an electronic image pickup device.

43. The imaging system according to claim 41, which has a phototaking angle of view of at least 70° at the wide-angle end of the zoom optical system.

* * * * *